(12) United States Patent
 Pecoraro et al.

(10) Patent No.: US 10,927,221 B2
(45) Date of Patent: Feb. 23, 2021

(54) DENDRIMERIC METALLACROWNS

(71) Applicants: THE REGENTS OF THE UNIVERSITY OF MICHIGAN, Ann Arbor, MI (US); Centre National De La Recherche Scientifique, Paris (FR)

(72) Inventors: Vincent L. Pecoraro, Ann Arbor, MI (US); Beatriz A. Lopez Bermudez, Ann Arbor, MI (US); Svetlana V. Eliseeva, Saint Jean le Blanc (FR); Stephane Petoud, Saint Hiaire-Saint Mesmin (FR)

(73) Assignee: The Regents of the University of Michigan, Ann Arbor, MI (US)

( * ) Notice: Subject to any disclaimer, the term of this patent is extended or adjusted under 35 U.S.C. 154(b) by 110 days.

(21) Appl. No.: 16/402,559

(22) Filed: May 3, 2019

(65) Prior Publication Data
 US 2019/0338080 A1    Nov. 7, 2019

Related U.S. Application Data

(60) Provisional application No. 62/666,304, filed on May 3, 2018.

(51) Int. Cl.
 *C08G 83/00* (2006.01)
 *G01N 21/64* (2006.01)
 *C08K 9/04* (2006.01)

(52) U.S. Cl.
 CPC ....... *C08G 83/003* (2013.01); *G01N 21/6428* (2013.01); *C08K 9/04* (2013.01); *G01N 2021/6439* (2013.01)

(58) Field of Classification Search
 CPC ................ C08G 83/003; C08G 83/002; G01N 21/6428; G01N 2021/6439; C08K 9/04
 USPC ......................................................... 378/57
 See application file for complete search history.

(56) References Cited

U.S. PATENT DOCUMENTS

2018/0127438 A1    5/2018    Trivedi et al.

*Primary Examiner* — David P Porta
*Assistant Examiner* — Gisselle M Gutierrez
(74) *Attorney, Agent, or Firm* — Dierker & Kavanaugh, P.C.

(57) ABSTRACT

Dendrimeric metallacrowns may include a monomeric metallacrown complex or a dimeric metallacrown complex. In an example, the dendrimeric metallacrown includes the monomeric metallacrown complex and a dendron. In this example, the monomeric metallacrown complex includes a central ion, and a metallomacrocycle attached to the central ion. The central ion is selected from the group consisting of a lanthanide ion, a d-block transition metal ion or rare earth metal ion, and an s-block alkali or alkaline earth metal. The metallomacrocycle includes a repeating sub-unit consisting of a metal ion and a ring ligand selected from the group consisting of a hydroxamic acid derivative and an oxime derivative. The dendron is respectively attached to each of the ring ligands of the metallomacrocycle.

33 Claims, 38 Drawing Sheets

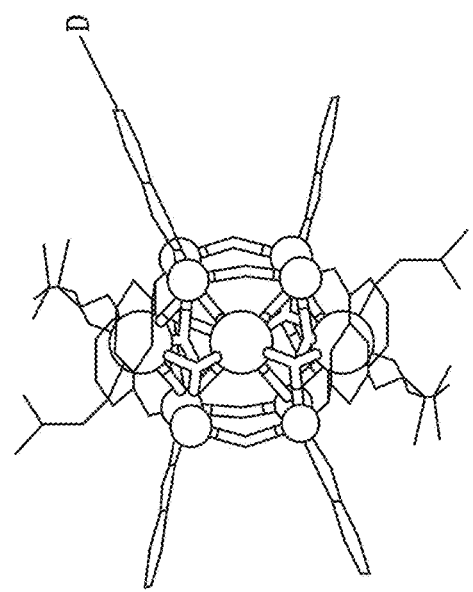
FIG. 26A
Na$_3$[12-MC$_{Ga^{III}(N)shi-4}$]$_2$(OH)$_4$
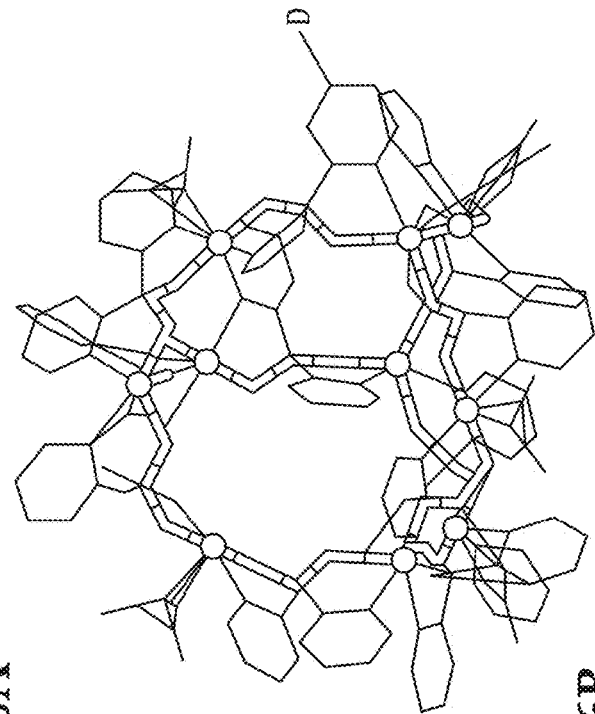
FIG. 26B
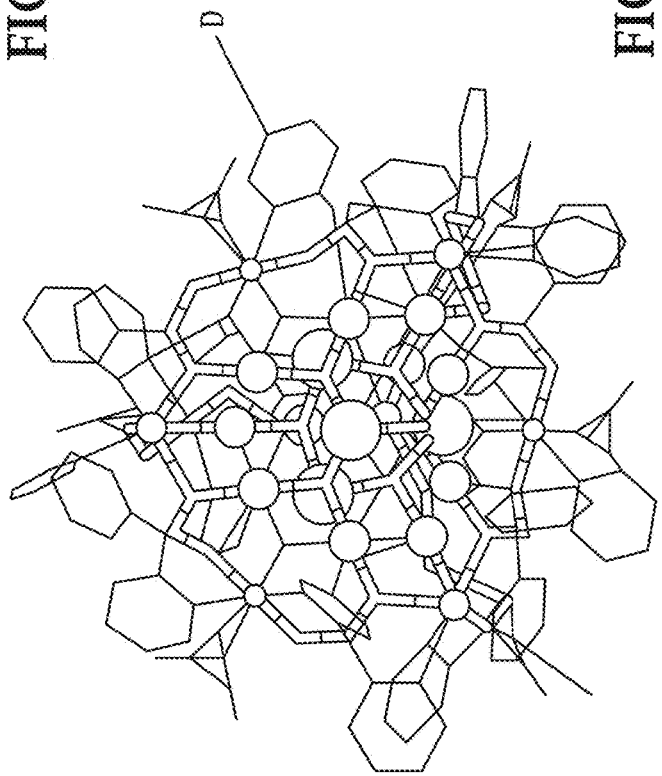

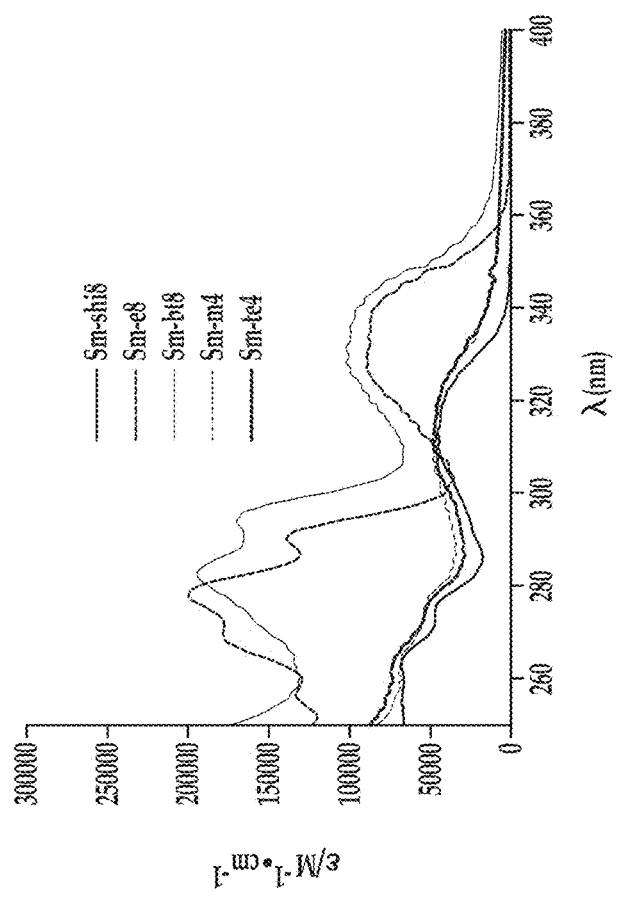
FIG. 29
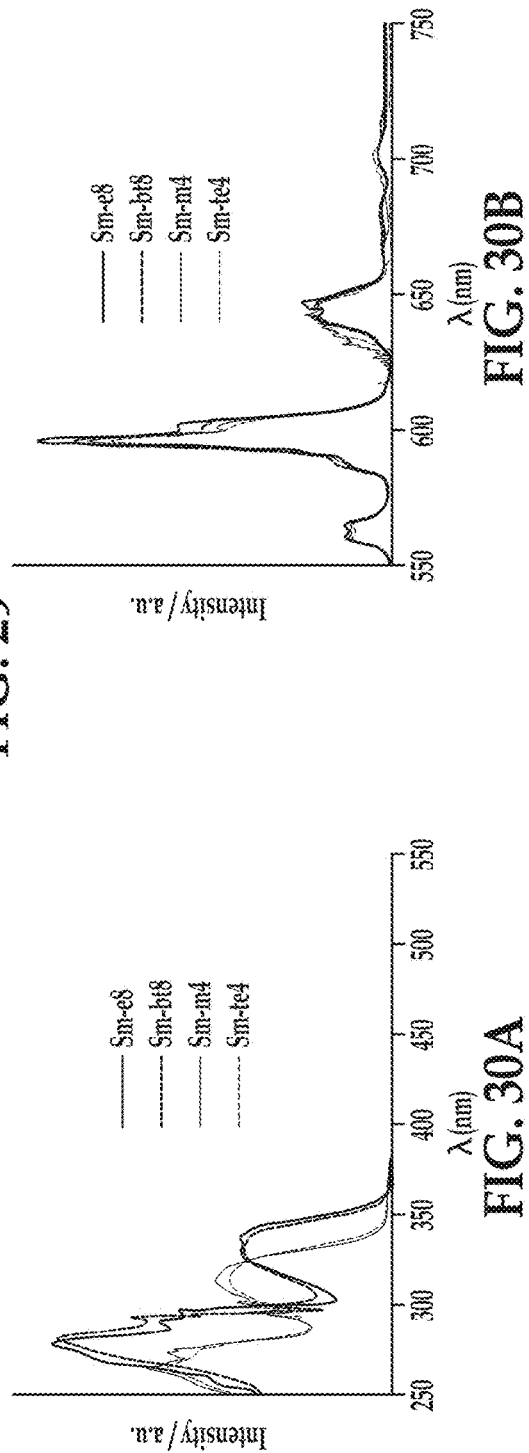
FIG. 30A
FIG. 30B

DENDRIMERIC METALLACROWNS

CROSS-REFERENCE TO RELATED APPLICATIONS

This application claims the benefit of U.S. provisional application Ser. No. 62/666,304, filed May 3, 2018, the contents of which is incorporated by reference herein in its entirety.

STATEMENT REGARDING FEDERALLY SPONSORED RESEARCH OR DEVELOPMENT

This invention was made with government support under Grant Nos. CHE1361779 and CHE1664964 awarded by the National Science Foundation. The government has certain rights in the invention.

BACKGROUND

Optical devices, bioanalytical assays, and biological imaging probes often utilize components that exhibit special optical properties, such as organic fluorophores and semiconductor nanoparticles. Some desired optical properties include long luminescence lifetimes, and large effective energy differences between excitation and emission bands. Another desirable optical property includes sharp emission bands throughout the visible and near-infrared (NIR) spectral ranges, the wavelengths of which are moderately or not affected by the experimental conditions of detection and resistance to photodecomposition. NIR optical imaging has clinical potential to significantly improve diagnosis of various human diseases in real time imaging experiments. Currently used nucleic acid-binding NIR dyes (e.g., organic fluorophores) are not fully reliable for optical imaging, in part because of broad bandwidth, high energy excitation wavelengths, small Stokes shift, limited water solubility, and low photostability (i.e., prone to photobleaching). These characteristics of nucleic acid-binding NIR dyes can limit detection sensitivity and deleteriously affect image resolution. While quantum dots have better resistance to photobleaching and higher brightness than nucleic acid-binding NIR dyes, these imaging agents may suffer from blinking (i.e., random fluctuations in light emission) and may be toxic for in vivo applications due to their components. Dendrimers with organic fluorophores attached thereto have also been used as bioimaging probes, but these imaging agents are also not fully reliable for the reasons set forth above for the nucleic acid-binding NIR dyes.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 26A through 26D depict the structures of different dendrimeric metallacryptands;

FIG. 29 is a graph depicting the UV-Vis absorbance spectrum of a control samarium metallacrown complex $(Ga_8Sm_2(shi)_8(ip)_4$, referred to as "Sm-shi8") and four analogs (Sm-e8, Sm-bt8, Sm-m4, and Sm-te4) thereof;

FIGS. 30A and 30B are graphs depicting the solution state excitation (FIG. 30A) and emission (FIG. 30B) spectra of the samarium metallacrown complex analogs Sm-e8, Sm-bt8, Sm-m4, and Sm-te4;

DETAILED DESCRIPTION

Figure 1:
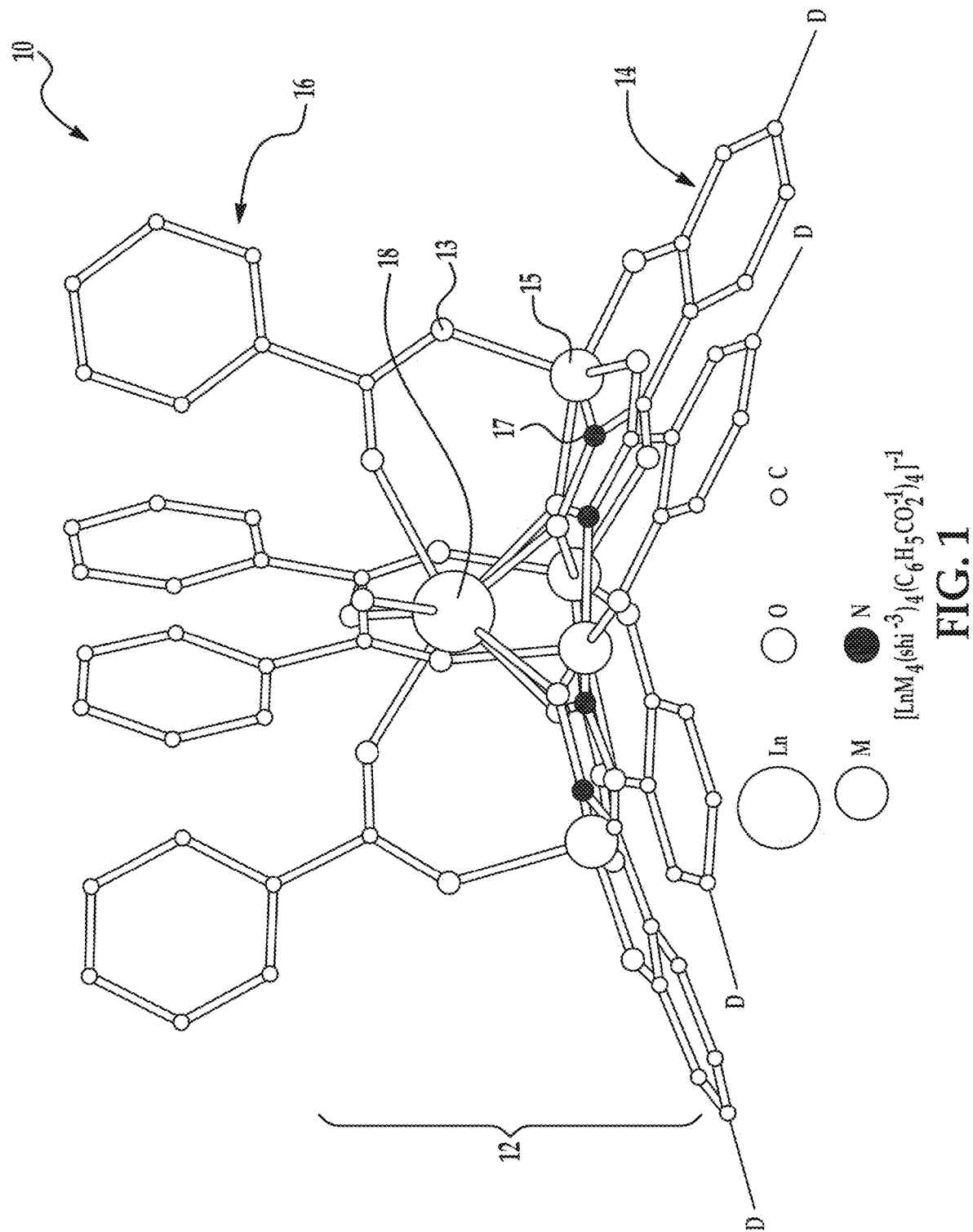
FIG. 1 depicts a dendrimeric metallacrown structure including $[LnM_4(shi^{-3})_4(C_6H_5CO_2^{-1})_4)]^{-1}$ as the monomeric metallacrown complex, where Ln=a central ion, M=a metal ion, and shi=salicylhydroximate, and dendrons (D) attached to ring ligands of the monomeric metallacrown complex.

Dendrimeric metallacrowns are disclosed herein, which include metallomacrocycles. The metallomacrocycles are formed with ligands and metal ions that cyclize to form a repeating sub-unit. The repeating sub-unit includes the metal ion, oxygen, and nitrogen ($[M-O-N]_x$) or another heteroatom (e.g., carbon, etc.). Similarly to crown ethers, metallomacrocycles can be synthesized with a range of sizes, and the inward facing oxygen atoms are capable of binding to a central metal ion (i.e., coordinate central metal).

In the examples disclosed herein, the central metal ion may be a lanthanide ion (i.e., Ln(III)), a d-block transition metal ion or rare earth metal ion, or an s-block alkali or alkaline earth metal ion. In some examples, depending upon the Ln(III) ion used, different emission wavelengths in the visible region and/or near infrared region can be observed. The characteristic luminescent emission of the lanthanide ion is preserved, even when the metallacrown is modified with bridging and/or ring ligands that attach the desirable dendron(s). Moreover, the Ln(III) complex may not be affected by repeated illuminations, and thus may not be susceptible to photodecomposition or may be less susceptible to photodecomposition than organic fluorophores (i.e., may have improved photostability compared to organic fluorophores). Moreover, depending upon the nature of the Ln(III) used in some examples, different magnetic properties may be obtained, such as single molecule magnetism or highly paramagnetic materials.

The example dendrimeric metallacrowns disclosed herein also include a dendron attached to the ring ligands of a monomeric metallacrown complex, or to bridging and/or ring ligands of a dimeric metallacrown complex. The metallacrown portion may be a suitable fluorescent/luminescent probe when the Ln(III) ion is used, and may also exhibit sharp emission bands (the wavelengths of which are not affected by the experimental conditions), long luminescence lifetimes, stable encapsulation of Ln(III), and strong resistance to photobleaching. It has been found that the dendron portion may improve the biocompatibility of the metallacrown portion. More particularly, the dendron may protect the metallacrown from the solvent when in solution (solvents can be detrimental to the luminescent signal of the complex) and/or may improve the water solubility and/or solution stability of the metallacrown. Overall, the dendrimeric metallacrowns may exhibit improved performance in biological imaging, for example, when compared to metallacrowns alone or to dendrons or dendrimers attached to organic fluorophores.

In addition to or alternatively to optical biological imaging, the dendrimeric metallacrowns disclosed herein may be suitable for use in a variety of other applications. It is believed that the dendrimeric metallacrowns may be used in any application in which a dendrimer can be used. As an example, the dendrimeric metallacrowns may be used for drug or gene (e.g., deoxyribonucleic acid (DNA)) delivery. As another example, the dendrimeric metallacrowns may be used for protein immobilization. As additional examples, some of the dendrimeric metallacrowns may possess magnetic properties and may be useful in magnetic resonance (MR) imaging and in other applications involving single molecule magnets.

Dendrimeric Metallacrown with a Monomeric Metallacrown Complex

One example of the dendrimeric metallacrown disclosed herein includes a monomeric metallacrown complex, including a central ion selected from the group consisting of a lanthanide ion, a d-block transition or rare earth metal ion, and an s-block alkali or alkaline earth metal ion, and a metallomacrocycle attached to the central ion, wherein the metallomacrocycle includes a repeating sub-unit consisting of a metal ion and a ring ligand selected from the group consisting of a hydroxamic acid derivative and an oxime derivative; and a dendron respectively attached to each of the ring ligands of the metallomacrocycle. An example of this dendrimeric metallacrown 10 is shown in FIG. 1.

Throughout this disclosure, the monomeric metallacrown complex 12 may be identified by its central ion (Ln) and its metal ion (M), i.e., $LnM_4$ (e.g., $YGa_4$, $LnGa_4$), but it is to be understood that the monomeric metallacrown complex 12 also includes the ring ligands (RL), and in some instances the bridging ligands (BL). As such, $LnM_4$ is the same as $LnM_4(RL)_4$, and in some instances, $LnM_4(RL)_4(BL)_4$. Moreover, the dendrimeric metallacrown 10 may be identified as, for example, a "$M_4Ln$ Generation X (or G:X) dendron MC-cored dendrimer" or "$LnM_4(RL)_4$ Generation X (or G:X) dendron MC-cored dendrimer", where Ln is the central ion, M is the metal ion, RL is the ring ligand, and X is the generation of the attached dendrons. In instances where RL is not stated, it is to be understood that the dendrimeric metallacrown 10 also includes the ring ligands, and in some instances, the bridging ligands. The number of attached dendrons equals the number of ring ligands. The dendrimeric metallacrown 10 may also be referred to as $LnM_4(RL)_4(G:X\ dendron)_4$ or $LnM_4(RL)_4(BL)_4(G:X\ dendron)_4$. These identifiers may not include hydrogens, solvent molecules, and/or counter ions. Some identifiers also include the molecule used to introduce a focal-point to the dendron.

The central ion 18 bonds (e.g., via coordination bonding) to the oxygen atoms of the metallomacrocycle. The oxygen atoms are shown at reference numeral 13.

Some examples of the monomeric metallacrown complex 12 of the dendrimeric metallacrown 10 may include any lanthanide central ion, or Ln(III), as the central ion 18. It is to be understood that Ln(III) central ion 18 may include any lanthanide ion, such as dysprosium ($Dy^{3+}$), ytterbium ($Yb^{3+}$), neodymium ($Nd^{3+}$), gadolinium ($Gd^{3+}$), terbium ($Tb^{3+}$), europium ($Eu^{3+}$), erbium ($Er^{3+}$), lanthanum ($La^{3+}$), cerium ($Ce^{3+}$), praseodymium ($Pr^{3+}$), promethium ($Pm^{3+}$), samarium ($Sm^{3+}$), holmium ($Ho^{3+}$), thulium ($Tm^{3+}$), or lutetium ($Lu^{3+}$).

Also while not shown in FIG. 1, the monomeric metallacrown complex 12 of the dendrimeric metallacrown 10 may include a d-block transition metal or rare earth metal central ion in place of the lanthanide central ion. In an example, the central ion 18 is the d-block transition metal ion or rare earth metal ion and is selected from the group consisting of $Mn^{2+}$, $Cu^{2+}$, $Co^{2+}$, $Co^{3+}$, Ni $Zn^{2+}$, $Fe^{3+}$, $Y^{3+}$, $Sc^{3+}$, and $Lu^{3+}$.

In still other examples not shown in FIG. 1, the monomeric metallacrown complex 12 of the dendrimeric metallacrown 10 may include an s-block alkali or alkaline earth metal central ion in place of the lanthanide central ion. For example, it has been shown that calcium ions ($Ca^{2+}$), lithium ions ($Li^+$), sodium ions ($Na^{2+}$), or potassium ions ($K^+$) may also be used as the central ion 18.

The metallomacrocycle attached to the central ion 18 may be any metallacrown that includes a repeating sub-unit consisting of a metal ion 15 and a ring ligand 14 selected from the group consisting of a hydroxamic acid derivative and an oxime derivative.

The metal ion 15 of the metallomacrocycle is a group 13 metal ion or a period 4 transition metal ion. Suitable group 13 metal ions include ions of aluminum (Al) or gallium (Ga). It is believed that indium (In) may also be used. Period 4 transition metal ions include ions of scandium (Sc, e.g., Sc(III)), vanadium (V, e.g., V(V)), chromium (Cr, e.g., Cr(III)), manganese (Mn, e.g., Mn(II) or Mn(III)), iron (Fe), cobalt (Co), nickel (Ni), copper (Cu, e.g., Cu(II)), and zinc (Zn, e.g., Zn(II)). The metal ion 15 that is used will depend, in part upon the desired ring metal and the ring ligand. For example, salicylhydroxamic acid ring ligands with a −3 charge binds both to divalent and trivalent metals; pyridyl ketone oxime with a −1 charge binds Mn(II) and Mn(III); and aminohydroxamic acids with a −2 charge tend to bind to divalent cations as ring metals. In an example, a 12-MC-4 macrocycle can be made with gallium, aluminum, or zinc. In the example shown in FIG. 1, the metal ion 15 is gallium.

The ring ligands 14 of the monomeric metallacrown complex 12 may be hydroxamic acid derivatives or oxime derivatives. Examples of hydroxamic acid derivatives include quinaldichydroxamic acid or derivatives thereof, picoline hydroxamic acid or derivatives thereof, salicylhydroxamic acid or derivatives thereof. Examples of salicylhydroxamic acid (H₃shi) and derivatives thereof maleimido-substituted (mshi), ethyne-substituted (eshi), amine-substituted (ashi)) are shown below:

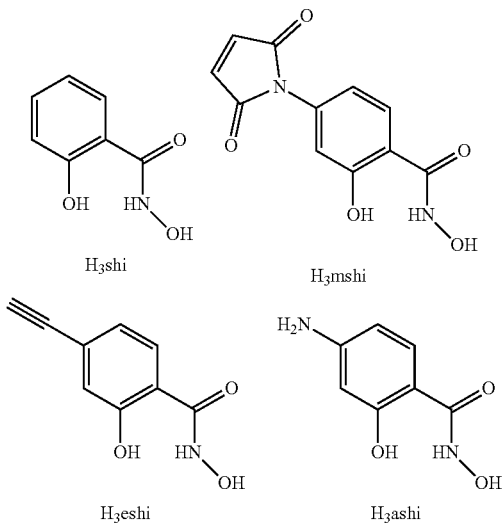

It is to be understood that other salicylhydroxamic acid derivatives may also be used. Examples of oxime derivatives include di-2-pyridyl ketone oxime (Hpko) or methyl (2-pyridyl) ketone oxime. In the dendrimeric metallacrown 10 of FIG. 1, the ring ligands 14 are salicylhydroxamic acid ligands (more specifically, salicylhydroximate). The nitrogen atoms of the ring ligands 14 are shown at reference numeral 17.

The monomeric metallacrown complex 12 can be prepared in order to adopt a variety of ring sizes, including, for example, 9 atoms, 12 atoms, 15 atoms, and 18 atoms. Examples of the monomeric metallacrown complex include 9-MC-3 (9 ring atoms, 3 of which are oxygen atoms), 12-MC-4 (12 ring atoms, 4 of which are oxygen atoms), 15-MC-5 (15 ring atoms, 5 of which are oxygen atoms), and 18-MC-6 (18 ring atoms, 6 of which are oxygen atoms).

This dendrimeric metallacrown 10 also includes a dendron D respectively attached to each of the ring ligands 14 of the metallomacrocycle. As such, the number of dendrons D in the dendrimeric metallacrown 10 will depend upon the number of ring ligands 14 in the monomeric metallacrown complex 12. In an example, the monomeric metallacrown complex 12 includes four ring ligands 14 and four dendrons D, where each dendron D is respectively attached to one of the four ring ligands 14. In one example, each dendron D attached to the respective ring ligands 14 is the same type of dendron D or is in the same dendron family. In another example, at least one of the dendrons D attached to the respective ring ligands 14 is a different type of dendron D from the other dendrons D. In order to attach different dendrons D to the ring ligands 14, the ring ligands 14 should have different linkers for conjugation to the respective, different dendrons D. For example, one ring ligand 14 may include a thiol active linker/group for attachment to a thiol focal-point of one dendron D and another ring ligand 14 may include an azide active linker/group (e.g., an alkyne, an ethynyl, etc.) for attachment to an azide of another dendron D. During the synthesis of the metallacrown complex 12, the ring ligand 14 may be modified in order to have a particular linker/group for attaching a particular dendron D.

Examples of the dendrons D include chiral and achiral dendrons. Some specific examples include a polyamidoamine (PAMAM) dendron, a polypropylenimine (PPI or POPAM) dendron, a poly-L-lysine (PLL) dendron, and a viologen dendron. Other suitable dendrons may include a hybrid of polyamidoamine and POPAM known as POMAM, a phenylacetylene dendron, a polybenzene dendron, a stilbenoid dendron, a polyether dendron, a polyester dendron, a carbohydrate dendron, a porphyrin based dendron, a silane-based dendron, a siloxane dendron, a phosphorus based dendron, or the like. The dendrons D may improve the water solubility, the drug delivery, host-guest chemistry, and biological imaging of the monomeric metallacrown complex 12. The dendrons D may be of any desired generation. For example, the dendron D may range from generation 0 to generation 2, or from generation 0 to generation 3, or from generation 0 to generation 7, or from generation 0 to generation 13. It is believed that the dendron D may be as large as the complex will allow.

It is believed that any dendron D having a focal-point that can chemically attach to a ring ligand 14 of the monomeric metallacrown complex 12 may be used. In the dendrimeric metallacrown 10 including the monomeric metallacrown complex 12, the "focal-point" refers to a functional group that is free (e.g., located at an end of the dendron D) or that can be deprotected to become free, and that (once free) can be chemically attached to an active linker/group of the ring ligand 14 of the metallomacrocycle. Example focal-points include thiols, azides, amines, amides, or any other functional group that can undergo conjugation with the active linker/group of the ring ligand 14.

In the examples disclosed herein, the dendrimeric metallacrown 10 including the monomeric metallacrown complex 12 may also further include bridging ligands 16 coordinated to the central ion 18. The bridging ligand(s) 16 in this dendrimeric metallacrown 10 may be a carboxylic acid or derivatives thereof, and may complete the coordination of the central ion 18. Examples of the carboxylic acid derivative include benzoic acid and benzoic acid derivatives. As such, the number of bridging ligands 16 may be any suitable number to complete the coordination of the central ion 18.

This example of the dendrimeric metallacrown 10 may be formed using a variety of techniques. An example method for making the dendrimeric metallacrown 10 includes chemically attaching a respective focal-point of each dendron D to each of the ring ligands 14. In some examples, the monomeric metallacrown complex is synthesized first, and then the dendrons D are attached. As such, in these examples, prior to chemically attaching the respective focal-point of each dendron D to each of the ring ligands 14, the method comprises synthesizing the monomeric metallacrown complex 12. In other examples, the dendrons D are first attached to free ring ligands to form a ring ligand/dendron complex, and then the ring ligand/dendron complex is used in the synthesis of the monomeric metallacrown complex 12. As such, in these other examples, chemically attaching the respective focal-point of each dendron D to each of the ring ligands 14 involves free ligands and forms the ring ligand/dendron complex, and the method comprises synthesizing the monomeric metallacrown complex 12 using the ring ligand/dendron complex.

Figure 39:
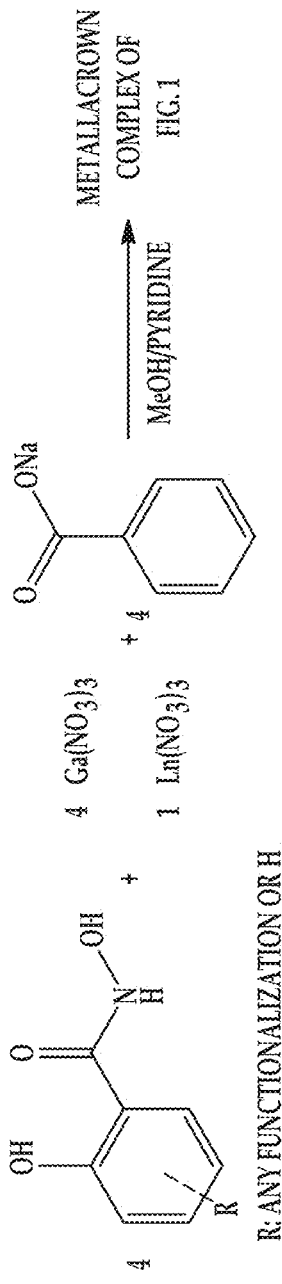
FIG. 39 is a scheme illustrating an example of the synthesis of the monomeric metallacrown complex of FIG. 1.

In an example of the method where the monomeric metallacrown complex 12 is synthesized prior to attachment of the dendrons D, the monomeric metallacrown complex 12 forms via self-assembly, i.e., by dissolving the ring ligands 14 and bridging ligands 16 in a solvent followed by the addition of the appropriate metal salt (for the ring) and the appropriate metal salt (for the central ion). A base may then be added to the solution. The reaction mixture (e.g., the solution and the base) is then stirred for a predetermined time at a predetermined temperature. In an example, the temperature is room temperature (e.g., from about 18° C. to about 22° C.) and the time ranges from about 12 hours to about 24 hours. The reaction mixture is then exposed to a purification method to produce the highly pure monomeric metallacrown complex 12. Examples of suitable purification methods include recrystallization by slow evaporation of the solvent, recrystallization by vapor diffusion, recrystallization by solvent layering, high-performance liquid chromatography (HPLC), or column or flash chromatography. An example of the synthesis of the monomeric metallacrown complex 12 is shown in FIG. 39.

In this example method, the dendrons D may then be attached to the ring ligands 14 of the monomeric metallacrown complex 12. The chemistry involved in dendron attachment will depend upon the focal-point of the dendron D and the ring ligands 14 of the complex 12. As examples, the respective focal-point of the dendron D may be a thiol and the chemical attachment involves the conjugation of the thiol with a thiol active group (e.g., a terminal alkene or an alkyne) of the ring ligand 14; or the respective focal-point of the dendron D is an azide and the chemical attachment involves the conjugation of the azide with an azide active group (e.g., an alkyne, such as an ethynyl) of the ring ligand 14; or the respective focal-point is an amine and the chemical attachment involves the conjugation of the amine with an amine active group of the ring ligand 14; or the respective focal-point is an amide and the chemical attachment involves the conjugation of the amide with an amide active group of the ring ligand 14. It is believed that any suitable conjugation method may be used to couple the dendron D to the ring ligands 14.

In one example, the conjugation method may involve copper(I) catalyzed alkyne-azide cycloaddition. An ethyne functionality of the ring ligand 14 allows for click chemistry coupling of the monomeric metallacrown complex 12 to an azide focal-point of a dendron D. This conjugation method may be performed thermally in the presence of a Cu(I) catalyst and a solvent. The temperature of, and time for the reaction may depend upon the size of the molecules, the copper source, and/or the solvent used.

In other examples, the conjugation method may involve a Michael addition reaction. In an example, a maleimide functionality of the ring ligand 14 allows for coupling of the monomeric metallacrown complex 12 to a thiol focal-point. An example of a thiol focal-point of the dendron D is cysteamine. The thiol-maleimide conjugation may be performed at room temperature or at an elevated temperature (e.g., from about 30° C. to about 40° C.). Elevated temperatures may be more suitable for conjugating longer dendrons D, such as Generation 0.5 or larger. In one example, the monomeric metallacrown complex 12 (including the maleimide functionality) and the thiol-terminated dendron are mixed in a suitable solvent and allowed to react. In another example, the monomeric metallacrown complex 12 (including the maleimide functionality) and the thiol-terminated dendron are mixed, e.g., in a solvent, at an elevated temperature (e.g., about 40° C.) and allowed to react.

The thiol conjugation method may also be performed photocatalytically in the presence of a suitable photoinitiator that has an absorbance spectrum that exhibits good overlap with the emission spectrum of the light source used. In some examples, photocatalysis may involve ultraviolet (UV) light, and the photoinitiator is any molecule that, when exposed to UV light, can form a free radical species that starts a radical addition. Example of this type of photoinitiator may include 2,2-dimethoxy-2-phenylacetophenone (DMPA), diphenyl (2,4,6-trimethylbenzoyl) phosphine oxide (TMDPO), benzophenone (BP), thioxanthone (TX), and azobisisobutyronitrile (AIBN). Any UV light wavelength within the UV range may be used, although higher energy UV light may create undesirable side products. In an example, the UV light is 365 nm. For UV photocatalytic reactions, any solvents are degassed and an oxygen-free atmosphere (e.g., a nitrogen atmosphere) is used. In other examples, photocatalysis may involve visible (VIS) light, and the photoinitiator may include a combination of a photoredox catalyst and a co-initiator. Examples of suitable photoredox catalysts include ruthenium polypyridyl complexes (e.g., $Ru(bpz)_3(PF_6)_2$ and $Ru(bpy)_3Cl_2$), fac-$Ir(ppy)_3$, and Eosin Y (a xanthene dye). Examples of the co-initiator include aryl amines, such as p-toluidine. Any visible light wavelength within the VIS range may be used, although lower energy VIS light may not be energetic enough to excite the photoredox catalyst to a higher energy state. In an example, the VIS light is 460 nm. An oxygen-free atmosphere may or may not be used in VIS light photocatalytic reaction.

It is believed that any terminal alkene or alkyl ring ligand 14 will react with thiol when exposed to suitable light. As one example, a monomeric metallacrown complex 12 including a ring ligand 14 with a terminal alkene (olefin) or alkyne can be coupled via radical addition to any focal-point of the dendron D that can undergo photocatalytic radical formation. In one example, the terminal alkene (of the ring ligand(s) 14) may be reacted with an alkane focal-point (of the dendron D), such as a terminal methyl group.

In an example of the method where the monomeric metallacrown complex 12 is synthesized last, the dendrons D are first chemically attached to free ring ligands. As noted above, the chemistry involved in dendron D attachment will depend upon the focal-point of the dendron D and the free ring ligands being used. Once the dendron/ring ligand complexes are formed, the metallacrown complex 12 is formed via self-assembly. In this example, the dendron/ring ligand complexes and bridging ligands 16 are dissolved in a solvent followed by the addition of the metal salts (for the ring metal ions and the central metal ion). The method may proceed as described herein.

In these example methods, the following materials may be used. Examples of suitable bases include pyridine, triethylamine (TEA), trimethylamine, or other Brønsted bases. Example solvents include dimethyl sulfoxide (DMSO) dimethylformamide (DMF), methanol, water, and combinations thereof. As metal salts for introduction of the ring metals, any salt of the group 13 metals listed herein or the period 4 metals listed herein may be used. As examples, the metal salt may be a triflate, a perchlorate, a mesylate, a besylate, a camsylate, an edisylate, an estolate, an esylate, a napsylate, a tosylate, a fluoride, a chloride, a bromide, an iodide, a nitrate, a sulfate, a carbonate, an acetate, a sulfonate, or a phosphate of any of the group 13 metals listed herein or the period 4 metals listed herein. The metal salt for the introduction of the central ion 18 may be a triflate, a perchlorate, a mesylate, a besylate, a camsylate, an edisylate, an estolate, an esylate, a napsylate, a tosylate, a fluoride, a chloride, a bromide, an iodide, a nitrate, a sulfate, a carbonate, an acetate, a sulfonate, or a phosphate of any of the lanthanides, d-block transition or rare earth metals, or s-block alkali or alkaline earth metals listed herein for the central ion 18.

The dendrimeric metallacrown 10 may be charged, and counterions may be included to form a neutral solid. A charge balance of a negatively charged dendrimeric metallacrown 10 that is formed may be obtained by positively charged counter ion(s) (e.g., pyridinium, sodium ($Na^+$) cations, potassium ($K^+$) cations, etc.) or proton(s) (e.g., supplied by the dendron). A charge balance of a positively charged dendrimeric metallacrown 10 that is formed may be obtained by a negatively charged counter ion. In an example, the dendrimeric metallacrown 10 has a −1 charge, and a sodium cation may stay to compensate for the negative charge. At least in the solid state, the emission spectrum of the dendrimeric metallacrown 10 is dependent on the type of counter ion present. For example, lifetimes and quantum yields may change by substituting sodium cations, for example, with pyridinium cations. In some instances then, the counter ion may be selected to tailor the emission spectrum.

Dendrimeric Metallacrown with a Dimeric Metallacrown Complex

Figure 2:
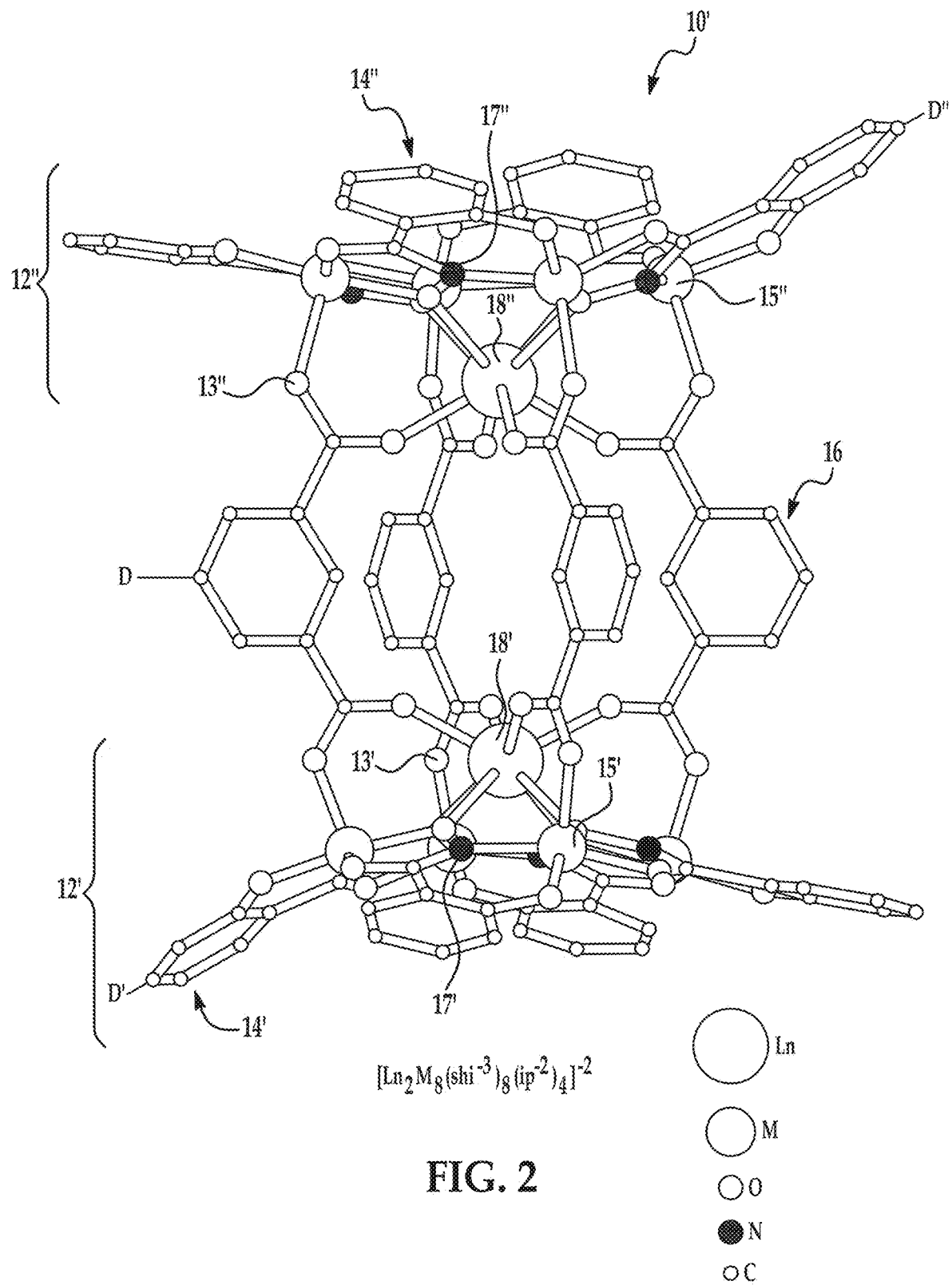
FIG. 2 depicts a dendrimeric metallacrown structure including $[Ln_2M_8(shi^{-3})_8(ip^{-2})_4)]^{-2}$ as the dimeric metallacrown complex, where Ln=a central ion, M=a metal ion, shi=salicylhydroximate, and ip=isophthalate, and dendrons (D, D', D") attached to ring and bridging ligands of the dimeric metallacrown complex.

Another example of the dendrimeric metallacrown disclosed herein includes a dimeric metallacrown complex, which includes a first monomeric metallacrown complex, including: a first central ion; and a first metallomacrocycle attached to the first central ion, wherein the first metallomacrocycle includes a first repeating sub-unit consisting of a first metal ion and a first ring ligand; a second monomeric metallacrown complex, including: a second central ion; and a second metallomacrocycle attached to the second central ion, wherein the second metallomacrocycle includes a second repeating sub-unit consisting of a second metal ion and a second ring ligand; and a bridging ligand attaching the first monomeric metallacrown complex to the second monomeric metallacrown complex; and a dendron respectively attached to i) the bridging ligand; or ii) each of the first ring ligands of the first monomeric metallacrown complex; or iii) each of the second ring ligands of the second monomeric metallacrown complex; or iv) any combination of i, ii, and iii. An example of this dendrimeric metallacrown 10' is shown in FIG. 2.

Throughout this disclosure, the dimeric metallacrown complex may be identified by its central ions (Ln) and its metal ions (M), i.e., $Ln_2M_8$ (e.g., $Y_2Ga_8$, $Ln_2Ga_8$), but it is to be understood that the dimeric metallacrown complex also includes the ring ligands (RL) and the bridging ligands (BL). Moreover, the dendrimeric metallacrown 10' may be identified as, for example, as "$M_8Ln_2$ Generation X (or G:X) dendron MC-cored dendrimer", where Ln is the central ion, M is the metal ion, and X is the generation of the attached dendron, but it is to be understood that the dendrimeric metallacrown 10' also includes the ring ligands (RL) and the bridging ligands (BL). Sometimes, this identifier also includes the ring and/or bridging ligands as well. The dendrimeric metallacrown 10 may also be referred to as $Ln_2M_8(RL)_8(G:X\ dendron)_8$ or $Ln_2M_8(BL)_4(G:X\ dendron)_4$ or $Ln_2M_8(RL)_8(BL)_4(G:X\ dendron)_{4\ or\ 8\ or\ 12}$. These identifiers may not include hydrogens, solvent molecules, and/or counter ions. Some identifiers also include the molecule used to introduce a focal-point to the dendron.

The dimeric metallacrown complex of the dendrimeric metallacrown 10' includes two monomeric metallacrown complexes 12', 12", similar to that shown in FIG. 1, and bridging ligand(s) 16 that bond the two complexes 12', 12" together.

The first monomeric metallacrown complex 12' includes a first central ion 18' and a first metallomacrocycle attached to the first central ion 18', wherein the first metallomacrocycle includes a first repeating sub-unit consisting of a first metal ion 15' and a first ring ligand 14'. The second monomeric metallacrown complex 12" includes a second central ion 18" and a second metallomacrocycle attached to the second central ion 18", wherein the second metallomacrocycle includes a second repeating sub-unit consisting of a second metal ion 15" and a second ring ligand 14".

In the examples of the dendrimeric metallacrown 10', any of the lanthanide ions, d-block transition or rare earth metal ions, or s-block alkali or alkaline earth metal ions disclosed herein for the dendrimeric metallacrown 10 may be used for 18', 18".

Also, in the examples of the dendrimeric metallacrown 10', the first and second ring ligands 14', 14" may be independently selected from any of the ring ligands 14 described herein for the dendrimeric metallacrown 10.

Still further in the examples of the dendrimeric metallacrown 10', the first and second metal ions 15', 15" may be a group 13 metal ion listed herein (e.g., aluminum (Al), or gallium (Ga)) or a period 4 transition metal ion described herein (e.g., scandium (Sc, e.g., Sc(III)), vanadium (V, e.g., V(V)), chromium (Cr, e.g., Cr(III)), manganese (Mn, e.g., Mn(II) or Mn(III)), iron (Fe), cobalt (Co), nickel (Ni), copper (Cu, e.g., Cu(II)), and zinc (Zn, e.g., Zn(II)) for the dendrimeric metallacrown 10.

Still further in the examples of the dendrimeric metallacrown 10', the first monomeric metallacrown complex 12' and the second monomeric metallacrown complex 12" possess the same ring size. For example, the first and second monomeric metallacrown complexes 12', 12" may be 9-MC-3, 12-MC-4, 15-MC-5, and 18-MC-6.

In some examples of the dendrimeric metallacrown 10', the first monomeric metallacrown complex 12' is the same as second monomeric metallacrown complex 12". In other examples of the dendrimeric metallacrown 10', the first monomeric metallacrown complex 12' is different from the second monomeric metallacrown complex 12", and i) the first central ion 18' and the second central ion 18" are different; or ii) the first metal ion 15' and the second metal ion 15" are different; or iii) both i and ii. As a specific example, the ring ligands 14', 14" and the metal ions 15', 15" in the complexes 12', 12" may be the same, but the first and second central ions 18', 18" may be different ions. As another example, the ring ligands 14', 14" and the first and second central ions 18', 18" in the complexes 12', 12" may be the same, but the metal ions 15', 15" may be different from one another. As still another example, the ring ligands 14', 14" in the complexes 12', 12" may be the same, but the metal ions 15', 15" may be different from one another and the first and second central ions 18', 18" may be ions of different natures. It is to be understood that any of these variations of the complexes 12', 12" may be used in any of the dendrimeric metallacrowns 10' disclosed herein, regardless of where the dendrons D, D', D" are attached.

In the examples disclosed herein, the dendrimeric metallacrown 10' further includes the bridging ligand(s) 16. In these examples, the bridging ligand(s) 16 complete the coordination of each of the central ion 18', 18' and also connect the first and second monomeric metallacrown complexes 12', 12" together. As such, the number of bridging ligands 16 may be any suitable number to complete coordination of the central ion and monomer attachment. In the example shown in FIG. 2, four bridging ligands 16 are present. In another example dendrimeric metallacrown 10' including two 15-MC-5 complexes 12', 12", one bridging ligand 16 may be present. As examples, the bridging ligand(s) 16 for the dendrimeric metallacrown 10' is a dicarboxylic acid derivative. Examples of the dicarboxylic acid derivative include the isophthalic acid and isophthalic acid derivatives. Examples of isophthalic acid ($H_2$ip or ip) and derivatives thereof (e.g., thiocyanate-substituted ($H_2$itip or itip), maleimido-substituted ($H_2$mip or mip or MIP), ethyne-substituted ($H_2$eip or eip), vinyl-substituted ($H_2$vip or vip)) are shown below:

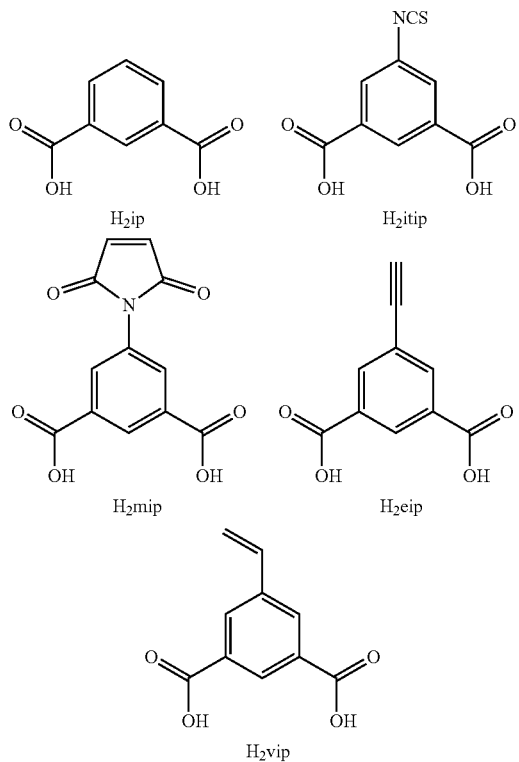

This dendrimeric metallacrown 10' also includes a dendron D respectively attached to i) the bridging ligand 16; or ii) each of the first ring ligands 14' of the first monomeric metallacrown complex 12'; or iii) each of the second ring ligands 14" of the second monomeric metallacrown complex 12"; or iv) any combination of i, ii, and iii. In FIG. 2, while dendrons D, D', and D" are shown respectively attached to one ligand 16, 14', 14", it is to be understood that when all of the dendrons D, D' and/or D" are included, each of the bridging ligand(s) 16, first ring ligands 14', and second ring ligands 14" will have a respective dendron D, D' and/or D" attached.

In some examples, dendron D is attached to the bridging ligand(s) 16, and the first and second monomeric metallacrown complexes 12', 12" do not have dendrons D', D" attached thereto. In other examples, dendron D' is attached to the ring ligands 14', and the bridging ligand(s) 16 and the second monomeric metallacrown complex 12" do not have dendrons D, D" attached thereto. In still other examples, dendron D" is attached to the ring ligands 14", and the bridging ligand(s) 16 and the first monomeric metallacrown complex 12' do not have dendrons D, D' attached thereto. In yet further examples, dendrons D, D' are respectively attached to the bridging ligand(s) 16 and the first monomeric metallacrown complex 12', and the second monomeric metallacrown complex 12" does not have dedrons D" attached thereto. In other examples, dendrons D, D" are respectively attached to the bridging ligand(s) 16 and the second monomeric metallacrown complex 12", and the first monomeric metallacrown complex 12' does not have dendrons D' attached thereto. In other/additional examples, dendrons D', D" are respectively attached to the first monomeric metallacrown complex 12' and the second monomeric metallacrown complex 12", and the bridging ligand(s) 16 do not have dendrons D attached thereto.

In one example, each dendron D, D' and/or D" is the same type of dendron or is in the same dendron family. In other examples, at least one of the dendrons D or D' or D" is a different type of dendron from the other dendrons. As mentioned above, different dendrons D, D', D" may be attached to the dendrimeric metallacrown 10', depending upon the focal-point of the dendron D, D' and/or D" and the linker of the bridging ligand(s) 16, first ring ligands 14' and/or second ring ligands 14". During the synthesis of the dendrimeric metallacrown 10', the bridging ligand(s) 16 and/or the ring ligands 14 and/or 14' may be modified in order to have a particular linker/group for attaching a particular dendron D, D', D". As one example, orthogonal functionality of the ring ligands 14' and/or 14" (e.g., one includes an alkyne and the other includes an alkene) may be used to attach different dendrons D', D", for example, where one attaches through a copper catalyzed azide-alkyne cycloaddition reaction and the other attaches through a thiol-ene addition reaction.

It is to be understood that any of the dendrons D set forth herein for the dendrimeric metallacrown 10 may be used for the dendrons D and/or D' and/or D" of the dendrimeric metallacrown 10'. It is believed that any dendron D and/or D' and/or D" having a focal-point that can chemically attach to the bridging ligand(s) 16 and/or the first ring ligands 14' and/or the second ring ligands 14" may be used. In the dendrimeric metallacrown 10' including the dimeric metallacrown complex, the "focal-point" refers to a functional group that is free (e.g., located at an end of the dendron D and/or D' and/or D") or that can be deprotected to become free, and that (once free) can chemically attach to an active linker/group of the bridging ligand(s) 16 and/or the first ring ligands 14' and/or the second ring ligands 14". Example focal-points include thiols, azides, amines, amides, alkanes, or any other functional group that can undergo bioconjugation or radical addition with the active linker/group of the bridging ligand(s) 16 and/or the first ring ligands 14' and/or the second ring ligands 14". It is believed that any suitable conjugation or coupling method may be used to couple the dendron D, D', D" to the ring ligands 14 and/or 14' and/or to the bridging ligand(s) 16, and may be selected, in part, based on the focal-point and the active linker/group to be coupled to the focal-point.

Some examples of the dendron combinations for the dendrimeric metallacrown 10' include the following.

In a first example, the dendrons include a first dendron D attached to the bridging ligand(s) 16; a second dendron D' attached to each of the first ring ligands 14' of the first monomeric metallacrown complex 12'; and a third dendron D" attached to each of the second ring ligands 14" of the second monomeric metallacrown complex 12". In one aspect of this first example, the first dendron D, the second dendron D', and the third dendron D" may be of the same family (e.g., all of the dendrons are polyamidoamine dendrons). In another aspect of this first example, the first dendron D (attached to the bridging ligand(s) 16) is of a first family, and the second and third dendrons D', D" (attached respectively to the first and second ring ligands 14', 14") are of a second family that is different than the first family. For example, the first dendron D may be a PPI (or POPAM) dendron and the second and third dendrons D', D" may be PLL dendrons. In yet another aspect of this first example, the first dendron D (attached to the bridging ligand(s) 16) is of a first family, one of the second and third dendrons D', D" (attached respectively to the first and second ring ligands 14', 14") is of the first family, and another one of the third and second dendrons D", D' is of a second family that is different than the first family. For example, the first and second dendrons D, D' may be polyester dendrons and the third dendron D" may be a polyamidoamine dendron. In still another aspect of this first example, each of the first dendron D (attached to the bridging ligand(s) 16), the second dendron D' (attached to the first ring ligands 14'), and the third dendron D" (attached to the second ring ligands 14') is of a different family. For example, the first dendron D may be a POMAM dendron, the second dendron D' may be a PPI (or POPAM) dendron, and the third dendron D" may be a polyamidoamine dendron.

In a second example, the dendrons include a first dendron D' attached to each of the first ring ligands 14' of the first monomeric metallacrown complex 12', and a second dendron D" attached to each of the second ring ligands 14" of the second monomeric metallacrown complex 12". In this second example, no dendron(s) D are attached to the bridging ligand(s) 16. In an aspect of this second example, the first dendron D' is of a first family, and the second dendron D" is of a second family that is different than the first family. For example, the first dendron D' may be a PPI (or POPAM) dendron and the second dendron D" may be a PLL dendron. In another aspect of this second example, the first and second dendrons D' are of the same family (e.g., all of the dendrons D', D" are polyamidoamine dendrons).

This example dendrimeric metallacrown 10' may be formed using a variety of techniques. An example method for making the dendrimeric metallacrown 10' includes chemically attaching a respective focal-point of each dendron D, D', D" to i) the bridging ligands 16; or ii) each of the first ring ligands 14' of the first monomeric metallacrown complex 12'; or iii) each of the second ring ligands 14" of the second monomeric metallacrown complex 12"; or iv) any combination of i, ii, and iii.

In some examples, the dimeric metallacrown complex is synthesized first, and then the dendrons D, D', D" are attached. As such, in these examples, prior to chemically attaching the respective focal-point of each dendron D, D', D", the method comprises synthesizing the dimeric metallacrown complex. In other examples, the dendrons D, D', D" are first attached to free bridging ligands, free first ring ligands, and/or free second ring ligands to form respective ligand/dendron complexes, and then the ligand/dendron complex is used in the synthesis of the dimeric metallacrown complex. As such, in these other examples, chemically attaching the respective focal-point of each dendron D and/or D' and/or D" involves free bridging ligands, free first ring ligands, free second ring ligands, or combinations thereof, and forms i) a bridging ligand/dendron complex; or ii) a first ring ligand/dendron complex; or iii) a second ring ligand/dendron complex; or iv) any combination of i, ii, and iii; and wherein the method further comprising synthesizing the dimeric metallacrown complex using i) the bridging ligand/dendron complex; or ii) the first ring ligand/dendron complex; or iii) the second ring ligand/dendron complex; or iv) any combination of i, ii, and iii.

Figure 40:
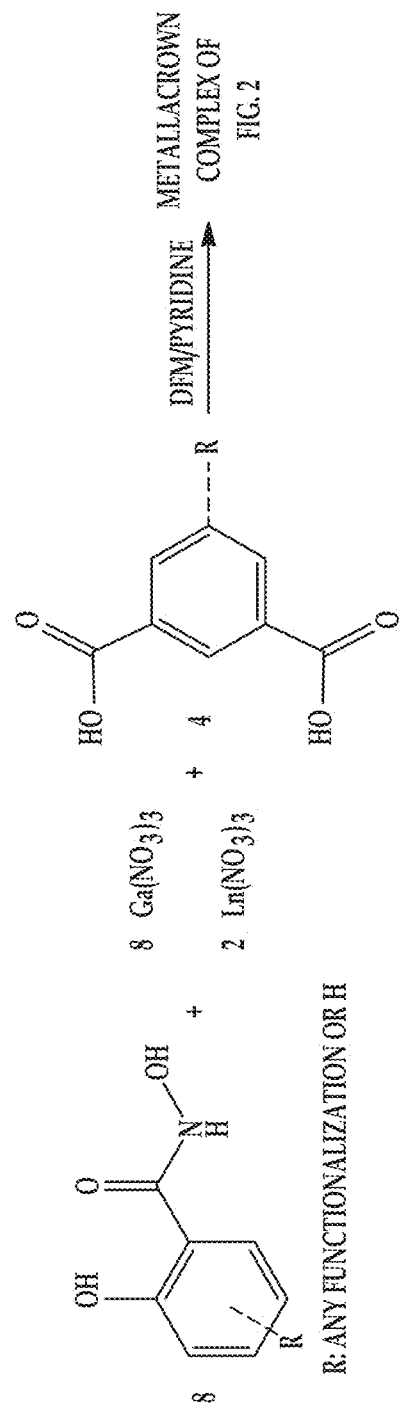
FIG. 40 is a scheme illustrating an example of the synthesis of the dimeric metallacrown complex of FIG. 2.

In an example of the method where the dimeric metallacrown complex is synthesized prior to attachment of the dendrons D and/or D' and/or D", the dimeric metallacrown complex forms via self-assembly, i.e., by dissolving the ring ligands 14', 14" and bridging ligands 16 in a solvent followed by the addition of the metal salts for the ring metal ions 15', 15" and central metal ions 18', 18". A base may then be added to the solution. The reaction mixture (e.g., the solution and the base) is then stirred for a predetermined time at a predetermined temperature. In an example, the temperature is set to room temperature and the time ranges from about 12 hours to about 24 hours. The reaction mixture is then exposed to a purification method to produce the highly pure monomeric metallacrown complex 12. Examples of suitable purification methods include recrystallization by slow evaporation of the solvent, recrystallization by vapor diffusion, recrystallization by solvent layering, high-performance liquid chromatography (HPLC), or flash chromatography. An example of the synthesis of the dimeric metallacrown complex is shown in FIG. 40. FIG. 40 illustrates an example where the ring ligands 14', 14" are the same, the metal ions 15', 15" are the same, and the Ln(III) ions 18', 18" are the same. Examples of the dimeric metallacrown complex of the dendrimeric metallacrown 10' shown in FIG. 2 include $[Ln_2Ga_8(shi^{-3})_8(ip)_4]$, $[Ln_2Ga_8(shi^{-3})_8(mip)_4]$, $[Ln_2Ga_8(shi^{-3})_8(eip)_4]$, and $[Ln_2Ga_8(shi^{-3})_8(vip)_4]$.

In the example method of FIG. 40, the dendrons D may then be attached to the bridging ligand(s) 16 and/or the dendrons D' may then be attached to the first ring ligands 14' and/or the dendrons D" may then be attached to the second ring ligands 14". The chemistry involved in the dendron attachment will depend upon the focal-point of the dendron D and/or D' and/or D" and the bridging 16 and/or ring ligands 14', 14" of the dimeric complex. As examples, the respective focal-point of the dendron D and/or D' and/or D" may be a thiol and the chemical attachment involves a conjugation of the thiol with a thiol active group (e.g. a maleimide, an alkene, or an alkyne) of the bridging 16 and/or ring ligands 14', 14"; or the respective focal-point of the dendron D and/or D' and/or D" is an azide and the chemical attachment involves a conjugation of the azide with an azide active group (e.g., an alkyne, such as an ethynyl) of the bridging 16 and/or ring ligands 14', 14"; or the respective focal-point of the dendron D and/or D' and/or D" is an amine and the chemical attachment involves a conjugation of the amine with an amine active group of the bridging 16 and/or ring ligands 14', 14"; or the respective focal-point of the dendron D and/or D' and/or D" is an amide and the chemical attachment involves a conjugation of the amide with an amide active group of the bridging 16 and/or ring ligands 14', 14".

Figure 41:
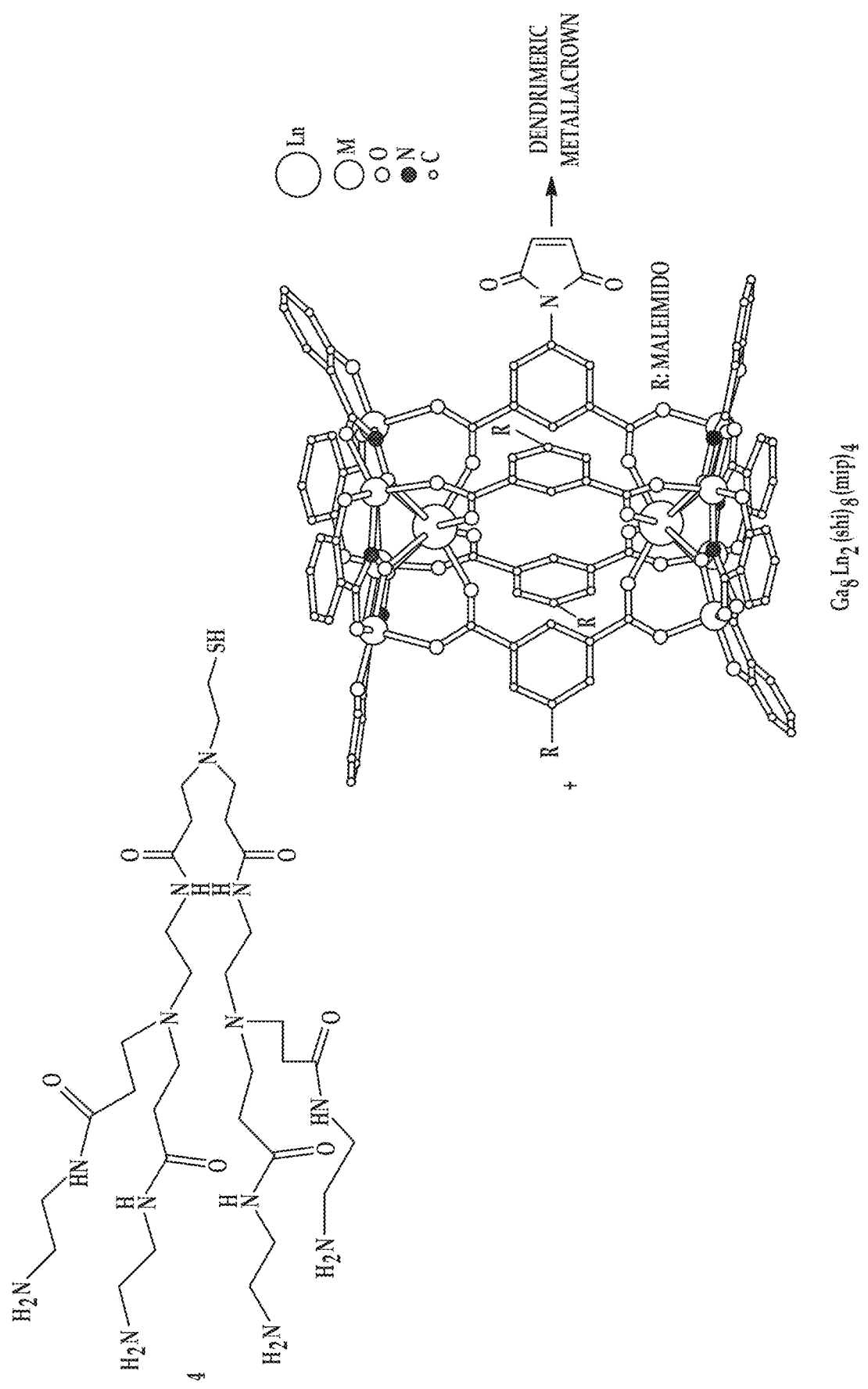
FIG. 41 is a scheme illustrating an example of the attachment of a dendron a bridging ligand of a dimeric metallacrown complex.

An example of the attachment of the dendron D to the bridging ligands 16 of dimeric metallacrown complex is shown in FIG. 41. In FIG. 41, each of the bridging ligands 16 has been modified with a maleimide group (R), and the thiol end group of each polyamidoamine dendron will respectively attach to one of the double bonded carbon atoms of the maleimide. The reaction taking place in FIG. 41 is a thiol coupling reaction to the alkene of the maleimide group. This may be accomplished thermally as described herein. A similar reaction between a thiol and an alkyne could also be performed. In other examples, this type of dendrimeric metallacrown could be generated through a photocatalytic thio-ene reaction initiated with visible light and $Ru(bpy)_3Cl_2$ as the photoredox catalyst. It is to be understood, however, that any of the conjugation methods for coupling the dendron D to the monomeric metallacrown complex 12 may be used to couple the dendron (s) D and/or D' and/or D" to the dimeric metallacrown complex.

In an example of the method where the dimeric metallacrown complex is synthesized last, first the dendrons D are chemically attached to free bridging ligands (to form a dendron/bridging ligand complex), and/or the dendrons D' are chemically attached to free first ring ligands (to form a dendron/first ring ligand complex), and/or the dendrons D" are chemically attached to free second ring ligands (to form a dendron/second ring ligand complex). If dendrons are not desired on the bridging ligand 16 or the first ring ligands 14' or the second ring ligands 14', then dendrons will not be attached to the particular ligand at this point. As noted above, the chemistry involved in dendron D, D", D" attachment will depend upon the focal-point of the dendron D, D", D" and the respective ligands being used.

Once the desired dendron/ligand complex(es) is/are formed, the dimeric metallacrown complex is formed via self-assembly as described herein. In one example, the dendron/bridging ligand complex, the dendron/first ring ligand complexes, and the dendron/second ring ligand complexes are dissolved in a solvent followed by the addition of the appropriate metal salts for the ring metal ions and the central metal ions.

In another example, the dendron/bridging ligand complex and the first and second ring ligands (without dendrons being attached) are dissolved in a solvent followed by the addition of the appropriate metal salts for the ring metal ions and the central metal ions. In still another example, the dendron/bridging ligand complex, the dendron/first ring ligand complexes and second ring ligands (without dendrons being attached) are dissolved in a solvent followed by the addition of the metal salts for the ring metal ions and the central metal ions. In yet another example, the dendron/bridging ligand complex, the dendron/second ring ligand complexes and first ring ligands (without dendrons being attached) are dissolved in a solvent followed by the addition of the metal salts for the ring metal ions and the central metal ions. In still another example, the bridging ligand (without dendrons being attached), the dendron/first ring ligand complexes, and the dendron/second ring ligand complexes are dissolved in a solvent followed by the addition of the metal salts for the ring metal ions and the central metal ions. In another example, the bridging ligand (without dendrons being attached), the first ring ligands (without dendrons being attached), and the dendron/second ring ligand complexes are dissolved in a solvent followed by the addition of the metal salts for the ring metal ions and the central metal ions. In each of these examples, the methods may proceed as previously described.

Figure 42A:
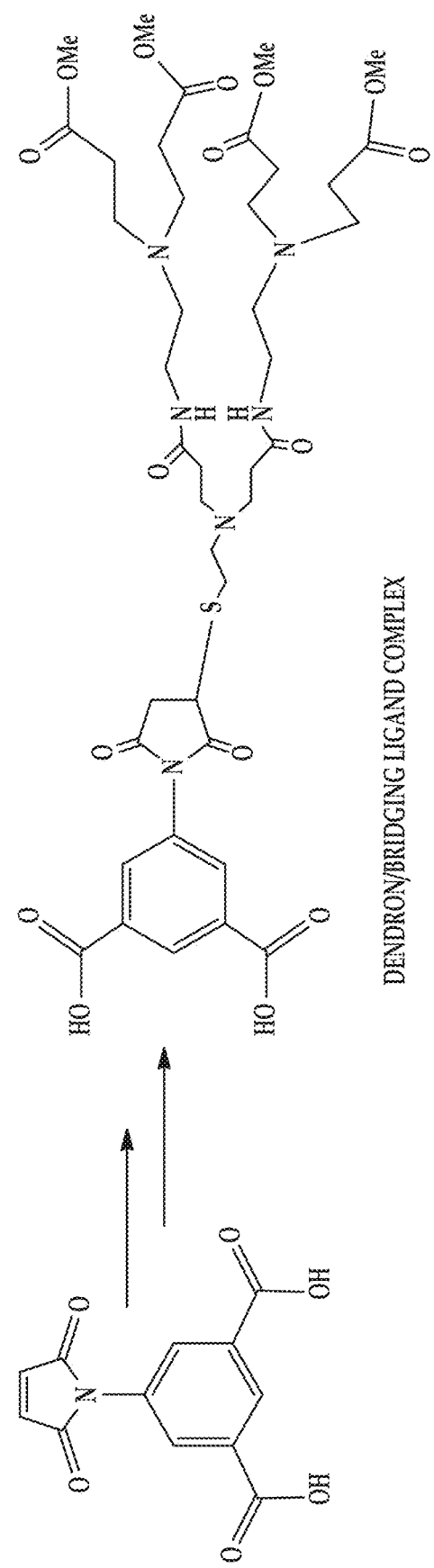
FIG. 42A is a scheme illustrating an example of the attachment of a dendron to a free bridging ligand to form a dendron/bridging ligand complex.
Figure 42B:
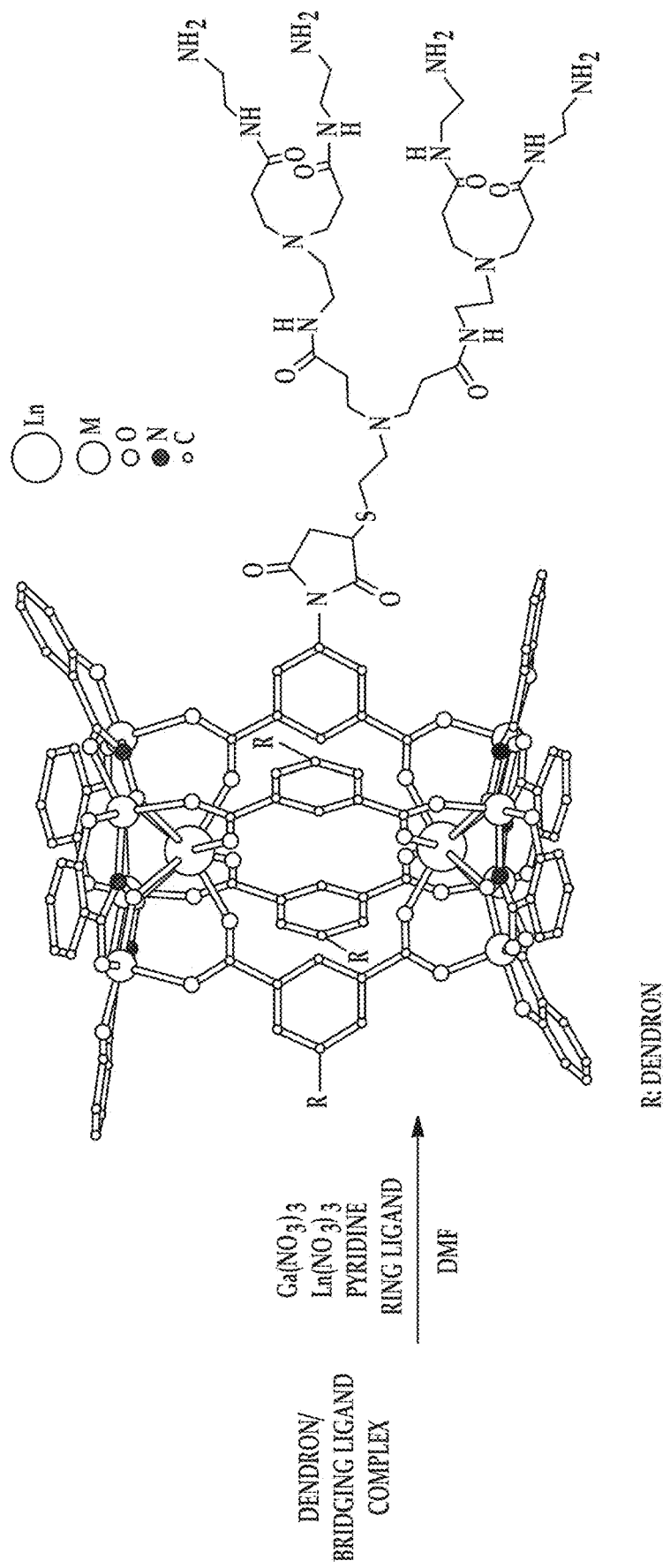
FIG. 42B is a scheme illustrating an example of the formation of a dendrimeric metallacrown using the dendron/bridging ligand complex of FIG. 42A, free first ring ligands, free second ring ligands, a metal salt, and a lanthanide salt.

Together, FIG. 42A and FIG. 42B illustrate an example of the attachment of the dendron D to the free bridging ligands to form a dendron/bridging ligand complex (FIG. 42A), and the subsequent formation of the dendrimeric metallacrown 10' using the dendron/bridging ligand complex, the free first ring ligands, free second ring ligands, metal salt, and lanthanide salt (FIG. 42B).

In FIG. 42A and FIG. 42B, the various components self-assemble to form an example of the dendrimeric metallacrown 10', which includes two monomeric metallacrown complexes 12', 12" connected together by the dendron-bound bridging ligand(s). In FIG. 42B, one dendron is shown, and the other three dendrons are respectively attached at each R.

In another additional example of the method, the dendron D' or D" is respectively chemically attached to the first ring ligands 14' of the first monomeric metallacrown complex 12', or to the second ring ligands 14" of the second monomeric metallacrown complex 12", or both, and the method further comprises synthesizing the dimeric metallacrown complex with free bridging ligands. In this example, the first monomeric metallacrown complex 12' and the second metallacrown complex 12" may be formed in accordance with the method disclosed herein so that one or both of the complexes 12', 12" has dendrons D', D" attached thereto. For example, this method may utilize pre-formed monomeric metallacrown complexes 12', 12" (described in reference to FIG. 1) and then have the dendron D' or D" attached thereto, e.g., via any suitable conjugation method. Alternatively, this example method may involve attaching the dendron D' or D" to the free first and/or second ring ligands, and then forming the monomeric metallacrown complexes 12', 12". These complexes 12', 12" (at least one of which has a dendron attached thereto) can be mixed with the free bridging ligands, which will bind the complexes 12', 12" together to form the dendrimeric metallacrown 10' having dendrons attached to one or both of the complexes 12', 12".

In the example methods to form the dendrimeric metallacrown 10', any of the materials (e.g., bases, solvents, metal salts, lanthanide metal salts, etc.) disclosed herein may be used.

A charge balance of the dendrimeric metallacrown 10' that is formed may be obtained by a positively or negatively charged counter ion, depending upon the charge of the metallacrown 10'. In an example, the dendrimeric metallacrown 10' has a −2 charge, and sodium cations may stay to compensate for the negative charge. At least in the solid state, the emission spectrum of the dendrimeric metallacrown 10' is dependent on the type of counter ions present. For example, lifetimes and quantum yields may change by substituting sodium cations, for example, with pyridinium cations. In some instances then, the counter ions may be selected to tailor the emission spectrum.

Figure 23:
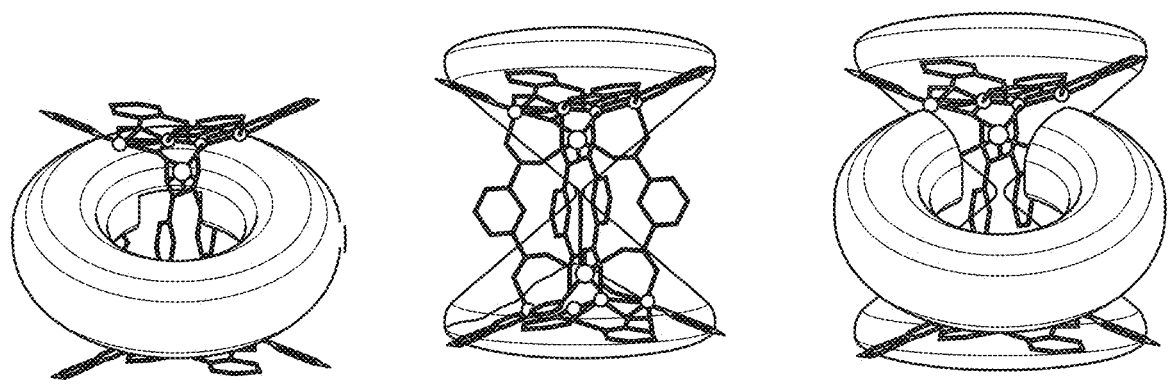
FIG. 23 schematically depicts topologically distinct dendrimeric metallacrowns showing (from left to right) striped, hourglass, and asymmetric dendrimers made with 4, 8, and 12 points of attachment, respectively.

Referring briefly to FIG. 23, several topologically distinct dendrimeric metallacrown-cored dendrimers are schematically shown. From left to right, striped, hourglass, and asymmetric dendrimers can be made with 4, 8, and 12 points of attachment, respectively.

Figure 24:
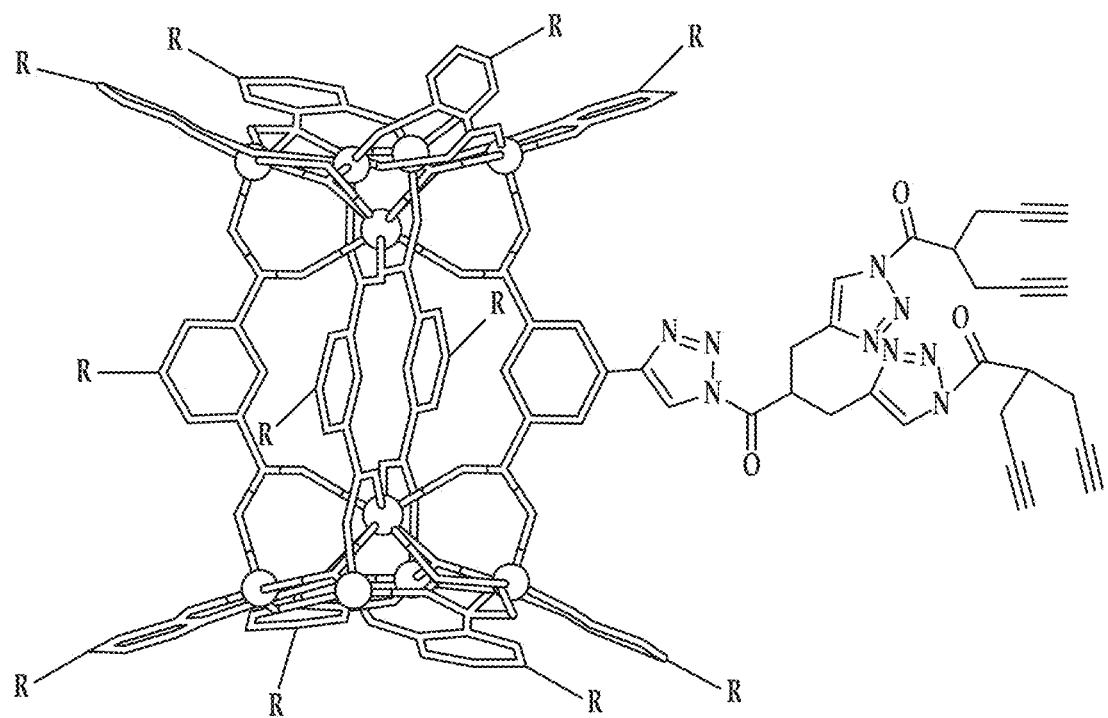
FIG. 24 depicts the structure of an alkyne terminated dendrimeric metallacrown, which may be considered a symmetric dendrimer since dendrons (represented, in part, by "R") growing in both the ring and bridge positions are the same.
Figure 25:
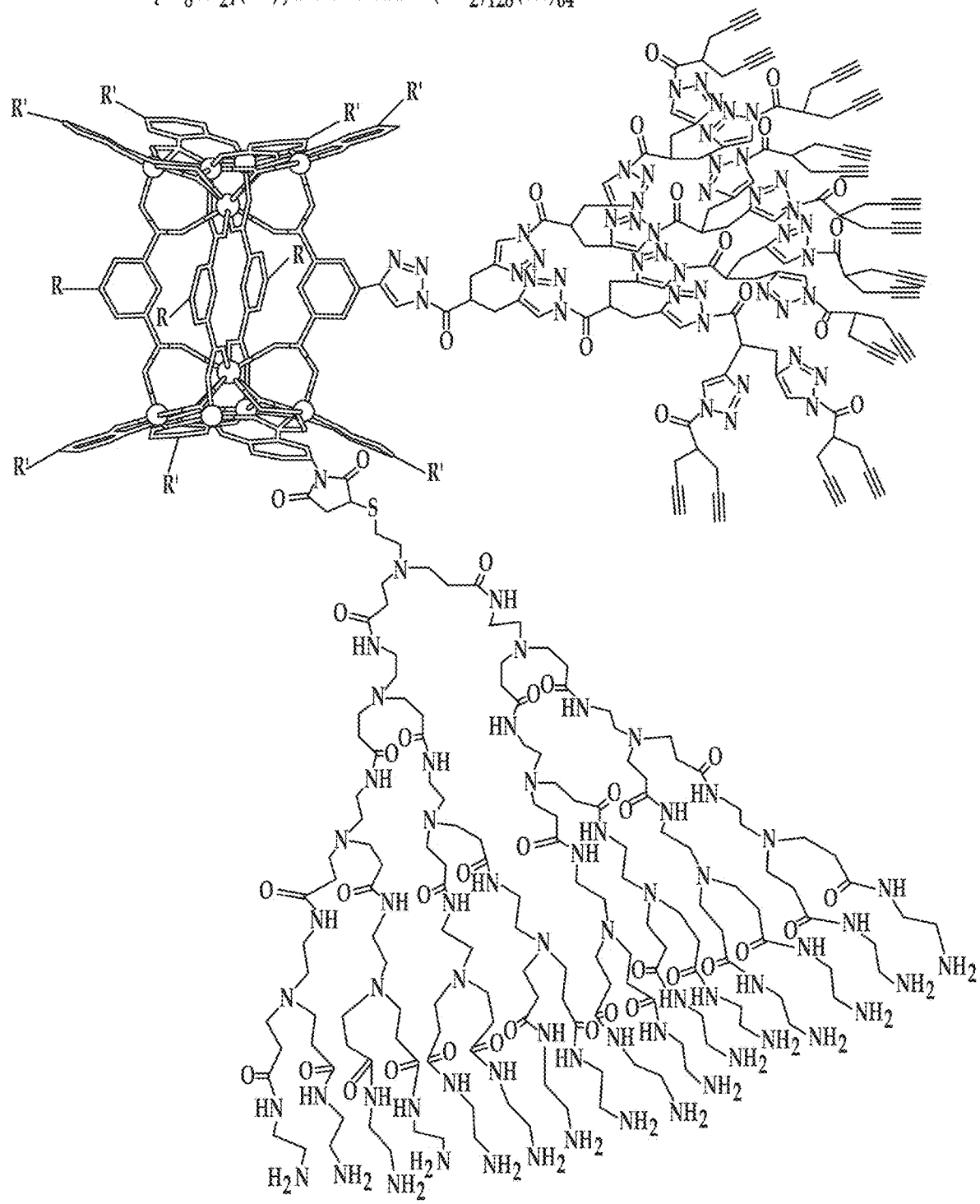
FIG. 25 depicts the structure of an alkyne terminated and amine terminated Janus dendrimer, which may be considered an asymmetric dendrimeric metallacrown.

FIG. 24 and FIG. 25 depict some specific examples of the dendrimeric metallacrowns 10'. Both examples are alkyne terminated. The example shown in FIG. 24 may be considered symmetrical, because the same dendron (R) is attached to each of the first and second ring ligands and the bridging ligands. The example shown in FIG. 25 may be considered asymmetrical, because the dendron (R') attached to each of the first and second ring ligands is different from the dendron (R) that is attached to the bridging ligands.

Dendrimeric Metallacryptand

Another example of the complex disclosed herein may be formed with a metallacryptand instead of a metallamacrocycle. In this example, the dendrimeric metallacryptand comprises a metallacryptate complex including at least one central ion, and a metallacryptand attached to the at least one central ion; and a dendron respectively attached to each of the ring ligands of the metallacryptand. The central ion(s) may be any of the lanthanide ions, d-block transition or rare earth metal ions, or s-block alkali or alkaline earth metal ions disclosed herein.

The metallacryptand is formed of metal ions and bi- or polycyclic multidentate ligands. The metal ions may be any of the metal ions set forth herein for the dendrimeric metallacrowns 10, 10'. The ring ligands in the metallacryptand may be hydroxamic acid ligands, such as SHI or picHA, and the dendron may be any of the examples disclosed herein and may be attached via any suitable conjugation method.

Some examples of the dendrimeric metallacryptand are shown in FIG. 26A through FIG. 26D.

In the dendrimeric metallacryptand of FIG. 26A, the metallacryptate complex includes three sodium central cations and a metallacryptand, which includes gallium metal ions and salicylhydroxamic acid ligands. While the dendron D is shown attached to one of the ring ligands, it is to be understood that respective dendrons are attached to each of the ring ligands. Moreover, in this particular metallacryptate complex example, the sodium cation can be replaced with any of the lanthanide ions disclosed herein.

FIG. 26B depicts another example of a dendrimeric metallacryptand (on the left), with only one of the dendrons shown for clarity. This example includes manganese ions as the central ions. These central ions are part of a manganese oxide core with the composition $\{Mn_{16}(O^{2-})_{12}(MeO^-)_{16}\}$. This core is encapsulated by a metallacryptate, which is shown at the right side of FIG. 26B. The metallacryptate includes 10 manganese metal ions and 12 dipyridylketonediolate ion ligands. The overall dipyridylketonediolate ion complex is $[Mn_4{}^{II}Mn_{22}{}^{III}(pdol)_{12}(\mu_3OCH_3)_{12}(\mu_3-O)_{10}(\mu_4-O)_6(N_3)_6]$ ($pdol^{2-}$=dipyridylketonediolate ion). While the dendron D is shown attached to one of the ring ligands, it is to be understood that respective dendrons are attached to each of the ring ligands.

Figure 26C:
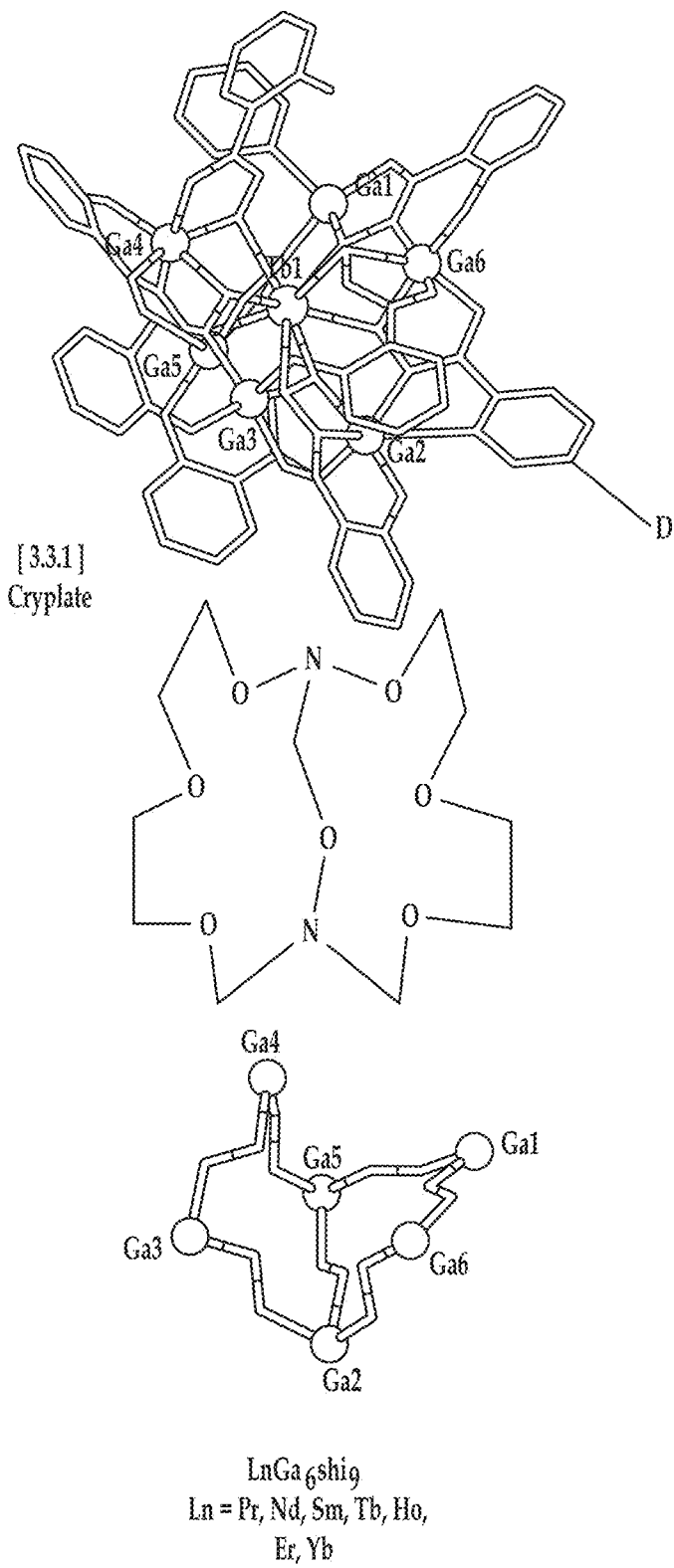

FIG. 26C depicts another example of a dendrimeric metallacryptand (on the top), with only one of the dendrons shown for clarity. This example shows a terbium ion as the central ion, although any lanthanide ion may be used. The bottom of FIG. 26C depicts the structure of the metallacryptate includes 6 gallium metal ions and 9 salicylhydroxamic acid ligands. The center structure depicts the [3.3.1] cryptate that the metallacryptate is based on. While the dendron D is shown attached to one of the ring ligands, it is to be understood that respective dendrons are attached to each of the ring ligands.

Figure 26D:
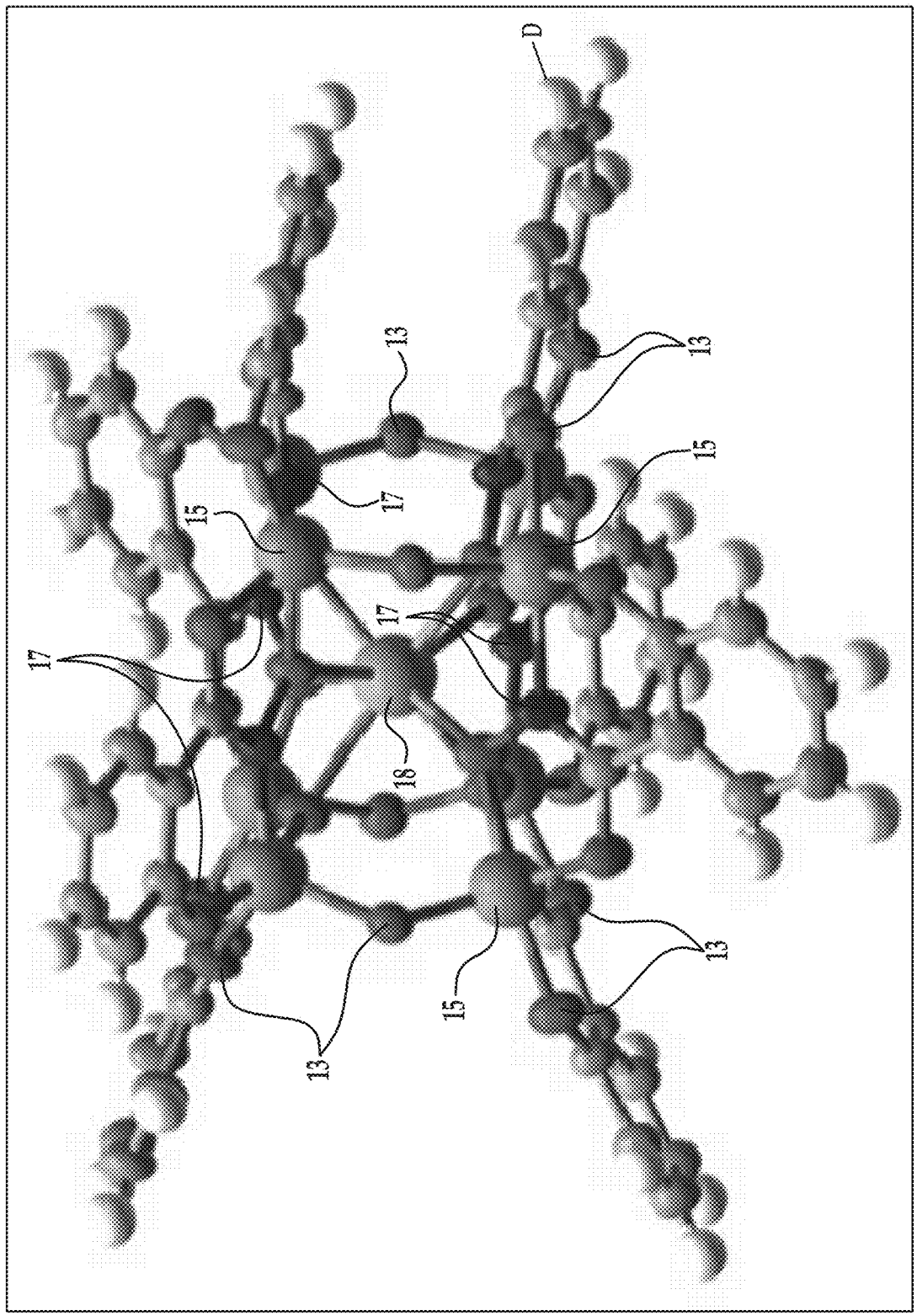

FIG. 26D depicts still another example of a dendrimeric metallacryptand, with no dendrons shown for clarity. This example has the composition: $[Ln(III)Ga(III)_8(shi)_8(OH)_4]^{1-}$. While the dendron D is shown attached to one of the ring ligands, it is to be understood that respective dendrons are attached to each of the ring ligands.

While four example metallacryptates have been shown and described for the dendrimeric metallacryptands, it is to be understood that other metallacryptates may be used in the dendrimeric metallacryptands disclosed herein.

Optical Imaging Agents

Any of the dendrimeric metallacrowns or dendrimeric metallacryptands disclosed herein that include the lanthanide central ion(s) may be useful as an optical imaging agent in biological or other experimental conditions. This is due, in part, to the fact that these complexes exhibit absorption and the characteristic luminescent emission of the lanthanide ion(s). In these instances, the dendrimeric metallacrowns or dendrimeric metallacryptands may be incorporated into a carrier, which may be a liquid carrier (e.g., a solvent of the complex or metallacryptand) or a solid carrier (which can contain, e.g., encapsulate, the complex or metallacryptand).

In one example, the optical imaging agent includes a carrier and a dendrimeric metallacrown incorporated into the carrier. In this example, the dendrimeric metallacrown includes a) the monomeric metallacrown complex, which includes a central lanthanide ion and a metallomacrocycle attached to the central lanthanide ion, wherein the metallomacrocycle includes a repeating sub-unit consisting of a metal ion and a ring ligand selected from the group consisting of a hydroxamic acid derivative and an oxime derivative; and b) a dendron respectively attached to each of the ring ligands of the metallomacrocycle. Any example of the dendrimeric metallacrown 10 including the monomeric metallacrown complex may be used in the optical imaging agent.

In another example, the optical imaging agent includes a carrier and a dendrimeric metallacrown incorporated into the carrier. In this example, the dendrimeric metallacrown includes a) a dimeric metallacrown complex, which includes a first monomeric metallacrown complex, including a first central lanthanide ion and a first metallomacrocycle attached to the first central lanthanide ion, wherein the first metallomacrocycle includes a first repeating sub-unit consisting of a first metal ion and a first ring ligand; a second monomeric metallacrown complex, including a second central lanthanide ion and a second metallomacrocycle attached to the second central lanthanide ion, wherein the second metallomacrocycle includes a second repeating sub-unit consisting of a second metal ion and a second ring ligand; and a bridging ligand attaching the first monomeric metallacrown complex to the second monomeric metallacrown complex; and b) a dendron respectively attached to i) the bridging ligand; or ii) each of the first ring ligands of the first monomeric metallacrown complex; or iii) each of the second ring ligands of the second monomeric metallacrown complex; or iv) any combination of i, ii, and iii. Any example of the dendrimeric metallacrown 10' including the dimeric metallacrown complex may be used in the optical imaging agent.

In still another example, the optical imaging agent may include the carrier and any example of the dendrimeric metallacryptand disclosed herein.

As examples, the dendrimeric metallacrowns or dendrimeric metallacryptands may be incorporated into a solution (e.g., DMF, dimethyl sulfoxide (DMSO), methanol, ethanol, water, and combinations thereof) or into a bead or other solid of another composition (e.g., latex, silica, polystyrene, etc.). The bead or other solid may encapsulate the dendrimeric metallacrown or dendrimeric metallacryptand. In an in vitro application, the solution or solid (either of which contains the dendrimeric metallacrown or dendrimeric metallacryptand) may be added to a medium containing cells that are to be imaged, and the cells incubated. The incubated cells may then be analyzed using any suitable optical imaging technique, such as epifluorescence microscopy or confocal fluorescence microscopy. As such, examples of the method for using the optical imaging agents disclosed herein include incubating cells in a medium with the optical imaging agent for a predetermined time, and exposing the incubated cells to an optical imaging technique.

While in vitro imaging applications have been described, it is to be understood that the optical imaging agent may be used for in vivo imaging applications as well (similar to other dendrimers that contain the dendrons discussed herein). For in vivo imaging applications, the dendrimeric metallacrowns or dendrimeric metallacryptands may be incorporated into a biologically compatible solution, or into a biologically compatible solid. The solution or solid may then be introduced through injection (e.g., intravenous injection), or another suitable mechanism that delivers the complexes to a desirable location in vivo.

It is to be understood that while several methods of making the dendrimeric metallacrowns 10, 10' have been disclosed herein, and that the methods may be combined in any given order that will form the dendrimeric metallacrown 10, 10' with the dendron(s) attached to the desired ligands of the dendrimeric metallacrown 10, 10'.

To further illustrate the present disclosure, examples and prophetic examples are given herein. It is to be understood that these examples and prophetic examples are provided for illustrative purposes and are not to be construed as limiting the scope of the present disclosure.

EXAMPLES AND PROPHETIC EXAMPLES

Example 1

Dendron Synthesis with Specific Focal-Points
1—Thiol Focal-Point

Figure 3:
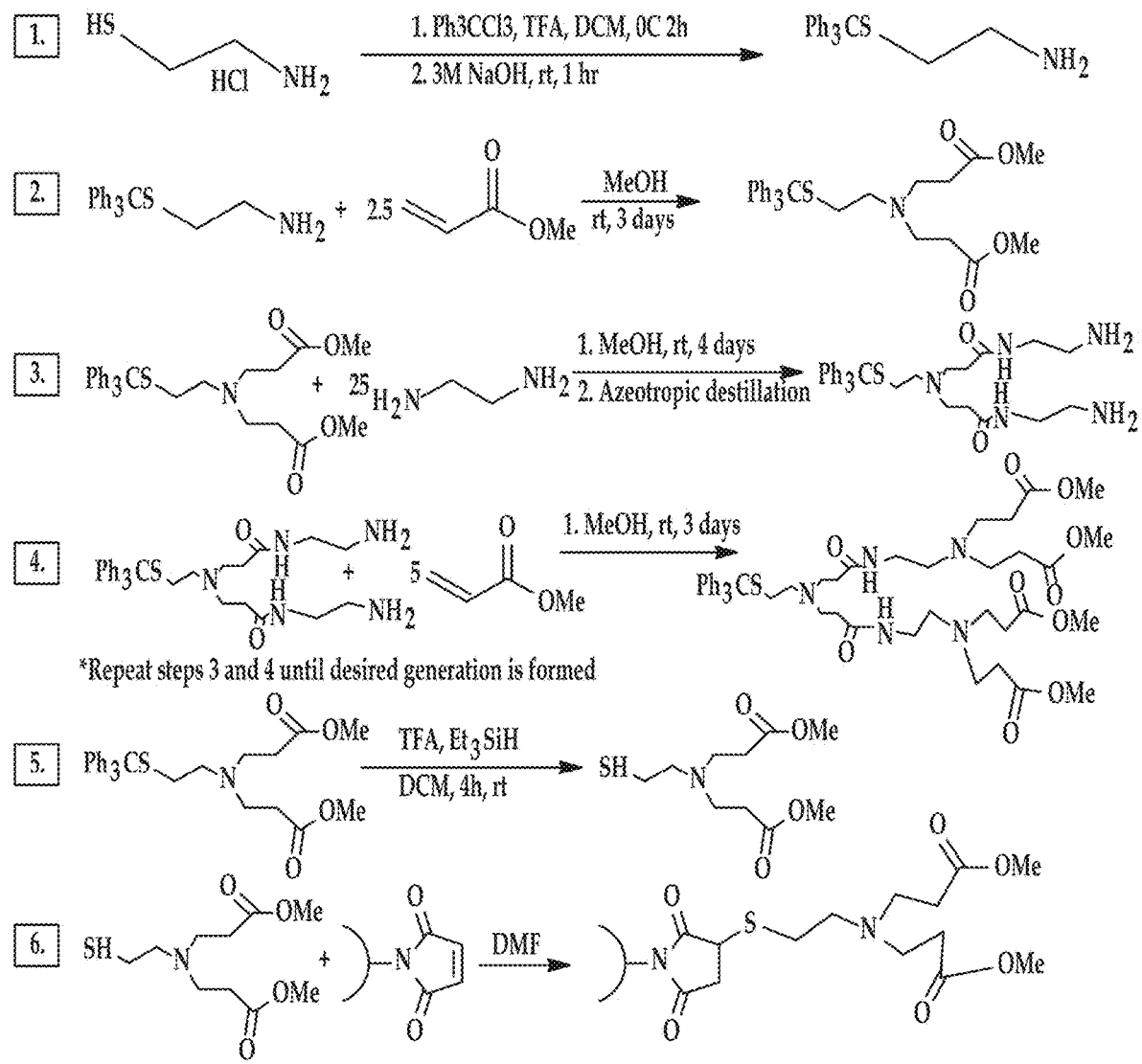
FIG. 3 depicts the synthesis of a trityl protected polyamidoamine dendron, and its subsequent deprotection and attachment to a maleimide appendage of a metallacrown complex.

FIG. 3 illustrates the synthesis for the divergent growth of polyamidoamine dendrons with a thiol focal-point protected with a trityl group. Steps 1 through 4 of this synthesis were performed to form a generation 0.5 trityl protected polyamidoamine dendron. In this synthesis (as shown at step 1), it was found that the protection of the cysteamine core was necessary to avoid undesired reaction to occur at the thiol site. The synthesis of the dendron after thiol protection involved an alkylation step with methyl acrylate on every amine site (step 2), followed by an amidation of each ester group with ethylenediamine (step 3). These processes result in the formation n of a generation 0 (G:0) polyamidoamine dendron with a protected thiol focal-point. The alkylation and amidation steps are repeated until the desired generation is obtained. In this example, the alkylation shown at step 4 was performed, which formed a generation 0.5 (G:0.5) polyamidoamine dendron with a protected thiol focal-point. The ester terminated generations are referred to as half generations, while the amine terminated generations are referred to as full generations.

Figure 4A:
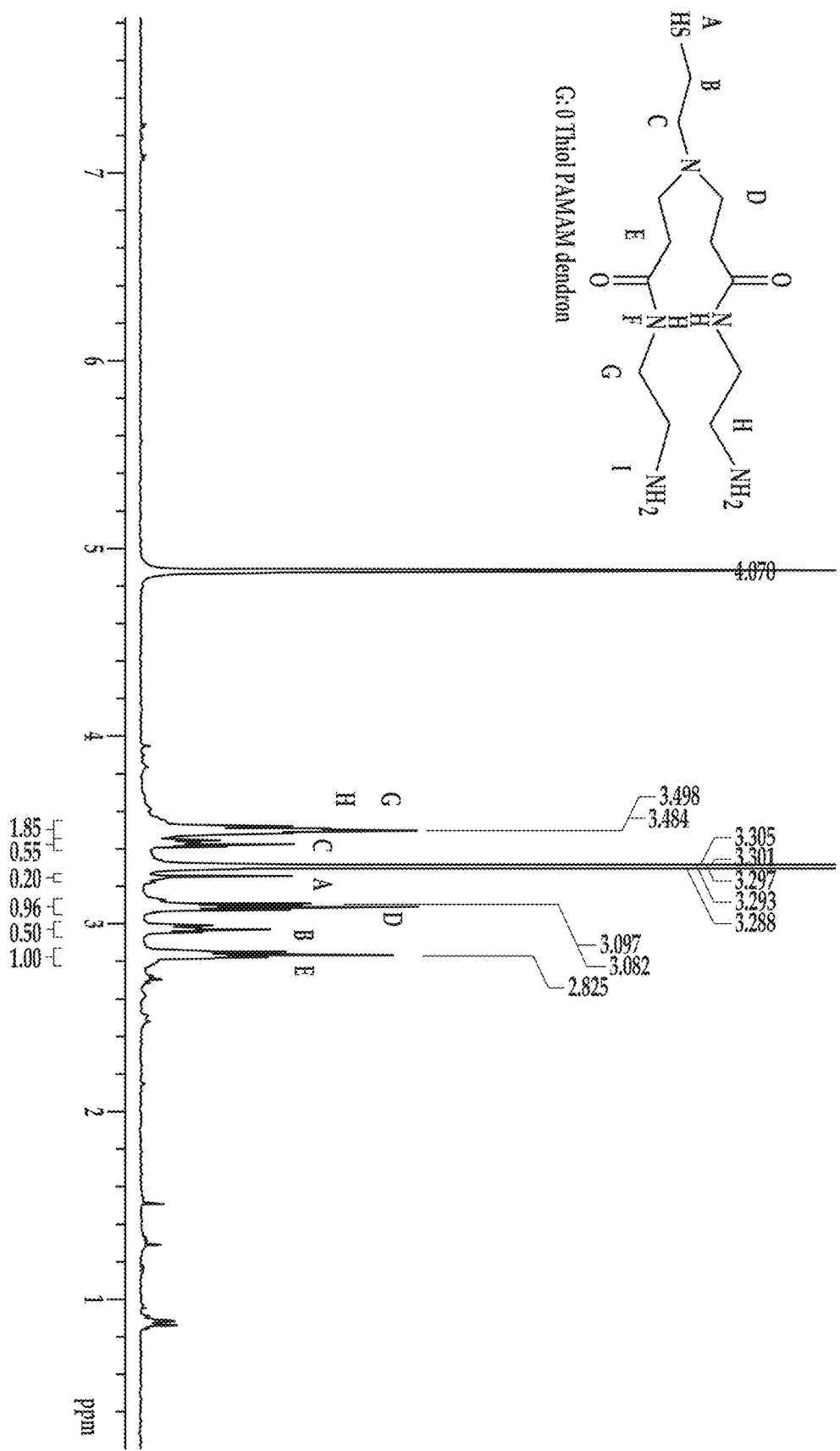
FIG. 4A depicts the Nuclear magnetic resonance (NMR) spectrum of a Generation 0 (G:0) polyamidoamine dendron with a thiol focal-point.

In this example, deprotection of the generation 0 polyamidoamine dendron (including the protected thiol focal-point) was performed with trifluoroacetic acid (TFA), triethylsilane (Et$_3$SiH), and dichloromethane (DCM) for 4 hours at room temperature. FIG. 4A depicts the Nuclear magnetic resonance (NMR) of the resulting Gen: 0 polyamidoamine dendron including the thiol focal-point. The NMR results confirm the formation of the Gen: 0 polyamidoamine dendron including the thiol focal-point. The peaks for "l" are not visible in FIG. 4A since those hydrogens can undergo proton exchange with the solvent or any water leftover in the sample.

Figure 4B:
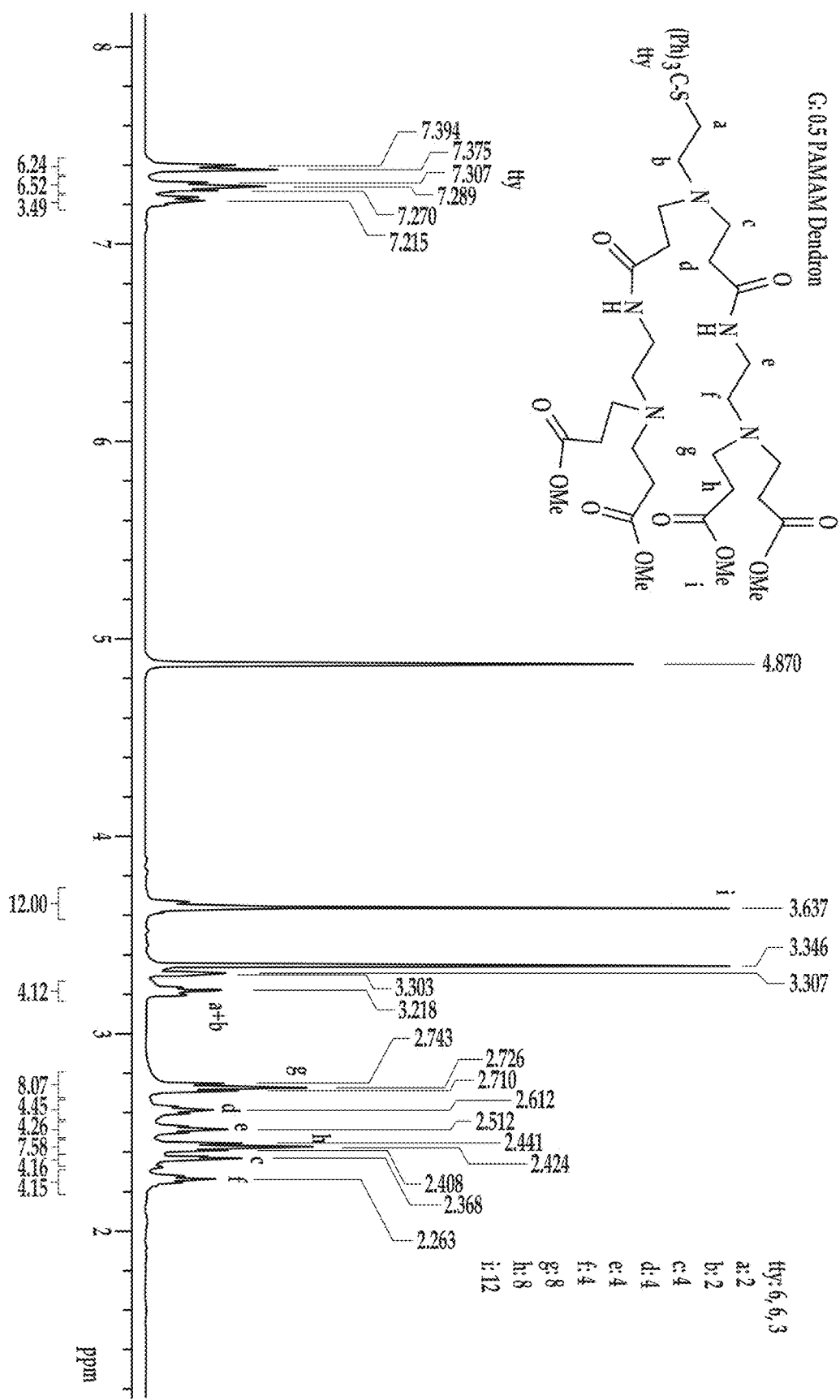
FIG. 4B depicts the NMR spectrum of a trityl protected G:0.5 polyamidoamine dendron with a thiol focal-point.

In this example, deprotection of the generation 0.5 (G:0.5) polyamidoamine dendron (including the protected thiol focal-point) was not performed. NMR was performed on the generation 0.5 (G:0.5) polyamidoamine dendron (including the protected thiol focal-point). FIG. 4B depicts the Nuclear magnetic resonance (NMR) of the thiol focal-point trityl protected Gen: 0.5 polyamidoamine dendron. NMR results (in FIG. 4B) confirm the formation of the thiol focal-point trityl protected Gen: 0.5 polyamidoamine dendron.

In this example, the coupling of the deprotected thiol focal-point polyamidoamine dendrons to a metallacrown complex was not performed. However, once the desired dendron generation is obtained, the protecting group can be removed from the thiol, and coupling to a thiol-active linker/group can be achieved. In FIG. 3, step 5 illustrates an example of how deprotection could occur and step 6 illustrates how the thiol focal-point could link to a maleimide appendage of the metallacrown complex.

The method shown in FIG. 3 has also been used with dendrons of much larger generations, e.g., up to G:2.5.

2—Thiol Focal-Point

Figure 5A:
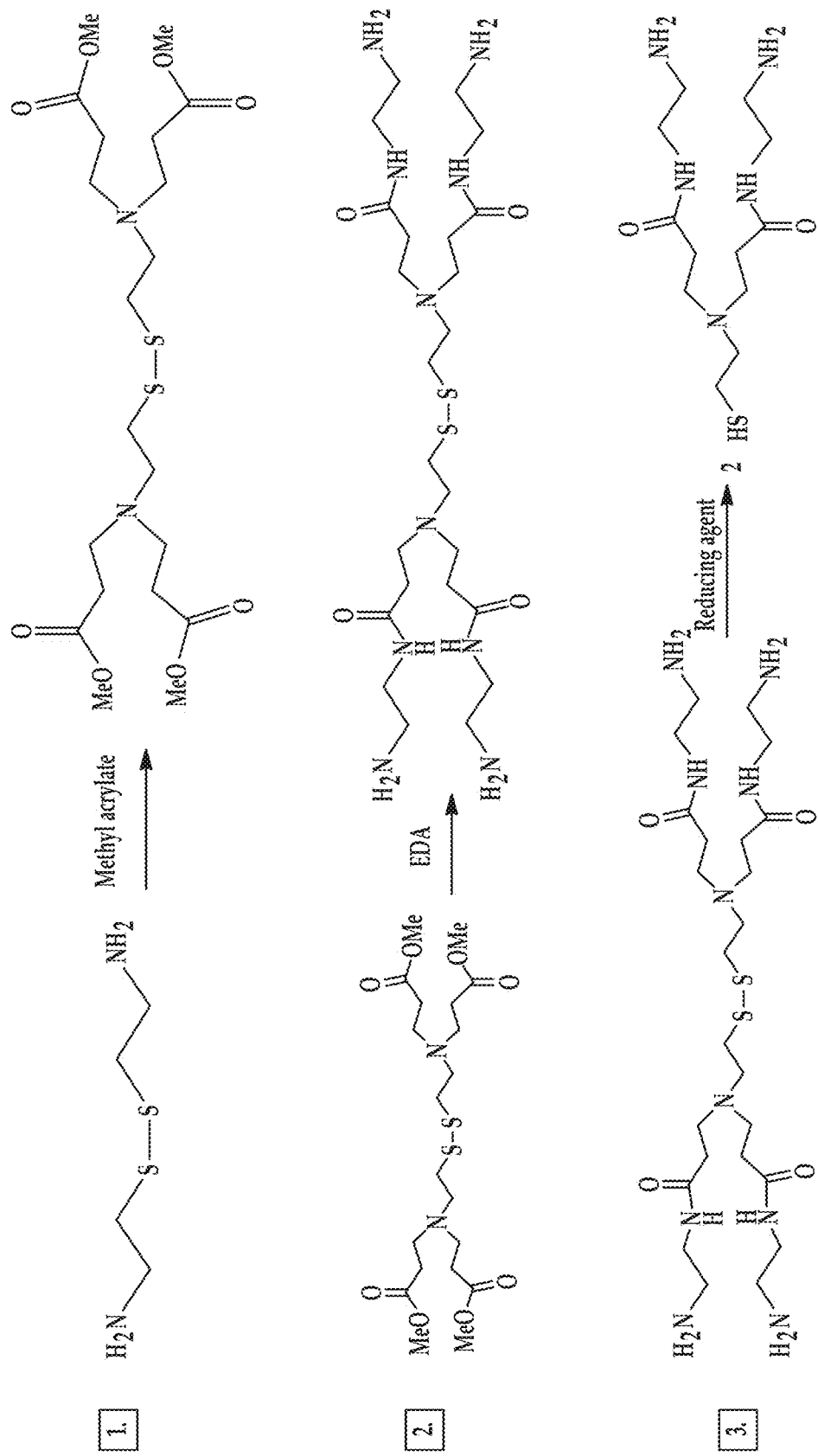
FIG. 5A depicts the synthesis of a disulfide polyamidoamine dendron, and its subsequent reduction.

FIG. 5A illustrates the synthesis for the divergent growth of disulfide polyamidoamine dendrons. The synthesis began with the treatment of a disulfide cysteamine core with methyl acrylate to obtain half generation dendrons (step 1). This was followed by addition of ethylenediamine to obtain a full generation dendron (step 2). The alkylation and amidation steps can be repeated until the desired generation is obtained.

Figure 5B:
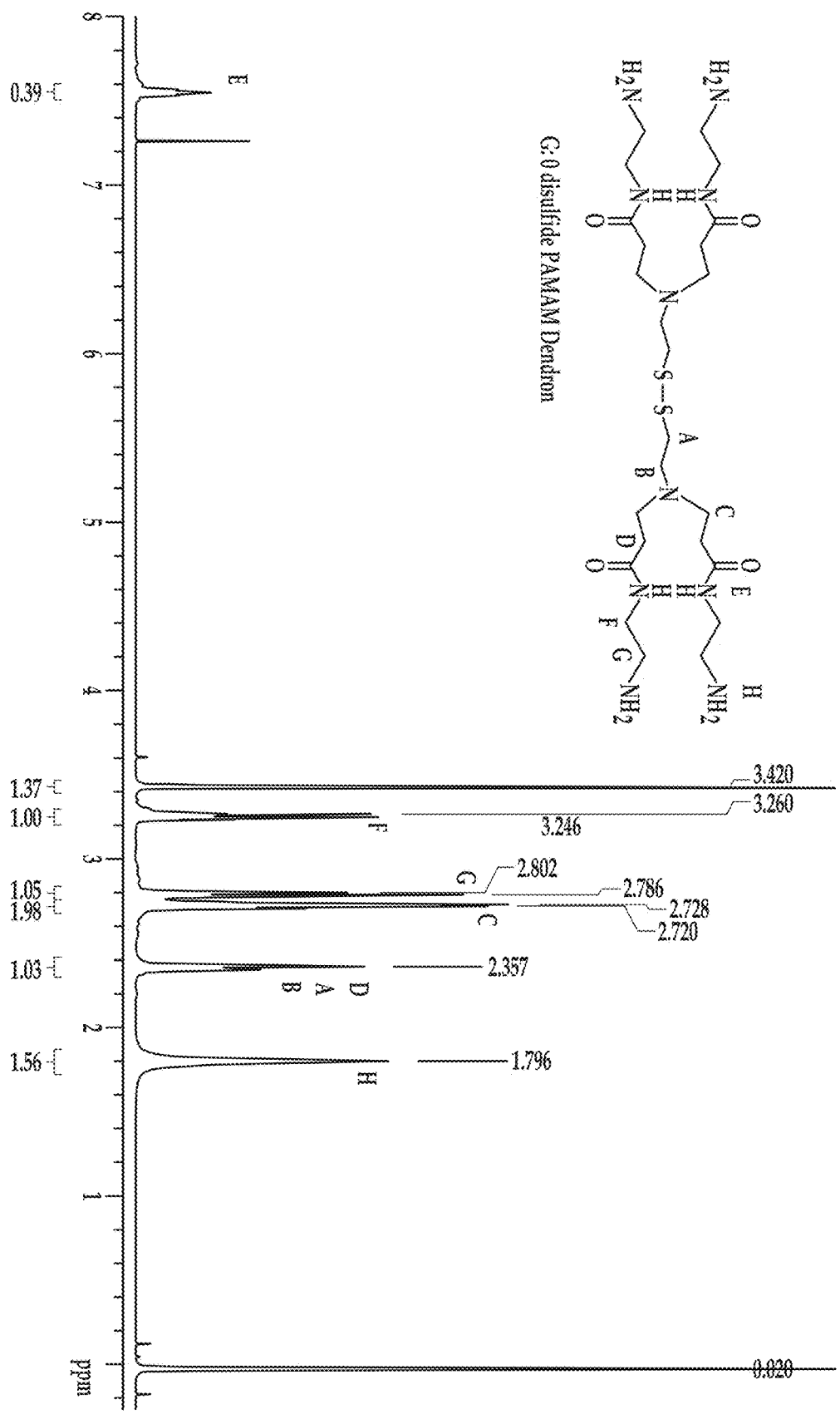
FIG. 5B depicts the NMR spectrum of a G:0 disulfide polyamidoamine dendron.

NMR was performed on the generation 0 disulfide polyamidoamine dendron. FIG. 5B depicts the Nuclear magnetic resonance (NMR) of the Gen: 0 disulfide polyamidoamine dendron. The NMR results confirm the formation of the Gen: 0 disulfide polyamidoamine dendron.

The final product (i.e., the Gen: 0 disulfide polyamidoamine dendron) was the treated with a reducing agent, such as, Tris(2-carboxyethyl)phosphine hydrochloride (TCEP), to collect two equivalents of free thiol focal-point polyamidoamine dendrons.

In this example, coupling of the free thiol focal-point polyamidoamine dendrons to respective metallacrown complexes was not performed. However, once the desired disulfide dendron generation is obtained, the dendron can be reduced, and the free thiol focal-point dendrons can be coupled to a thiol-active linker/group of a metallacrown.

3—Azide Focal-Point

Figure 6:
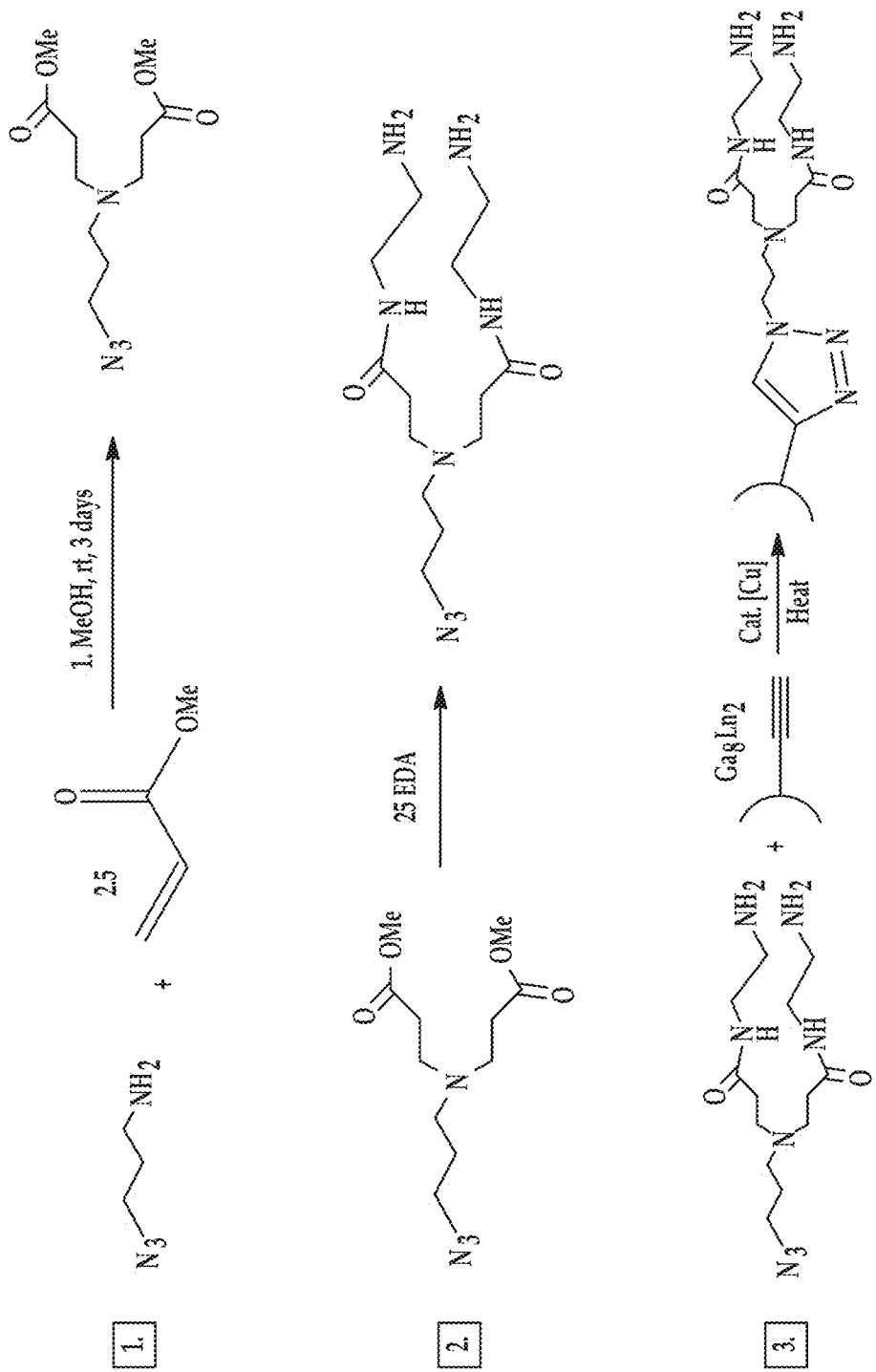
FIG. 6 depicts the synthesis of a polyamidoamine dendron with an azide focal-point, and its subsequent attachment to an alkyne appendage of a metallacrown.
Figure 7:
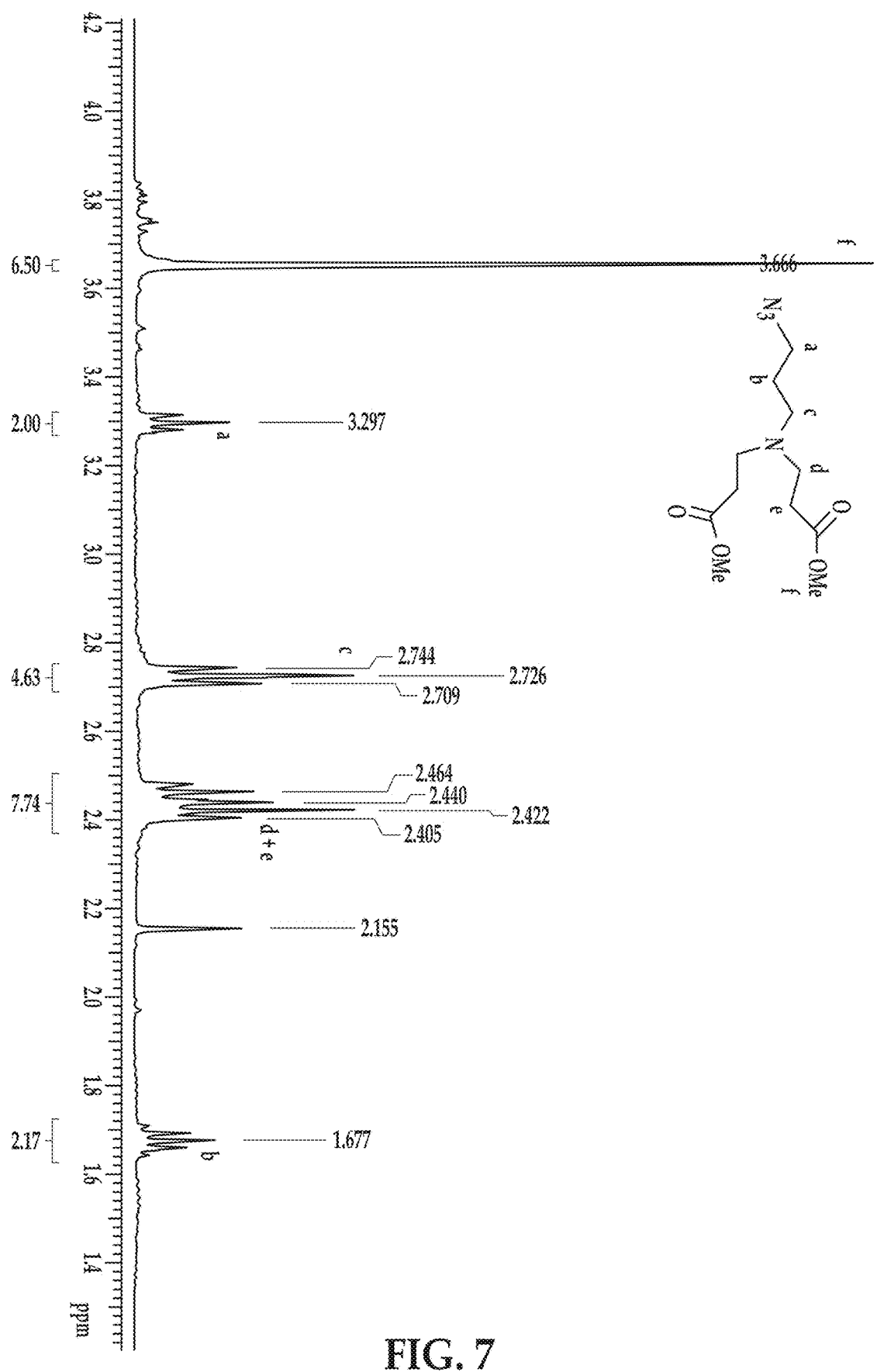
FIG. 7 depicts the NMR spectrum of a G:−0.5 polyamidoamine dendron with an azide focal-point.

FIG. 6 illustrates the synthesis for the divergent growth of polyamidoamine dendrons with an azide focal-point. The synthesis began with treatment of a 3-azidopropylamine with methyl acrylate to form a half generation dendron (step 1). The generation −0.5 azide terminated polyamidoamine dendron was studied suing NMR, and the results are shown in FIG. 7. The NMR results confirm the formation of the Gen −0.5 azide terminated polyamidoamine dendron.

After alkylation, the product of step 1 in FIG. 6 can be treated with ethylenediamine to end up with a full generation dendron (step 2). The alkylation and amidation steps can be repeated until the desired generation is obtained.

While step 3 in FIG. 6 was not performed, the final dendron can then be used to do a copper catalyzed azide-alkyne cycloaddition or some other azide coupling reaction to link the dendron to an azide active linker of the metallacrown complexes disclosed herein.

The method shown in FIG. 7 has also been used with dendrons of much larger generations, e.g., up to G:1.5.

4—Amine Focal-Point

Figure 8A:
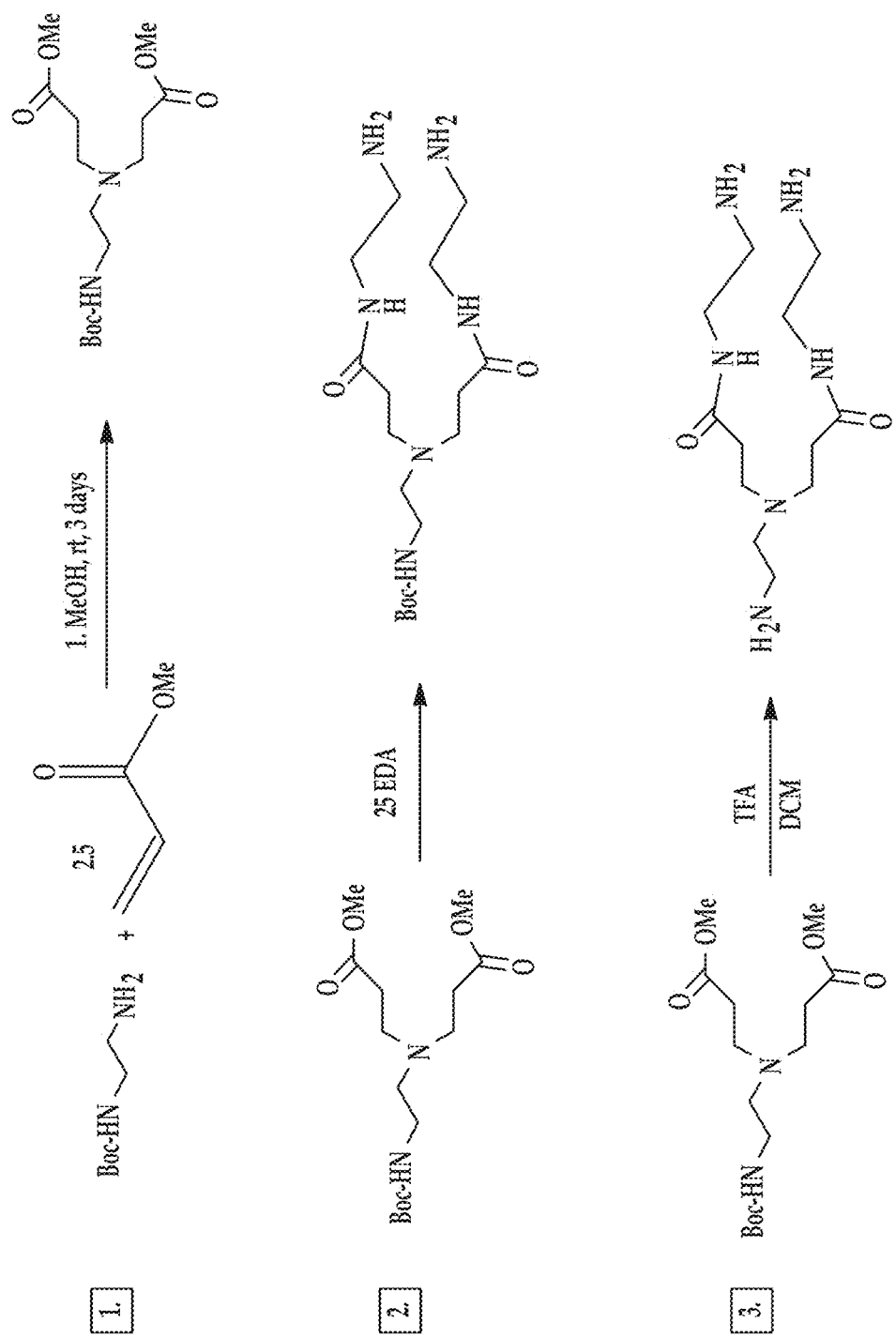
FIG. 8A depicts the synthesis of a polyamidoamine dendron with an amine focal-point, and its subsequent deprotection.
Figure 8B:
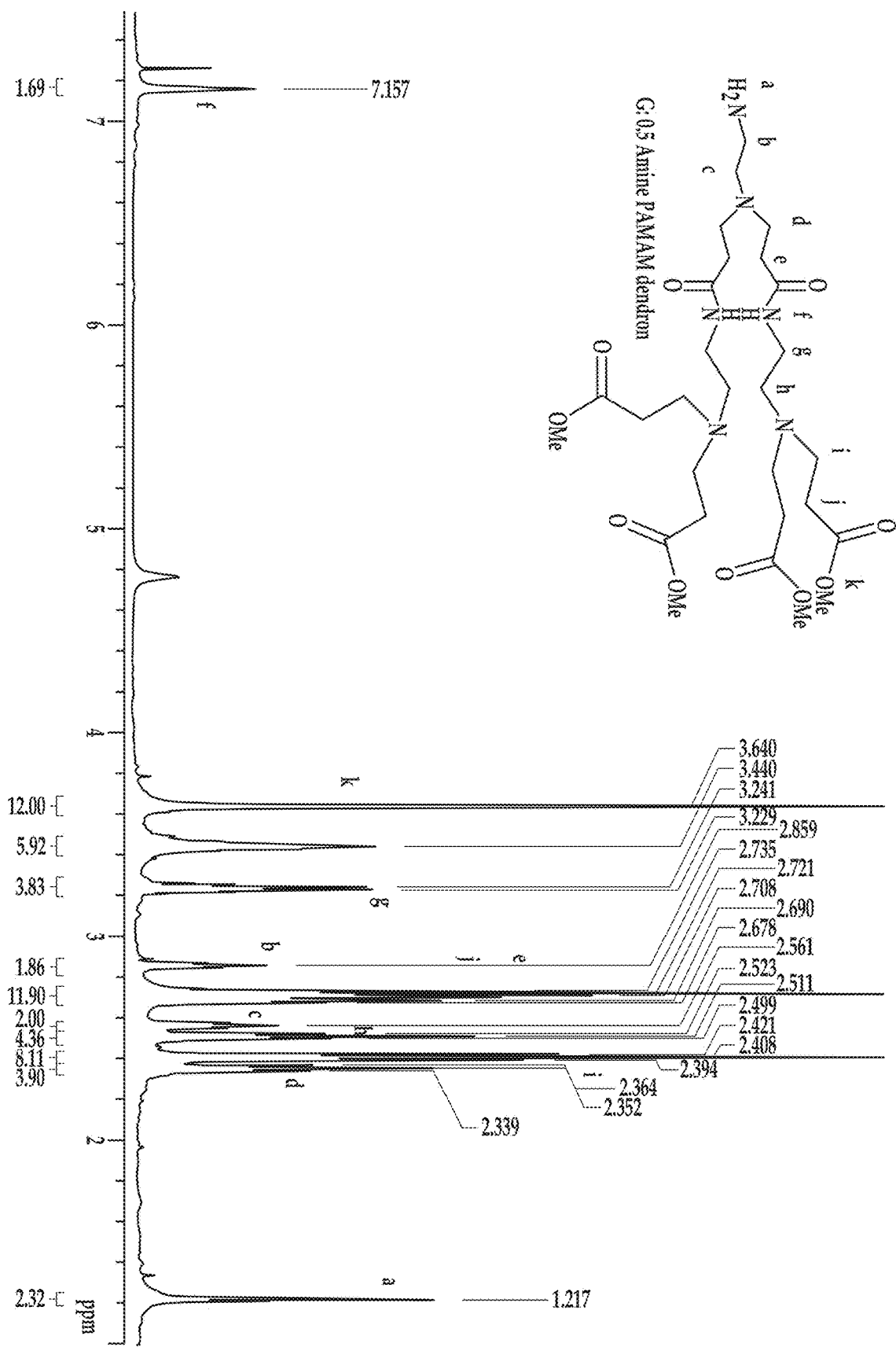
FIG. 8B depicts the NMR spectrum of a G:0.5 polyamidoamine dendron with an amine focal-point.

FIG. 8A illustrates the synthesis for the divergent growth of polyamidoamine dendrons with an amine focal-point protected with tert-butyl carbamate (Boc). Single amine protection of the ethylenediamine core was necessary to grow the dendron from only one side while leaving the other side available for conjugation to the metallacrown core. The synthesis of the single protected dendron implies an alkylation step with methyl acrylate on every free amine site to obtain a half generation dendron (step 1). This was followed by an amidation of each ester group with ethylenediamine to end up with a full generation dendron (step 2). In this example, the alkylation was repeated which formed a protected generation 0.5 amine focal-point polyamidoamine dendron. Once this desired generation was obtained, the Boc protecting group was removed using TFA and DCM. NMR was performed on the generation 0.5 amine focal-point polyamidoamine dendron. FIG. 8B depicts results of the Nuclear magnetic resonance (NMR) of the Gen: 0.5 amine focal-point polyamidoamine dendron. The NMR results confirm the formation of the Gen: 0.5 amine focal-point polyamidoamine dendron.

It is to be understood that the removal of the protecting group allows the resulting free amine to be coupled with amine-active groups of the metallacrown complexes disclosed herein (although metallacrown coupling was not performed with this example dendron).

5—PLL Dendron with Thiol Focal-Point

Figure 9:
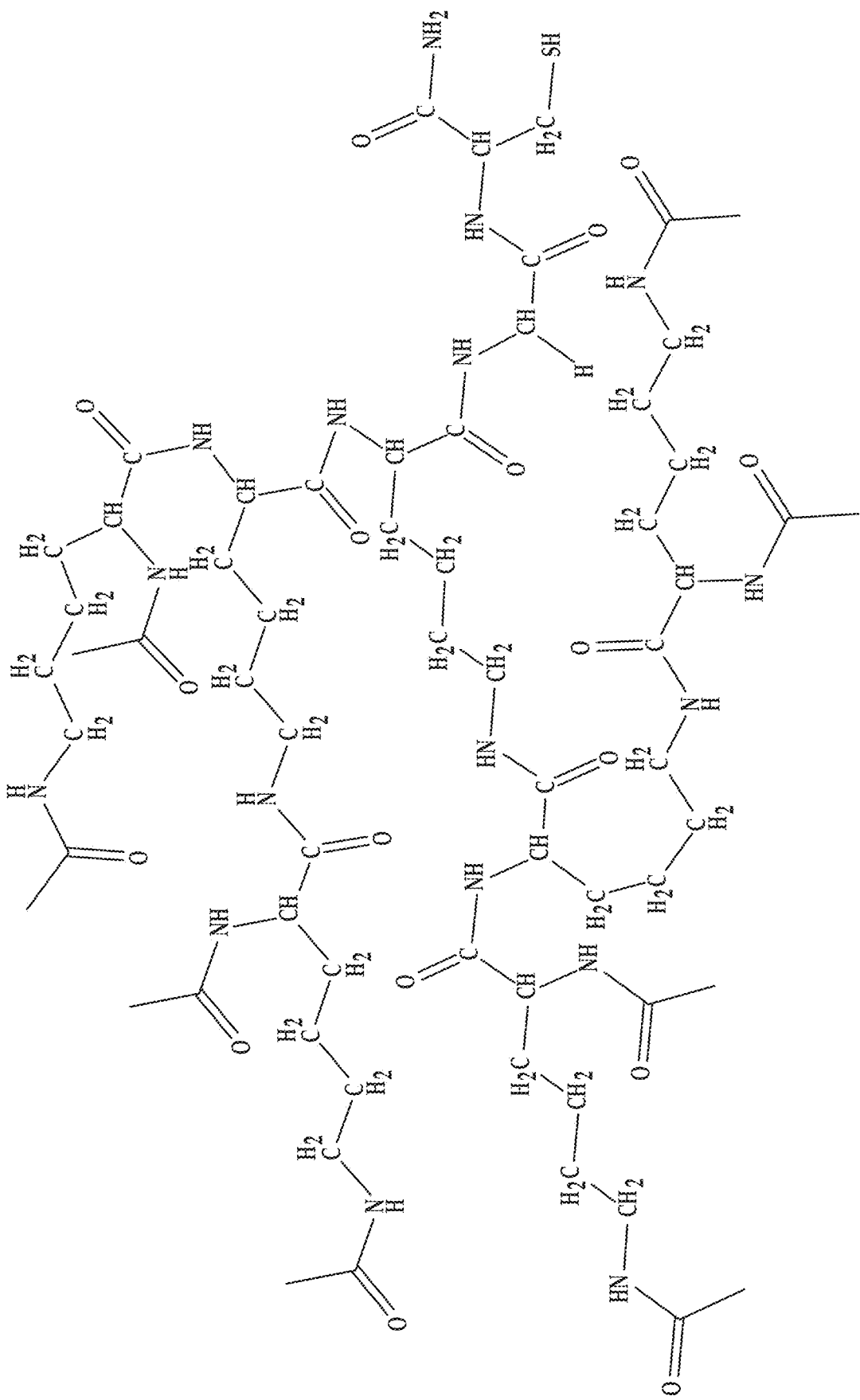
FIG. 9 depicts the structure of a poly-L-lysine (PLL) dendron with a thiol focal-point.
Figure 10:
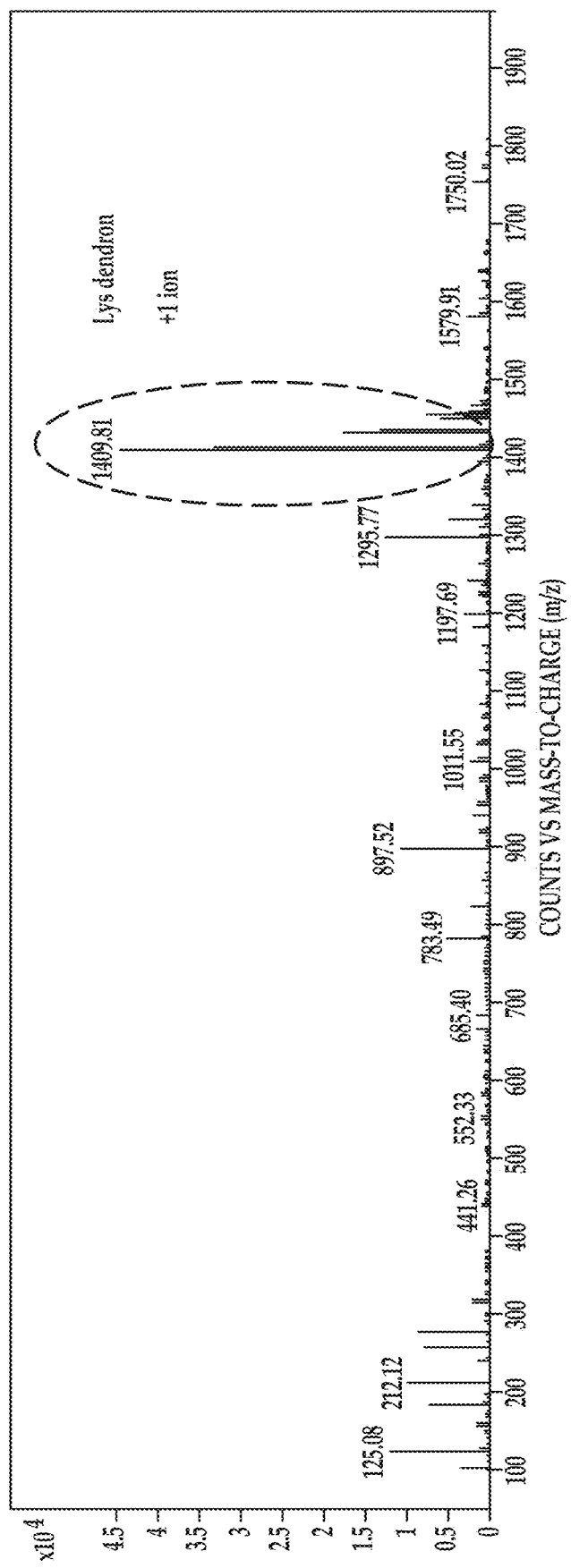
FIG. 10 depicts the electrospray ionization mass spectrometry spectrum (ESI-MS) for a PLL dendron.

PLL dendrons with a thiol focal-point (shown in FIG. 9) were prepared using an Applied Biosystems 433A automated peptide synthesizer with Fmoc-protected amino acids using the standard Fmoc protocol. The C-terminus of the dendron was amidated on the solid support MBHA rink amide resin (0.25 mmole scale) with HBTU/HOBt/DIEPA coupling methods. The N-terminus was acetylated with a solution of 4% (v/v) acetic anhydride, 4.3% (v/v) pyridine, and 91.7% N,N-dimethylformamide. The dendrons were cleaved from the resin using a cleavage mixture of 90% trifluoroacetic acid, 2% anisole, 5% thioanisole, and 3% ethanedithiol for 3.5 hours. The cleaved dendron solution was filtered and evaporated under a dry $N_2$-flow. Cold diethyl ether was then added to the product to obtain a precipitated white crude dendron. This crude product was re-dissolved again in double distilled water (dd$H_2O$) and lyophilized to get a fluffy white powder. This crude product was characterized by electrospray mass spectrometry, and the results are shown in FIG. 10. Once purified by HPLC, the dendron can be coupled to maleimide appendages in the metallacrown complexes disclosed herein.

Example 2

Coupling of Thiol Focal-Point Dendrons to Bridging Ligands

Figure 11:
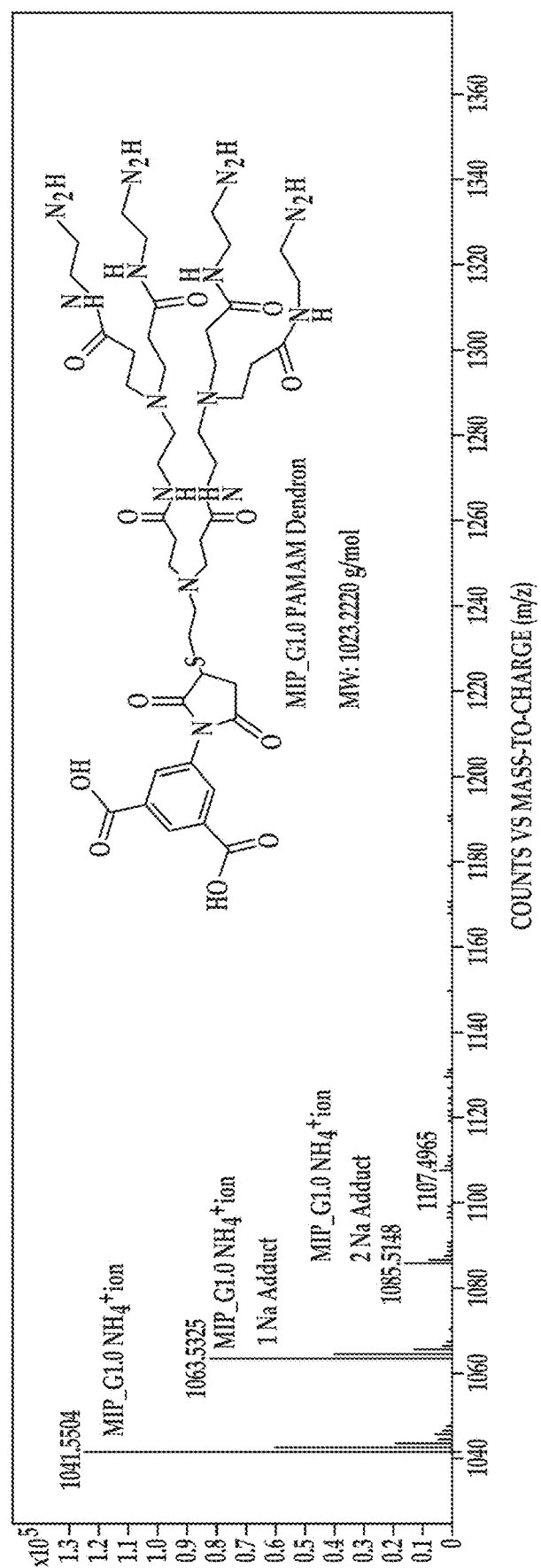
FIG. 11 depicts the electrospray ionization mass spectrometry spectrum of a 5-maleimido isophthalic acid coupled to a G:1 polyamidoamine dendron with a thiol focal-point, where the inset depicts the chemical structure.

Free thiol focal-point polyamidoamine dendrons (generation 1) were coupled to 5-maleimide isophthalic acids by dissolving molar equivalents of each compound in an appropriate solvent and stirring the mixture at room temperature under an oxygen free atmosphere for several days. The mass spectrometry spectra of the 5-maleimido isophthalic acid coupled to the generation 1 thiol-terminated polyamidoamine dendrimer is shown in FIG. 11. For simplicity, this dendron is labeled MIP_G1.0. The newly formed MIP_G1.0 can be used to bridge two monomeric metallacrowns to form an example of the dendrimeric metallacrown 10'.

Example 3

Coupling of Dendrons to Metallacrowns $Ga_8Ln_2$ metallacrowns with salicylhydroxamate ring ligands and 5-maleimide isophthalate bridging ligands were respectively coupled to free thiol focal-point Generation −0.5, Generation 0, and Generation 0.5 polyamidoamine dendrons in DMSO as the solvent. The mixtures were then stirred for several days at adequate temperature (ranging from 18° C. to 40° C. depending upon the dendron generation) and in an oxygen free environment. Once the reactions were complete, the solvent was removed and the product rinsed with methanol or water. The dendrimeric metallacrowns were characterized by electrospray mass spectroscopy and elemental analysis. Complexes had been formed using Sm, Yb, Tb, and Y as the core metals of the metallacrown.

Figure 12:
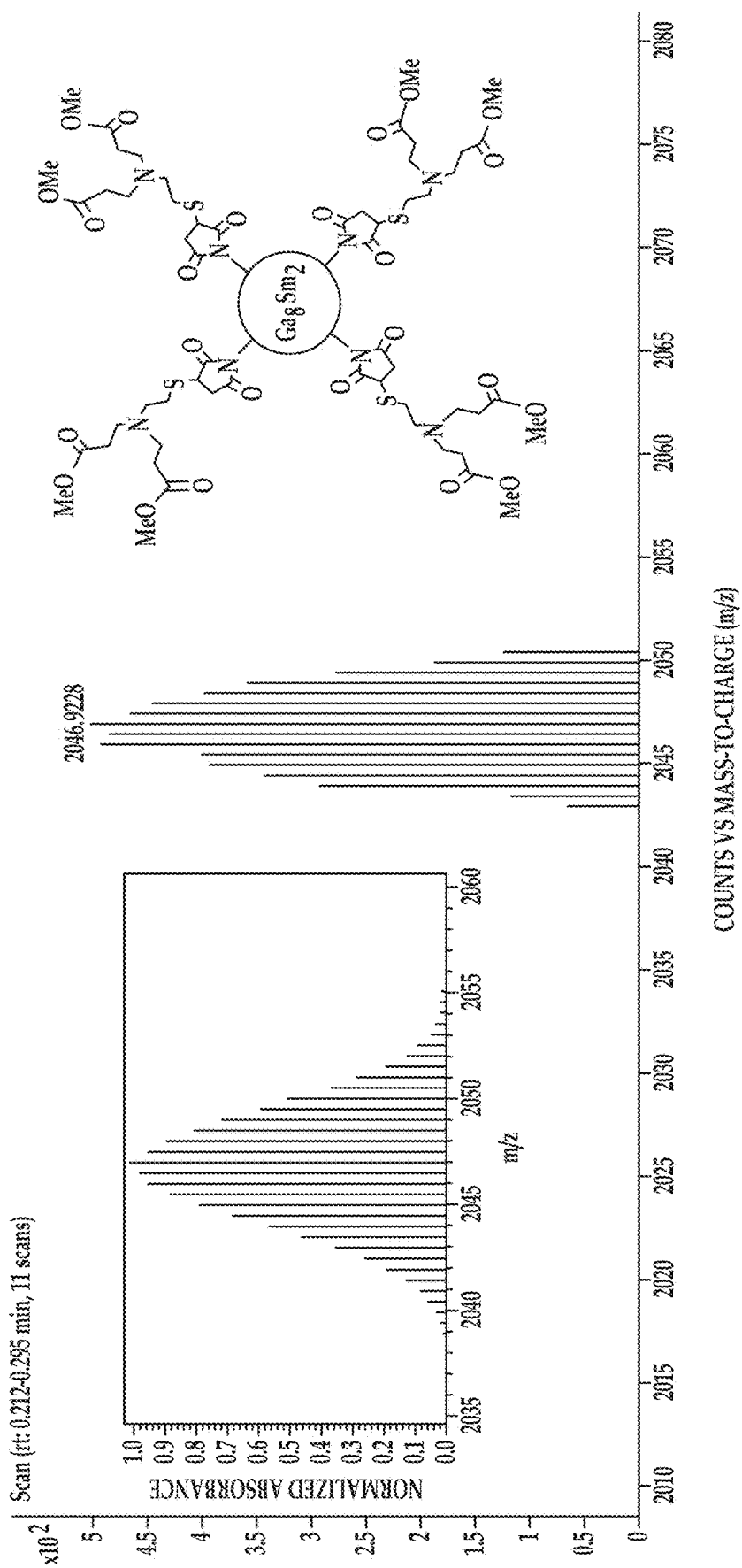
FIG. 12 depicts i) the theoretical spectrum, in the inset graph, of a $Ga_8Sm_2(shi)_8(MIP)_4$G:−0.5 PAMAM metallacrown (MC)-cored dendrimer (shi=salicylhydroximate; MIP=maleimido isophthalate;), ii) the actual ESI-MS spectrum of the Generation −0.5 MC-cored dendrimer is shown in the full graph (illustrating that the theoretical and actual spectra match), and iii) a representation of the chemical structure where the center ball labeled "$Ga_8Sm_2$" represents the MC core.

FIG. 12 depicts the analysis of the generation −0.5 dendrimeric metallacrown formed with Sm. The inset in FIG. 12 depicts the theoretical spectrum of this complex, while the full graph is the actual spectrum. The theoretical and actual results match. The actual spectrum indicates the complete coupling of four thiol focal-point dendrons to each of the bridging maleimide appendages in the MC core.

Figure 13:
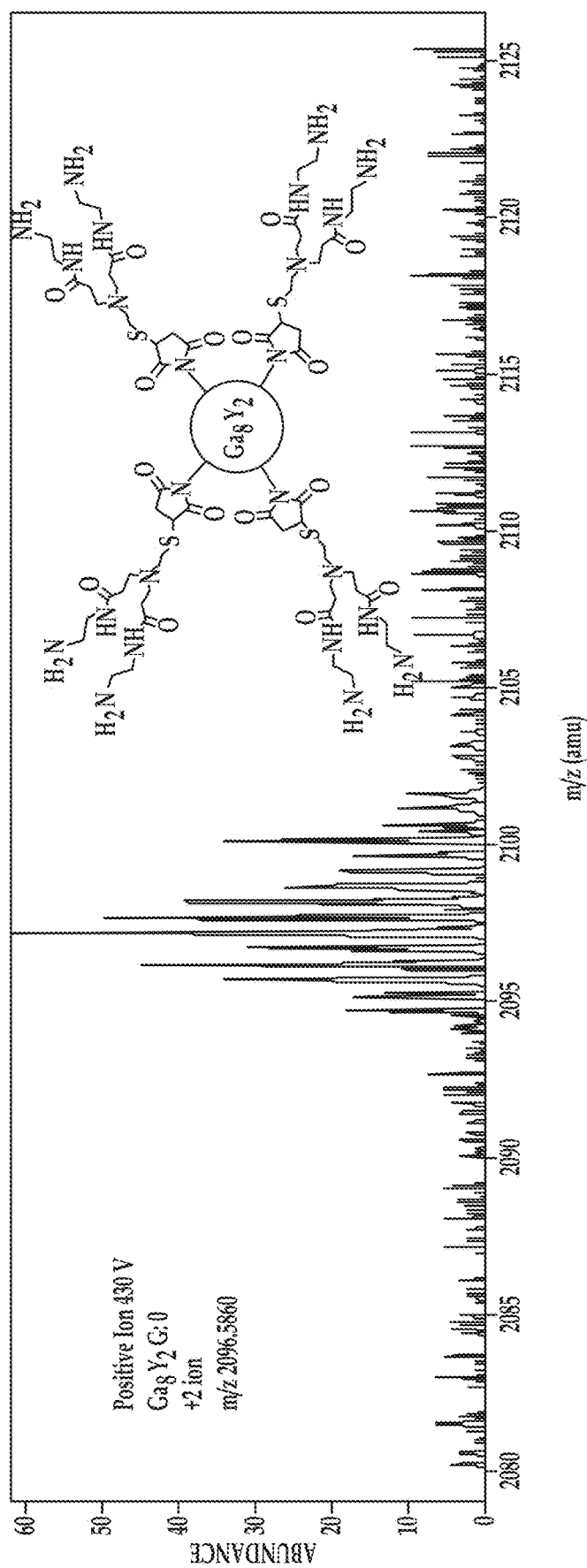
FIG. 13 depicts the ESI-MS spectrum of $Ga_8Yb_2(shi)_8$ $(MIP)_4$ G:0 polyamidoamine MC-cored dendrimer in a positive ion (shi=salicylhydroximate; MIP=maleimido isophthalate), where the inset is a representation of the chemical structure, (note: the boxed portion of the spectrum is also shown in FIG. 31 for another sample of the $Ga_8Yb_2(shi)_8$ $(MIP)_4$ G:0 polyamidoamine MC-cored dendrimer)

FIG. 13 depicts results of the mass spectroscopy of the generation 0 dendrimeric metallacrown formed with Yb. These results indicate the complete coupling of four thiol focal-point dendrons to each of the bridging maleimide appendages in the MC core.

Figure 14:
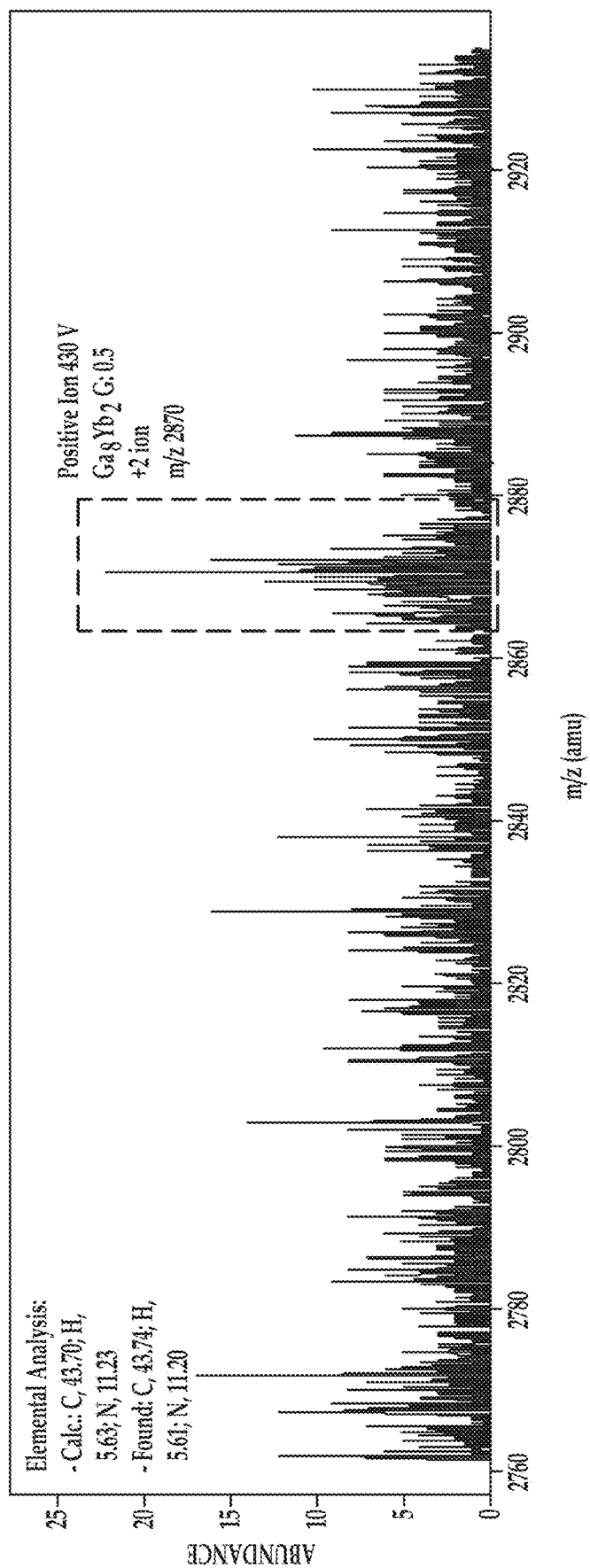
FIG. 14 depicts the mass spectrometry spectrum of the $Ga_8Yb_2(shi)_8(MIP)_4$ G: 0.5 polyamidoamine MC-cored dendrimer in a positive ion (shi=salicylhydroximate; MIP=maleimido isophthalate) (the dendrimer was also characterized by elemental analysis as shown in the upper left corner), (note: the boxed portion of the spectrum is also shown in FIG. 34 for another sample of the $Ga_8Yb_2(shi)_8$ $(MIP)_4$ G:0.5 polyamidoamine MC-cored dendrimer)

FIG. 14 depicts results of the mass spectroscopy of the generation 0.5 dendrimeric metallacrown formed with Yb. These results indicate the complete coupling of four thiol focal-point dendrons to each of the bridging maleimide appendages in the MC core.

Figure 15:
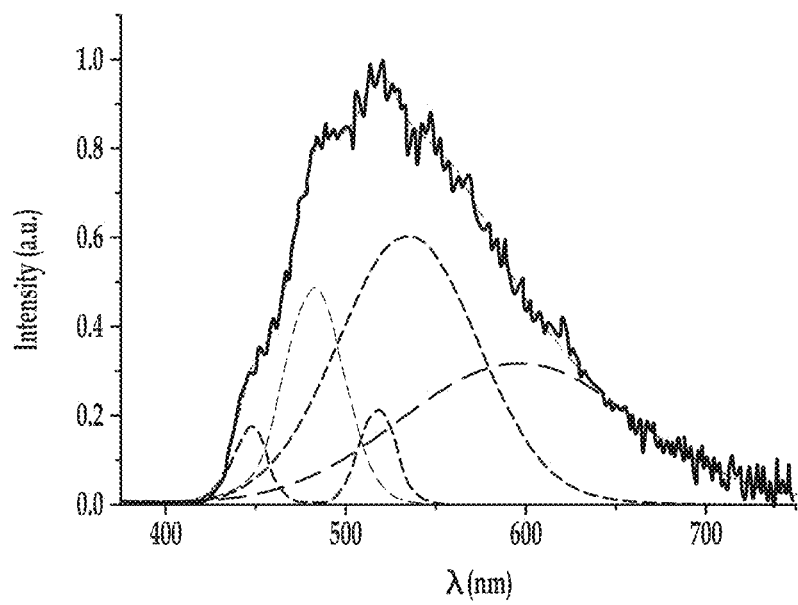
FIG. 15 depicts the phosphorescence spectrum of a $Ga_8Gd_2(shi)_8(MIP)_4$G:−0.5 polyamidoamine MC-cored dendrimer (shi=salicylhydroximate; MIP=maleimido isophthalate) in the solid state under excitation at 300 nm (solid traces, 100 µs delay after the excitation flash, 77K) and its Gaussian decomposition (dashed traces)

Gaussian decomposition of the phosphorescence spectrum of the $Ga_8Gd_2$ G:−0.5 polyamidoamine MC-cored dendrimer was used to estimate the position of the ligand-centered triplet state (FIG. 15). It was found that $T_1$, determined as 0-0 transition, is located at 22 350 $cm^{-1}$ (447.5 nm). This value is comparable with the one found before for $Ga_8Gd_2(Shi)_8$ dimeric MC, i.e. 21 980 $cm^{-1}$ (455 nm).

Figure 16:
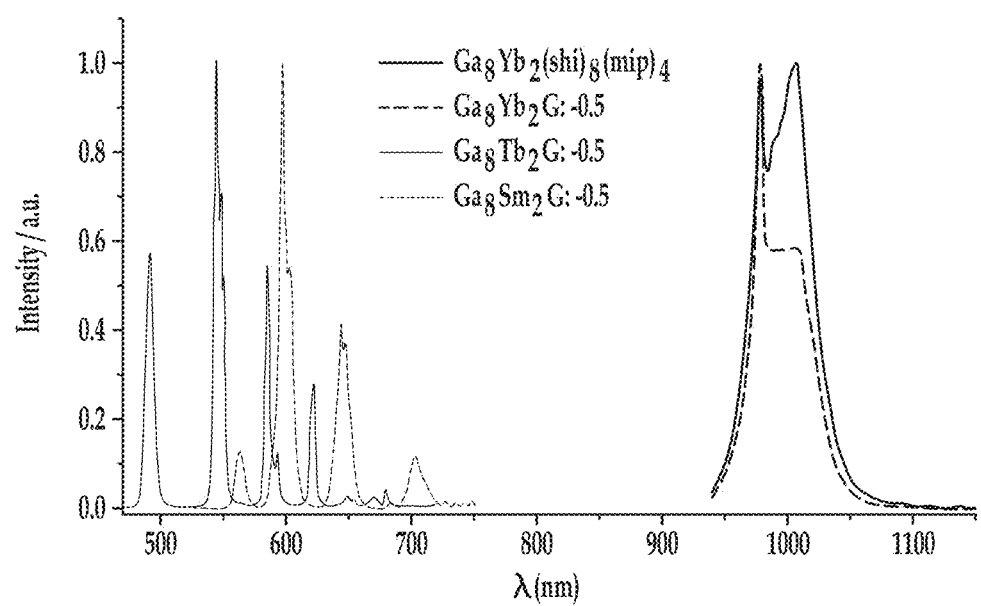
FIG. 16 is a graph depicting the corrected and normalized emission spectra of the $Ga_8Yb_2(Shi)_8(MIP)_4$ metallacrown and the $Ga_8Ln_2(shi)_8(MIP)_4$ G:−0.5 polyamidoamine MC-cored dendrimers (Ln=Yb, Tb, Sm, shi=salicylhydroximate; MIP=maleimido isophthalate) in the solid state under excitation at 340 nm at room temperature.
Figure 17:
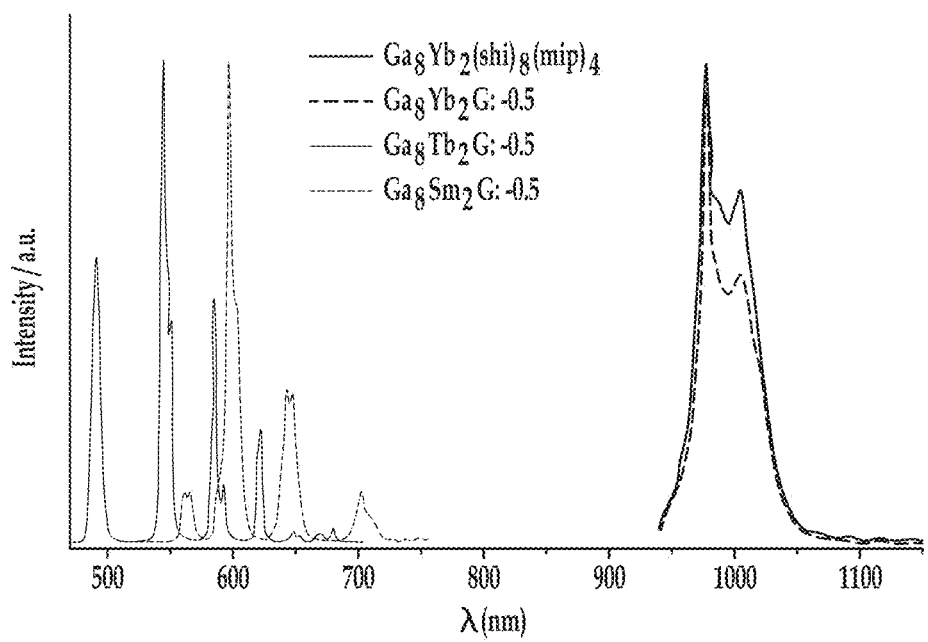
FIG. 17 is a graph depicting the corrected and normalized emission spectra of the $Ga_8Yb_2(Shi)_8(MIP)_4$ metallacrown and the $Ga_8Ln_2(shi)_8(MIP)_4$ G:−0.5 polyamidoamine MC-cored dendrimers (Ln=Yb, Tb, Sm, shi=salicylhydroximate; MIP=maleimido isophthalate) in solution (200 µM, $H_2O$ with 4% DMSO) under excitation at 320 nm at room temperature.

Under excitation at 320 nm to 340 nm, the $Ga_8Yb_2$ $(Shi)_8(MIP)_4$ metallacrown and $Ga_8Ln_2$ G:−0.5 polyamidoamine MC-cored dendrimers (Ln=Yb, Tb, Sm) both in the solid state and in aqueous solutions exhibited characteristic green or orange emission in the visible in the case of Tb and Sm, respectively, or in the NIR for Yb-containing complexes (FIG. 16 and FIG. 17).

Figure 18:
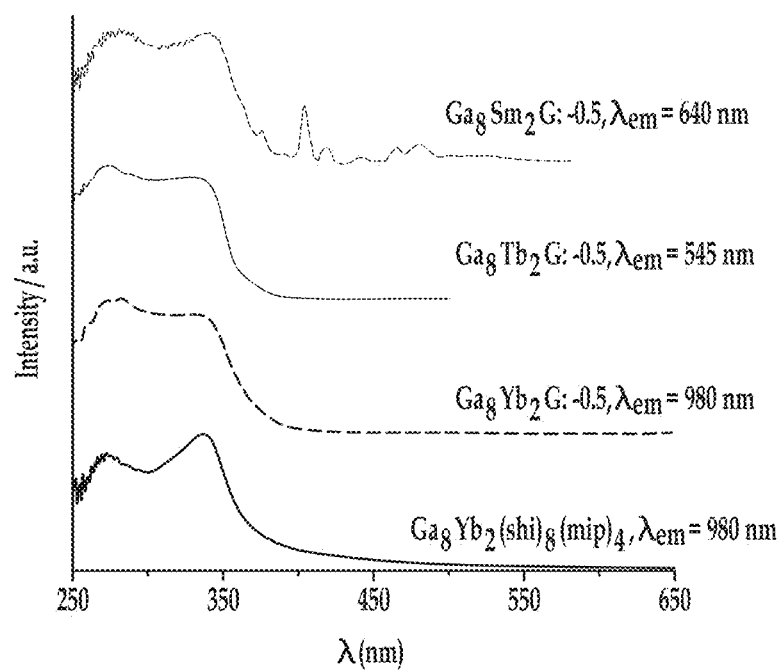
FIG. 18 is a graph depicting the corrected and normalized excitation spectra of the $Ga_8Yb_2(Shi)_8(MIP)_4$ metallacrown and the $Ga_8Ln_2(shi)_8(MIP)_4$ G:−0.5 polyamidoamine MC-cored dendrimers (Ln=Yb, Tb, Sm, shi=salicylhydroximate; MIP=maleimido isophthalate) in the solid state upon monitoring main transition of the corresponding lanthanide(III) ions at room temperature.
Figure 19:
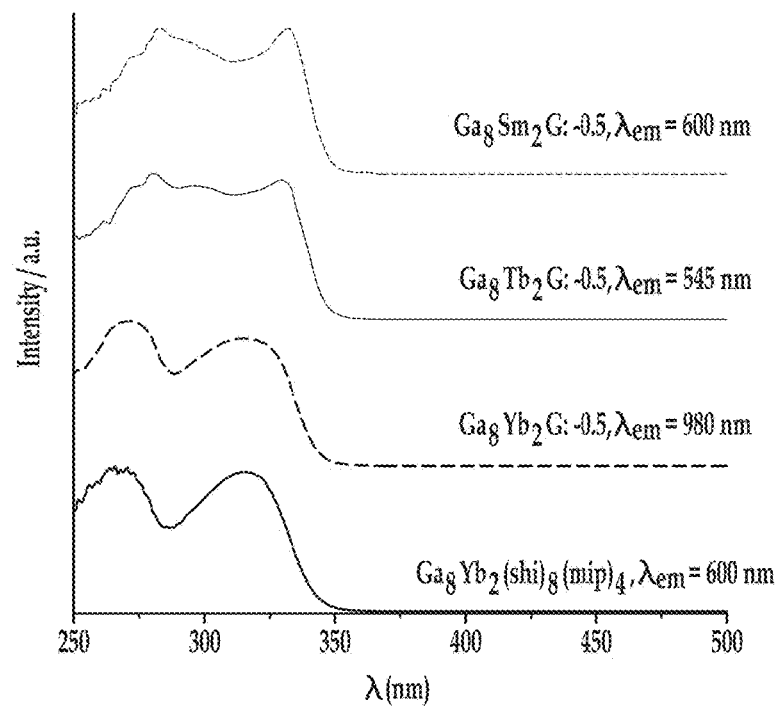
FIG. 19 is a graph depicting the corrected and normalized excitation spectra of the $Ga_8Yb_2(Shi)_8(MIP)_4$ metallacrown and the $Ga_8Ln_2(shi)_8(MIP)_4$ G:−0.5 polyamidoamine MC-cored dendrimers (Ln=Yb, Tb, Sm, shi=salicylhydroximate; MIP=maleimido isophthalate) in solution (200 µM, $H_2O$ with 4% DMSO) upon monitoring main transition of the corresponding lanthanide(III) ions at room temperature.

Excitation spectra, upon monitoring main transitions of the corresponding Ln(III) ions, showed the presence of broad bands up to 350 nm or 400 nm for the complexes in aqueous solutions or in the solid state (FIG. 18 and FIG. 19). In the case of the $Ga_8Sm_2$ G:−0.5 polyamidoamine MC-cored dendrimer in the solid state, sharp Sm(III) f-f transitions could be observed at longer wavelengths in addition to broad bands (FIG. 18).

Quantitative parameters, i.e. absolute quantum yields under excitation at 320 nm to 340 nm and luminescence lifetimes, have been determined for the $Ga_8Yb_2(Shi)_8(MIP)_4$ metallacrown and $Ga_8Ln_2$ G:−0.5 polyamidoamine MC-cored dendrimers (Ln=Yb, Tb, Sm) (Table 1). In general, the quantum yield values for MC-cored dendrimers in the solid state are comparable with the ones reported for dimeric metallacrown $Ga_8Ln_2(Shi)_8$ or the monomeric metallacrown $Ga_4Ln(Shi)_4$. A major improvement (>77-times, i.e. 0.0112% vs. 0.868%) could be achieved for the $Ga_8Yb_2$ G:−0.5 polyamidoamine MC-cored dendrimer in aqueous solution compared to $YnZn_{16}$ MCs assembled with pyrazinehydroxamic acid.

In Table 1, luminescence lifetimes ($\lambda_{ex}$=355 nm) and quantum yields ($\lambda_{ex}$=340 nm for samples in the solid state and $\lambda_{ex}$=320 for solutions) of the $Ga_8Yb_2(Shi)_8(MIP)_4$ dimeric metallacrown, $Ga_8Ln_2$ G:−0.5 polyamidoamine MC-cored dendrimers (Ln=Yb, Tb, Sm) (i.e., $Ga_8Ln_2$ $(Shi)_8(MIP)_4(G:-0.5$ PAMAM)$_4$) and $Ga_8Yb_2$ G:0.5 polyamidoamine MC-cored dendrimers at room temperature (2σ values are given between parentheses) are presented. For bi-exponetial luminescence lifetimes results, values after the colon indicate the fraction contribution of the individual lifetimes to the experimental luminescence decay.

TABLE 1

| Compound | State/Solvent | Lifetime/µs | Quantum yield/% |
|---|---|---|---|
| $Ga_8Yb_2(Shi)_8(MIP)_4$ | Solid | 23.2(3):89.8(4)% 4.75(7):10.2(4)% | 0.126(3) |
| | 200 µM $H_2O$/DMSO (4%) | 6.16(3):97.5(3)% 0.55(9):2.5(3)% | 9.01(7) · $10^{-2}$ |
| $Ga_8Yb_2$ Gen: −0.5 | Solid | 35.3(6) | 3.24(9) |
| | 200 µM $H_2O$/DMSO (4%) | 13.(1) | 0.868(9) |

TABLE 1-continued

| Compound | State/Solvent | Lifetime/μs | Quantum yield/% |
|---|---|---|---|
| Ga$_8$Yb$_2$ Gen: 0.5 | Solid | 28.2(3) | 1.82(1) |
| Ga$_8$Tb$_2$ Gen: −0.5 | Solid | 1090(12):88(1)% 258(6):12(1)% | 11.9(3) |
|  | 200 μM H$_2$O/DMSO (4%) | 980(30):89.7(8)% 170(10):10.3(8) | 6.1(3) |
| Ga$_8$Sm$_2$ Gen: −0.5 | Solid | 112(1) | 2.31(2) |
|  | 200 μM H$_2$O/DMSO (4%) | 96.2(9) | 1.1(1) |

Figure 20A:
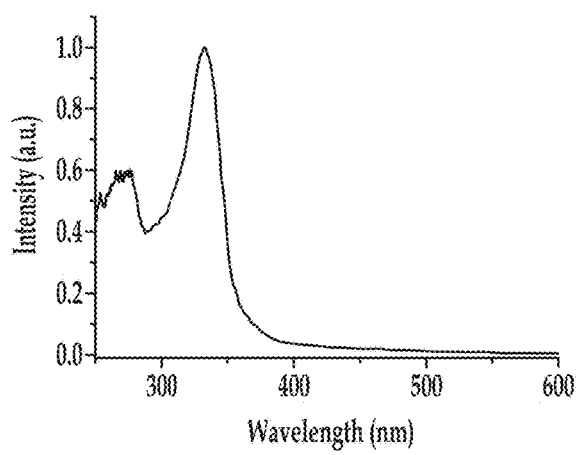
FIGS. 20A and 20B are graphs depicting the corrected and normalized (FIG. 20A) excitation ($\lambda_{em}$=980 nm) and (FIG. 20B) emission ($\lambda_{ex}$=330 nm) spectra of the $Ga_8Yb_2(shi)_8(MIP)_4$ G:0.5 polyamidoamine MC-cored dendrimer (shi=salicylhydroximate; MIP=maleimido isophthalate) in the solid state at room temperature.
Figure 20B:
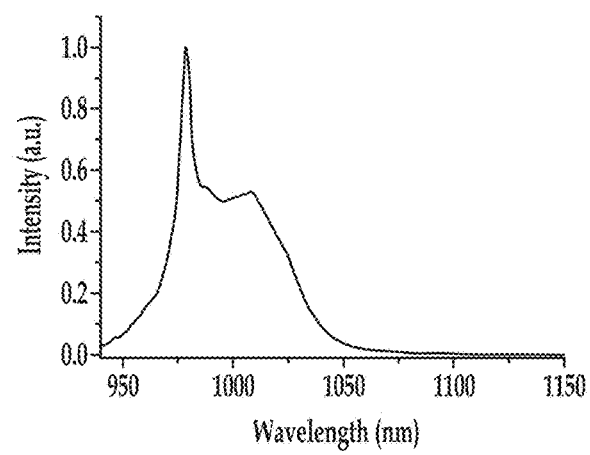

For the higher generation, namely Ga$_8$Yb$_2$ G:0.5 MC-cored dendrimer, the characteristic Yb(III) emission in the NIR range could be also observed upon excitation at 330 nm (FIG. 20B) with luminescence lifetime of 28.2(3) μs and quantum yield of 1.82(1) % (Table 1). The excitation spectrum of this dendrimeric metallacrown is shown in FIG. 20A.

Biological Tests: Epifluorescence Imaging with HeLa Cells

Figure 21:
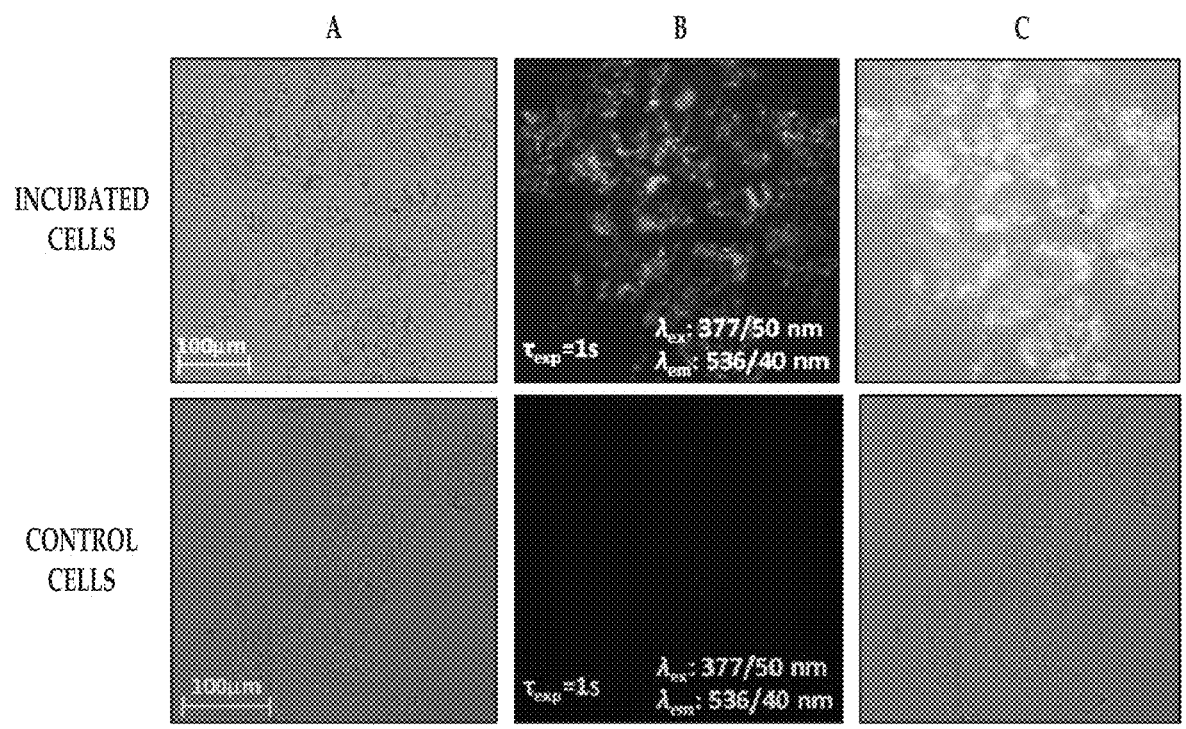
FIG. 21 depicts epifluorescence microscopy images (reproduced in black and white) obtained on HeLa cells, (Top) after incubation with a 30 µM solution of $Ga_8Tb_2(shi)_8(MIP)_4$ G:−0.5 polyamidoamine MC-cored dendrimer for 3 hours ($\lambda_{ex}$: 377 nm, band pass 50 nm; $\lambda_{em}$: 536 nm, band pass 40 nm, 1 s of exposure) and (Bottom) untreated (control) cells. A: brightfield, B: visible emission, and C: merged image (Objective 63×)
Figure 22:
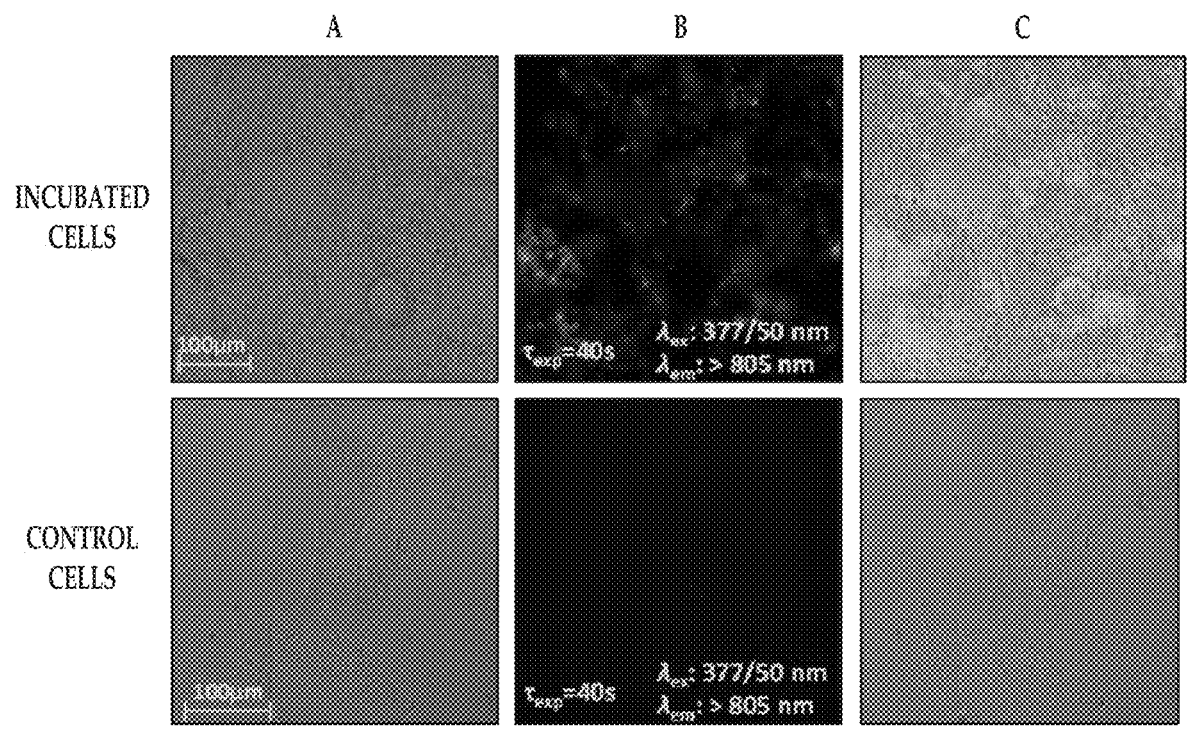
FIG. 22 depicts epifluorescence microscopy images (reproduced in black and white) obtained on HeLa cells, (Top) after incubation with a 100 µM solution of the $Ga_8Yb_2(shi)_8(MIP)_4$ G:−0.5 polyamidoamine MC-cored dendrimer for 3 hours ($\lambda_{ex}$: 377 nm, band pass 50 nm; $\lambda_{em}$: long pass 805 nm, 40 s of exposure), and (Bottom) untreated (control) cells. A: brightfield, B: visible emission, and C: merged image (Objective 63×)

To test if synthesized MC-cored dendrimers could be used under biological conditions and maintain the luminescence signal, HeLa cells were incubated with the Tb(III) and Yb(III) G:−0.5 polyamidoamine MC-cored dendrimers (Ga$_8$Tb$_2$ G:−0.5 polyamidoamine MC-cored dendrimers and Ga$_8$Yb$_2$ G:−0.5 polyamidoamine MC-cored dendrimers). The metallacrown complexes coated the surfaces of the cells. For a control, HeLa cells were not incubated and were imaged in a similar manner. FIG. 21 depicts the results for the Ga$_8$Tb$_2$ G:−0.5 MC-cored dendrimers (row 1) and for the control HeLa cells (row 2), and FIG. 22 depicts the results for the Ga$_8$Yb$_2$ G:−0.5 MC-cored dendrimers (row 1) and for the comparative HeLa (row 2). In both FIG. 21 and FIG. 22, the images in column A depict the cells prior to excitation (the Bright field images), the images in column B depict the cells during excitation (reproduced in black and white), and the images in Column C are the merged images of 1A and 1B or 2A and 2B. During excitation, the cells incubated with the Ga$_8$Tb$_2$ G:−0.5 MC-cored dendrimers were imaged after 1 second of exposure, and the cells incubated with the Ga$_8$Yb$_2$ G:−0.5 MC-cored dendrimers were imaged after 40 seconds of exposure. As shown in FIG. 21, 1B, good quality signals were observed in the visible range (536 nm emission, 40 nm filter) for the Ga$_8$Tb$_2$ G:−0.5 polyamidoamine MC-cored dendrimers on the epifluorescence microscope upon excitation using a 377 nm band pass 50 nm filter. As shown in FIG. 22, 1B, good quality signals were observed in the NIR range (>805 nm emission) for the Ga$_8$Yb$_2$ G:−0.5 MC-cored dendrimers (FIG. 22, 1B) on epifluorescence microscope upon excitation using the 377 nm band pass 50 nm filter.

Example 4

This example demonstrates how copper-catalyzed alkyne-azide cycloaddition (CuAAC) and thiol-maleimide Michael addition may be used to couple azides or thiol-bearing molecules to the metallacrown complexes disclosed herein. The dendrons disclosed herein can be functionalized with azide or thiol focal-points, and thus the techniques described in this example can be used to couple the dendrons to the metallacrown complexes.

CUAAC

The copper-catalyzed alkyne-azide cycloaddition was performed with a benzyl triazyl species and with dimeric metallacrowns having samarium (Sm) as the central ions.

Preparation of Tris(benzyltriazolylmethyl)amine (TBTA)

Tripropargylamine (142 μL, 1 equiv.) and benzyl azide (375 μL, 3 equiv.) were dissolved in a 1:1 H$_2$O:t-butanol mixture. Next, sodium L-ascorbate was added as a 1M solution in H$_2$O (300 μL, 0.03 equiv.), followed by copper (II) sulfate as a 3M solution in H$_2$O (100 μL, 0.03 equiv.). This mixture was allowed to react for 3 days, and then was dissolved in cold H$_2$O. This mixture was then extracted with ethyl acetate. The organic layers were combined, dried over sodium sulfate, and then gravity filtered. The filtrate was evaporated using a flash evaporator, and then redissolved in DMF. The solution was evaporated using a flash evaporator to give TBTA as a brown powder. The synthetic yield was 88%.

Preparation of Dimeric Metallacrowns (Sm-e8)

The dimeric metallacrowns were prepared with samarium salt for the central ions, gallium salt for the metal ions, 4-ethynylsalicylhydroxamic acid (H$_3$eshi) for the ring ligands, and isophthalic acid (H$_2$ip or ip) as the bridging ligands.

More specifically, Ln(NO$_3$)$_3$.xH$_2$O (Ln=Sm, 1 equiv.) and Ga(NO3)3 (0.1535 g, 4.8 equiv.) were dissolved in DMF. Separately, H$_3$eshi (0.1063 g, 4.8 equiv.), isophthalic acid (0.0498 g, 2.4 equiv.), and saturated aqueous sodium hydroxide (119.4 μL, 19.2 equiv.) were dissolved in DMF to form a clear and yellow solution. The solutions were combined and allowed to stir for at least 1 hour, and then were gravity filtered. The filtrate was evaporated slowly over 2-4 weeks yielding yellow-brown crystalline plates, which were isolated by vacuum filtration and washing with cold DMF.

The overall structure of the samarium dimeric metallacrowns (Sm-e8) is similar to the structure shown in FIG. 2, except that the salicylhydroxamic acid "shi" ring ligands are replaced with 4-ethynylsalicylhydroxamic acid "eshi" ring ligands and the Ln is samarium. In this example, sodium counter cations were used.

The samarium(III) central ions were eight-coordinate, where four oxime oxygens from the metallacrown comprise one face of a distorted square antiprism and four carboxylate oxygens bind from the isophthalate ligands to form the other face. The gallium ions were in six-coordinate pseudo-octahedral geometry where the equatorial positions were occupied by the metallacrown chelate motif from the hydroximates, one axial position was filled by a carboxylate oxygen on isophthalate, and the other axial site was coordinated to a solvent molecule. The sodium counter cations were also incorporated into the solid state structure on the opposite face of the metallacrown from the samarium in a nine-coordinate monocapped square antiprism geometry, where four sites were occupied by metallacrown oxime oxygens, four were filled by solvents, and the final apical position was filled by a solvent with 50% occupancy.

Coupling Benzyl Triazyl Species to Dimeric Metallacrown Sm-e8

To couple an azide functionality to each of the 8 ring ligands (H$_3$eshi) of the Sm dimeric metallacrown (Sm-e8), TBTA (4.14 mg, 0.525 equiv.), CuI (2.54 mg, 1.05 equiv.), and sodium ascorbate (2.63 mg, 1.05 equiv.) were dissolved in DMSO. Next, benzyl azide (14.28 μL, 9 equiv.) followed by the Sm dimeric metallacrown (50.00 mg, 1 equiv.) were added and the reaction was warmed to 75° C. and stirred for about 24 hours. The solution was allowed to evaporate slowly in a humid environment until a grey powder formed. This powder was isolated via vacuum filtration and washing with cold water.

Figure 43:
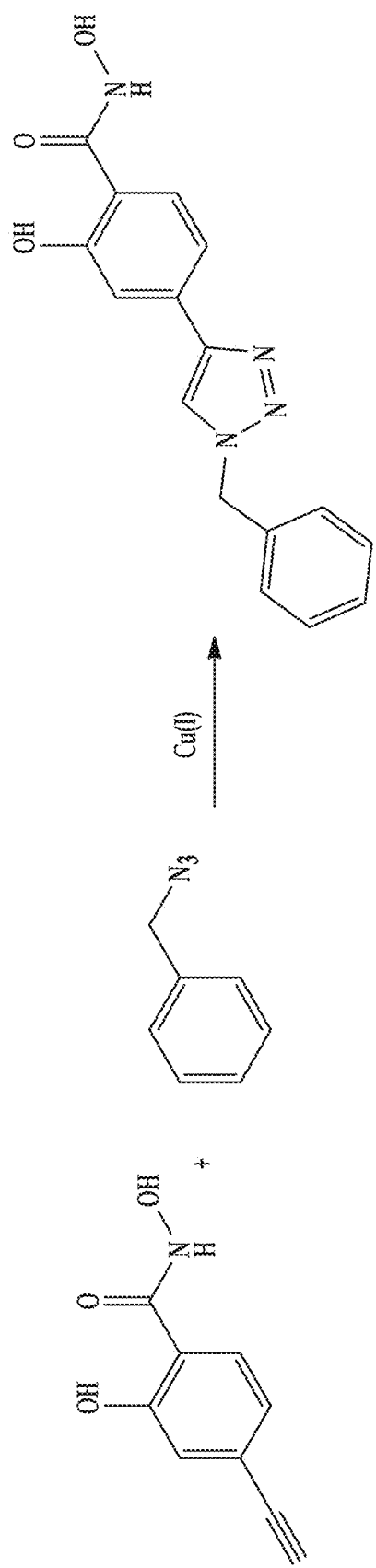
FIG. 43 is a scheme illustrating a copper-catalyzed alkyne-azide cycloaddition CuAAC between a ring ligand ($H_3$eshi) and benzyl azide.

The CuAAC between the ring ligand (H$_3$eshi) and benzyl azide is shown in FIG. 43.

Figure 27:
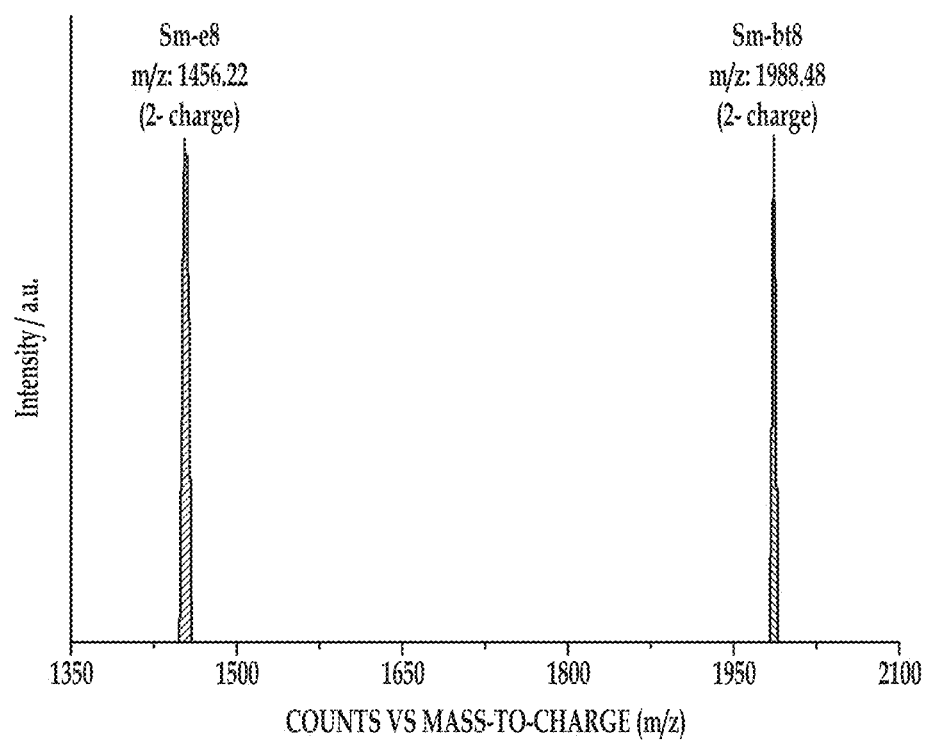
FIG. 27 depicts the electrospray ionization mass spectrometry spectrum of a $Ga_8Sm_2(eshi)_8(ip)_4$ metallacrown (Sm-e8) and a benzyl triazyl-substituted version of the $Ga_8Sm_2(eshi)_8(ip)_4$ metallacrown (Sm-bt8) (eshi=4-ethynylsalicylhydroxamate; ip=isophthate)

FIG. 27 depicts the ESI-MS spectrum for the $Sm_2Ga_8$(eshi)$_8$(ip)$_4$ dimeric metallacrown (labeled Sm-e8) and for the benzyl triazole coupled $Sm_2Ga_8$(eshi)$_8$(ip)$_4$ dimeric metallacrown (labeled Sm-bt8). The spectra were collected in methanol in negative ion mode with a fragmentation voltage of 250V. The respective background spectra were not subtracted. The ESI-MS for Sm-e8 was consistent with other results obtained for the $Sm_2Ga_8$(eshi)$_8$(ip)$_4$ dimeric metallacrown, and the −2 peak at 1986.94 m/z for Sm-bt8 which is consistent with complete conversion of the ethnyne on Sm-e8 to a benzyl triazole.

These results demonstrate that CuAAC may be used with non-cupric metallacrowns without altering the metallacrown structure by replacing the metal ions or the center ions with copper ions.

Moreover, because benzyl azide can be coupled to a metallacrown, it is believed that a similar focal-point reaction may be used to couple a dendron including a terminal azide focal-point to an alkyne-terminated monomeric or dimeric metallacrown to form an example of the dendrimeric metallacrown disclosed herein.

Thiol-Maleimide Michael Addition

The thiol-maleimide Michael addition was performed with cysteamine and with dimeric metallacrowns having samarium (Sm) as the central ions.

Preparation of Monomeric Metallacrown

The monomeric metallacrown $LnGa_4$(shi)$_4$ (Ln=Sm), with ($C_7H_5O_2$) as bridging ligands and ($C_5H_6N$) as the positively charged counter ion, was prepared. More specifically, 1.0 mmol $H_3$shi, 0.5 mmol of Ln(NO$_3$)$_3$.xH$_2$O (Ln=Sm), 1.0 mmol of Ga(NO$_3$)$_3$, 3 mmol sodium benzoate, and 2 mL pyridine were dissolved in 40 mL of methanol. The mixture was stirred for about 10 minutes. The solution was filtered. The filtrate was evaporated slowly over 2 weeks yielding a crystalline compound.

Preparation of Dimeric Metallacrowns (Sm-m4)

1 equiv. of the monomeric metallacrown with Ln=Sm was dissolved in DMF with 5-maleimidoisophthalic acid (H$_2$miph) (0.26 g, 2 equiv.) and stirred for about 6 hours. The DMF was evaporated using a vacuum, and the powder obtained was washed with methanol to yield pure product. During the formation of the dimer, the bridging ligands of the monomeric metallacrown were replaced with the 5-maleimidoisophthalic acid bridging ligands. The synthetic yield for the dimeric metallacrown was 82%.

Coupling Cysteamine to Dimeric Metallacrown Sm-m4

To couple a thiol functionality to each of the 4 bridging ligands (H$_2$miph) of the Sm dimeric metallacrown (Sm-m4), Sm-m4 (0.020 mmol) and cysteamine (0.18 mmol) were mixed in 2 mL DMF. After 4 hours, DMF was evaporated under vacuum and the obtained powder was washed with methanol to give the pure product. The synthetic yield was >95%.

Figure 44:
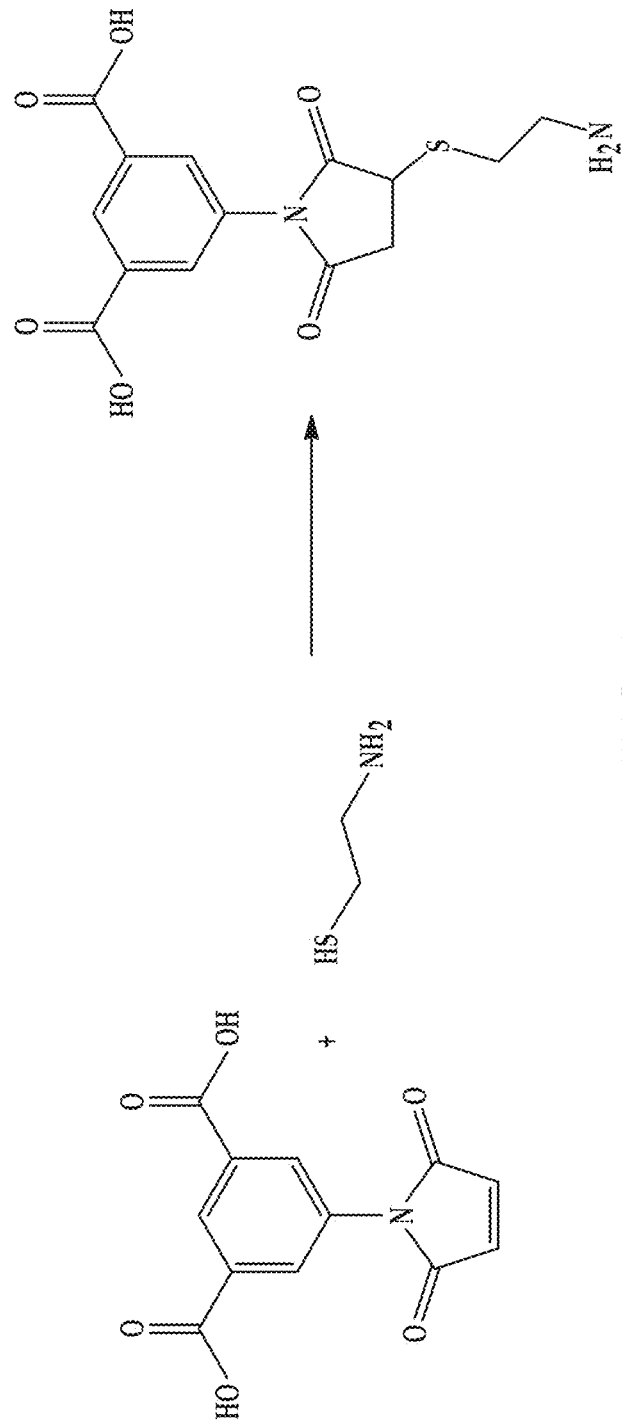
FIG. 44 is a scheme illustrating the Michael Addition of 5-maleimidoisophthalic acid ($H_2$miph) and cysteamine.

The Michael Addition of H$_2$miph and cysteamine is shown in FIG. 44.

Figure 28:
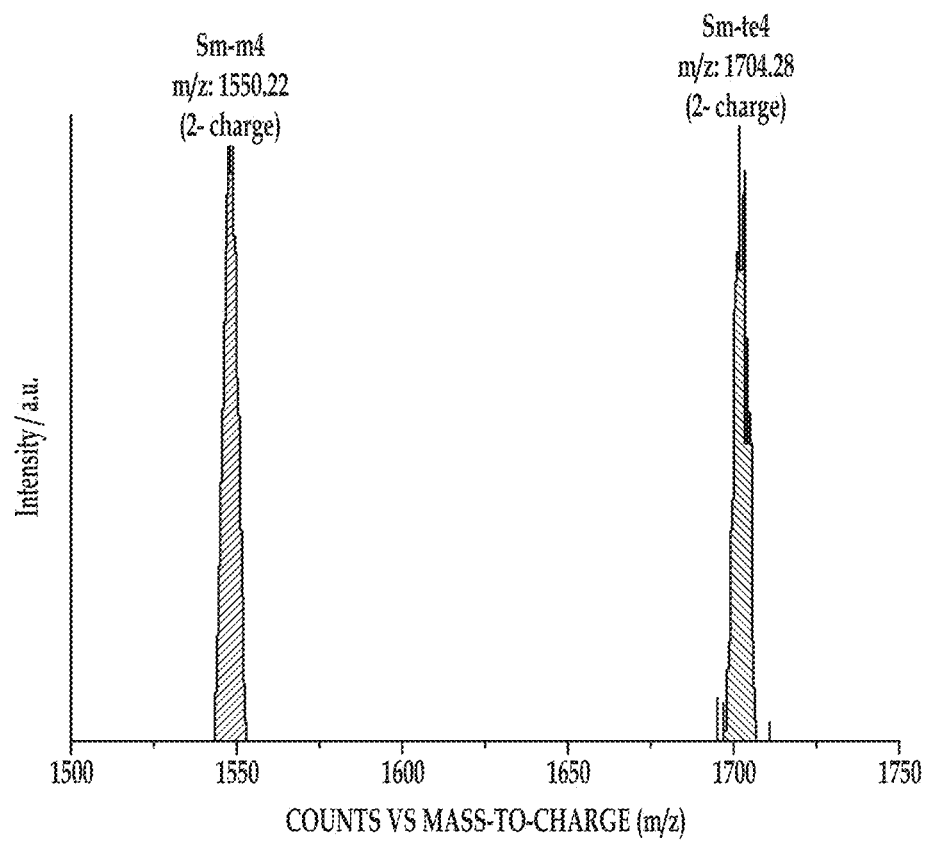
FIG. 28 depicts the electrospray ionization mass spectrometry spectrum of a $Ga_8Sm_2(shi)_8(mip)_4$ metallacrown (Sm-m4) and a thiol-substituted version of the $Ga_8Sm_2(shi)_8(mip)_4$ metallacrown (Sm-te4) (shi=salicylhydroximate; mip=maleimido isophthalate)

FIG. 28 depicts the ESI-MS spectrum for the $Sm_2Ga_8$(shi)$_8$(miph)$_4$ dimeric metallacrown (labeled Sm-m4) and for the thiol coupled $Sm_2Ga_8$(shi)$_8$(miph)$_4$ dimeric metallacrown (labeled Sm-te4). The spectra were collected in methanol in negative ion mode with a fragmentation voltage of 250V. The respective background spectrum was subtracted once. The ESI-MS for Sm-m4 was consistent with other results obtained for the $Sm_2Ga_8$(shi)$_8$(miph)$_4$ dimeric metallacrown, and the single peak at 1702.18 m/z for Sm-te4 corresponds to the complete conversion of all four maleimido functional groups to a coupled thioether with cysteamine.

These results demonstrate that the Michael Addition was carried out on the maleimido functionality on the isophthalate bridge to form a thioether linkage. Four cysteamine molecules were appended to the metallacrown demonstrating a complete conversion of the maleimide to a succinamide thioether.

Moreover, because cysteamine (specifically the sulfur) can be coupled to a metallacrown, it is believed that a similar reaction may be used to couple a dendron having a terminal thiol focal-point to a maleimide focal-point-terminated monomeric or dimeric metallacrown to form an example of the dendrimeric metallacrown disclosed herein.

Optical Properties

A {Sm[12-MC$_{GaIIIN}$(shi)-4]}$_2$(ip)$_4$ (i.e., $Sm_2Ga_8$(shi)$_8$(ip)$_4$) dimeric metallacrown (Sm-shi8) was synthesized similar to the procedures described in this example, and was used as a basis of comparison to the Sm-e8, Sm-m4, Smbt8 and Sm-te4 analogs.

The solution state (UV-Vis) absorbance of the Sm-shi8 and the Sm-e8, Sm-m4, Smbt8 and Sm-te4 analogs was measured in approximately 2 μM to 3 μM methanol solutions at room temperature. The results are shown in FIG. 29. The absorbance spectrum for each analog shown in FIG. 29 has a π-π* transition band with λmax of approximately 315 nm (31,750 cm$^{-1}$) or 335 nm (29,850 cm$^{-1}$). This π-π* transition was red-shifted by close to 25 nm from Sm-shi8 in the case of Sm-e8 and Sm-bt8. The redshift in this band also showed a redshift in the Si energy, determined as the absorbance edge from 340 nm to 370 nm. There was no notable redshift in this absorbance for Sm-m4 or Sm-te4.

Solution-state excitation spectra (FIG. 30A, $\lambda_{em}$=595 nm) and emission spectra (FIG. 30B, $\lambda_{ex}$=315 nm or 340 nm) were also determined for the samarium metallacrowns in approximately 2 μM solutions at room temperature. The respective background spectra were subtracted to remove second harmonic artifacts. The extinction coefficients did not appreciably change after coupling was performed on the metallacrown. Characteristic Sm$^{3+}$ emission bands were observed with bands at 560 nm ($^4G_{5/2} \rightarrow ^6H_{5/2}$), 595 nm ($^4G_{5/2} \rightarrow ^6H_{7/2}$), 645 nm ($^4G_{5/2} \rightarrow ^6H_{9/2}$), and 700 nm ($^4G_{5/2} \rightarrow ^6H_{11/2}$) (FIG. 30B). The excitation spectrum (FIG. 30A) showed a smooth region between 250 nm and 360 nm indicative of an antenna effect sensitization for Sm-e8 and Sm-bt8, while Sm-m4 and Sm-te4 showed sensitization between 250 nm and 345 nm. The antenna effect region edge was redshifted by approximately 15 nm between the two spectroscopic profiles.

These results indicate that the capability to sensitize samarium is preserved after coupling a small molecule to the metallacrown. The methods in this example provide a useful route for coupling other organic azides (e.g., azide focal-point dendrons) or thiol-bearing molecules (e.g., thiol focal-point dendrons) to a luminescent metallacrown complex without deleteriously affecting the ability to sensitize the center ion.

Example 5

This example demonstrates how a thermal process can be used to attach a dendron to a metallacrown.

Figure 31:
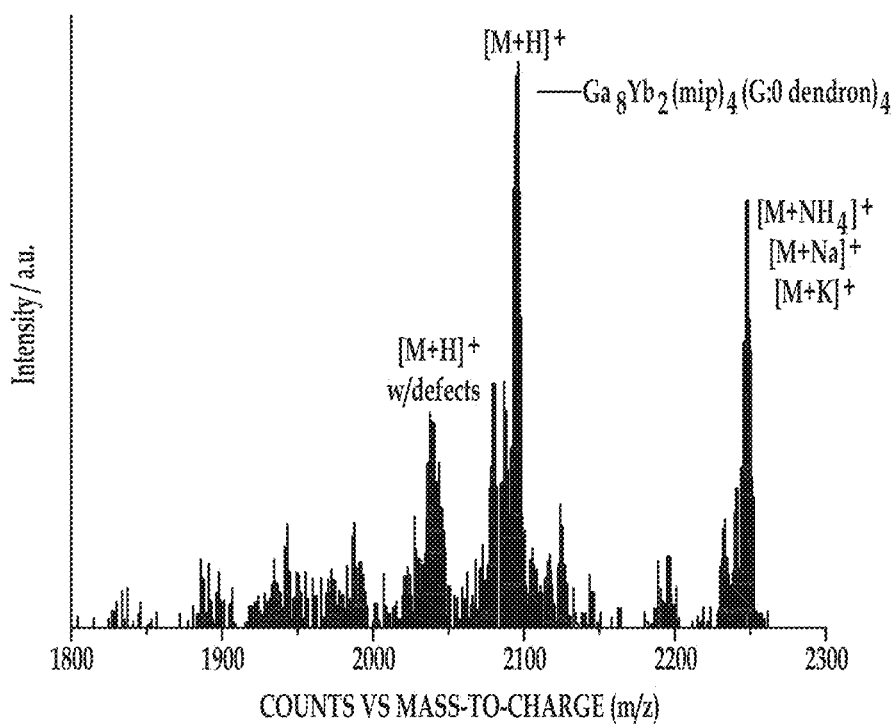
FIGS. 31 through 34 depict the electrospray ionization mass spectrometry spectrum of different dendrimeric metallacrowns disclosed herein.

$Ga_8Yb_2$(shi)$_8$(mip)$_4$ dimeric metallacrowns were mixed with free thiol focal-point polyamidoamine dendrons (G:0) in DMSO. The mixture was stirred for up to 2 weeks at about 40° C. under a nitrogen atmosphere. The ESI-MS spectrum of the resulting dendrimeric metallacrown is shown in FIG. 31. The results indicate that four G:0 PAMAM dendrons were coupled to each dimeric metallacrown. The signal labeled w/defects indicates that some of the dendrimeric metallacrown may have had synthetic defects, e.g., if less than the total number of mip groups covalently linked to the free thiols of the dendrons, or imperfections on the dendron itself (e.g., fewer methyl acrylates attached to every ethylenediamine).

Figure 32:
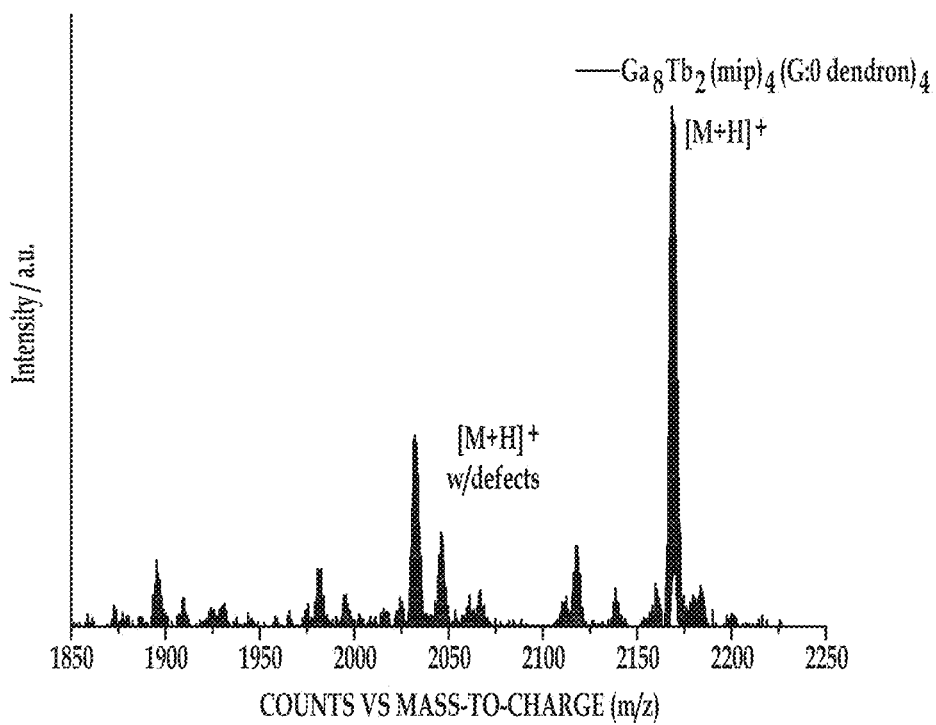

$Ga_8Tb_2(shi)_8(mip)_4$ dimeric metallacrowns were mixed with free thiol focal-point polyamidoamine dendrons (G:0) in DMSO. The mixture was stirred for up to 2 weeks at about 40° C. under a nitrogen atmosphere. The ESI-MS spectrum of the resulting dendrimeric metallacrown is shown in FIG. 32. The results indicate that four G:0 PAMAM dendrons were coupled to each dimeric metallacrown. The signal labeled w/defects indicates that some of the dendrimeric metallacrown may have had synthetic defects, e.g., if less than the total number of mip groups covalently linked to the free thiols of the dendrons, or imperfections on the dendron itself (e.g., fewer methyl acrylates attached to every ethylenediamine).

Figure 33A:
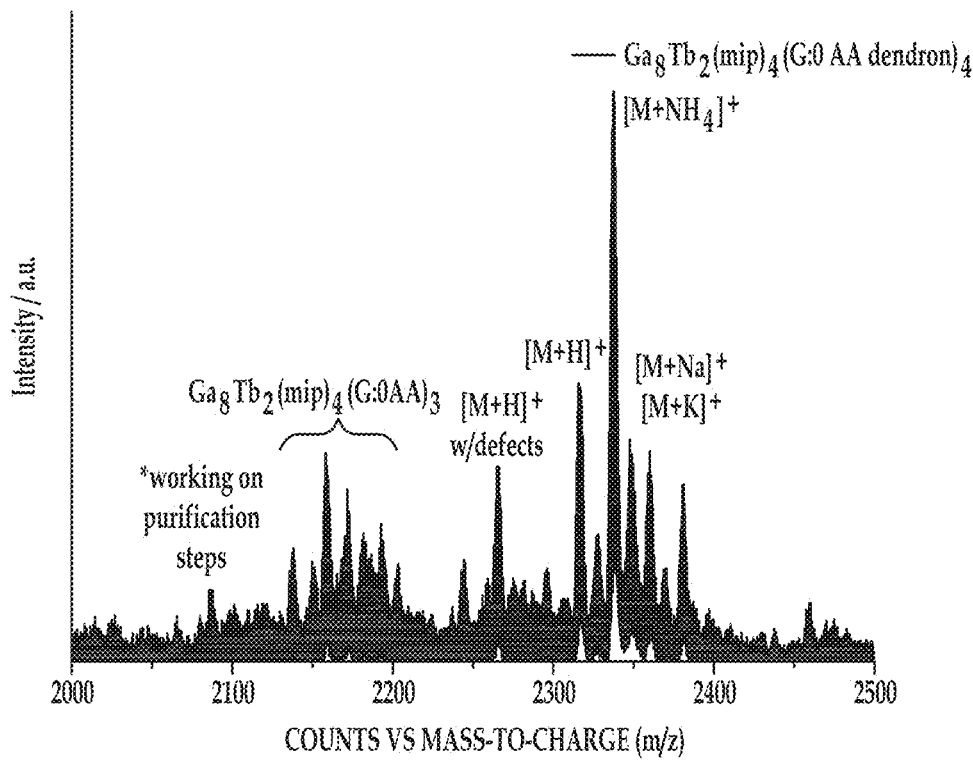
Figure 33B:
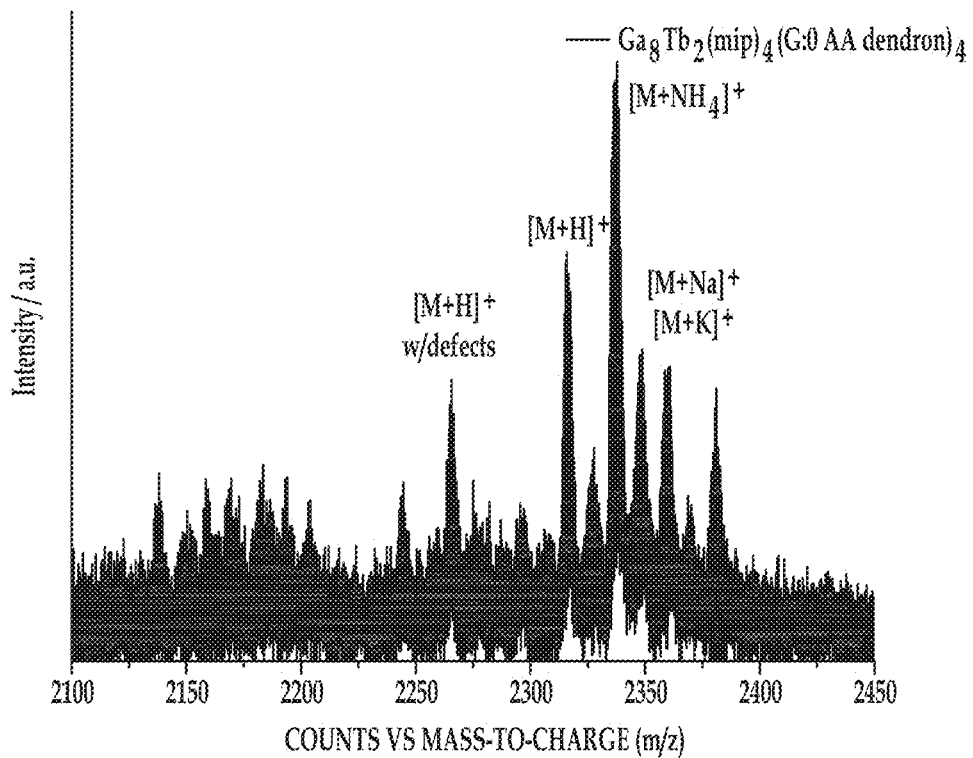

$Ga_8Tb_2(shi)_8(mip)_4$ dimeric metallacrowns were mixed with free thiol focal-point polyamidoamine dendrons (G:0) in DMSO. In this example, the PAMAM dendron had amine caps that were reacted with acetic anhydride (AA) similar to the process described in Example 1, #5. The mixture was stirred for up to 2 weeks at about 40° C. under a nitrogen atmosphere. The ESI-MS spectrum of the resulting dendrimeric metallacrown is shown in FIG. 33A. These results indicated incomplete (3 dendrons coupled to the metallacrown) and complete (4 dendrons coupled to the metallacrown). Purification steps were performed taking advantage of the difference in the solubility of the dendrimeric metallacrown, as shown in FIG. 33B. The results in FIG. 33B show that the signal intensity from the three-coupling dendrimeric metallacrowns decreased as compared to FIG. 33A.

Figure 34:
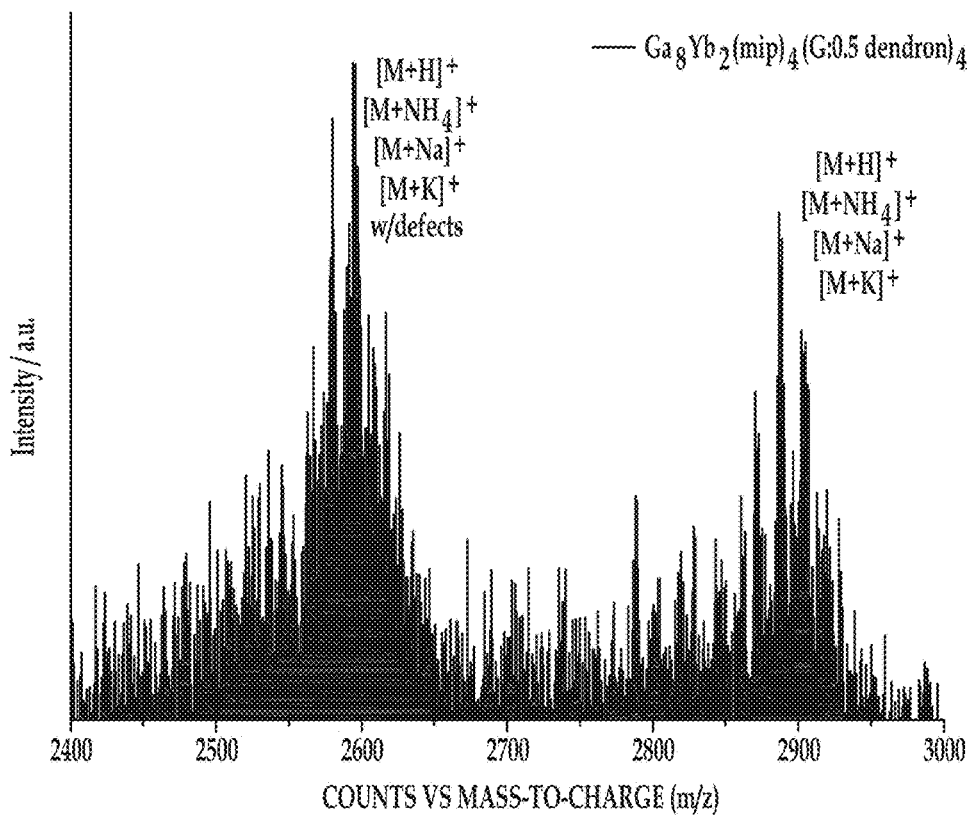

$Ga_8Yb_2(shi)_8(mip)_4$ dimeric metallacrowns were mixed with free thiol focal-point polyamidoamine dendrons (G:0.5) in DMSO. The mixture was stirred for up to 2 weeks at about 40° C. under a nitrogen atmosphere. The ESI-MS spectrum of the resulting dendrimeric metallacrown is shown in FIG. 34. The results indicate that four G:0.5 PAMAM dendrons were coupled to each dimeric metallacrown.

Example 6

This example demonstrates how photocatalysis can be used to attach a dendron to a metallacrown.

A dimeric metallacrown similar to Sm-m4 of Example 4 was prepared, except that yttrium was used instead of samarium salt and ethyne-substituted isophthalic acid ($H_2eip$) was used instead of 5-maleimidoisophthalic acid ($H_2mip$). The resulting dimeric metallacrown was $Ga_8Y_2(shi)_8(eip)_4$.

Figure 35:
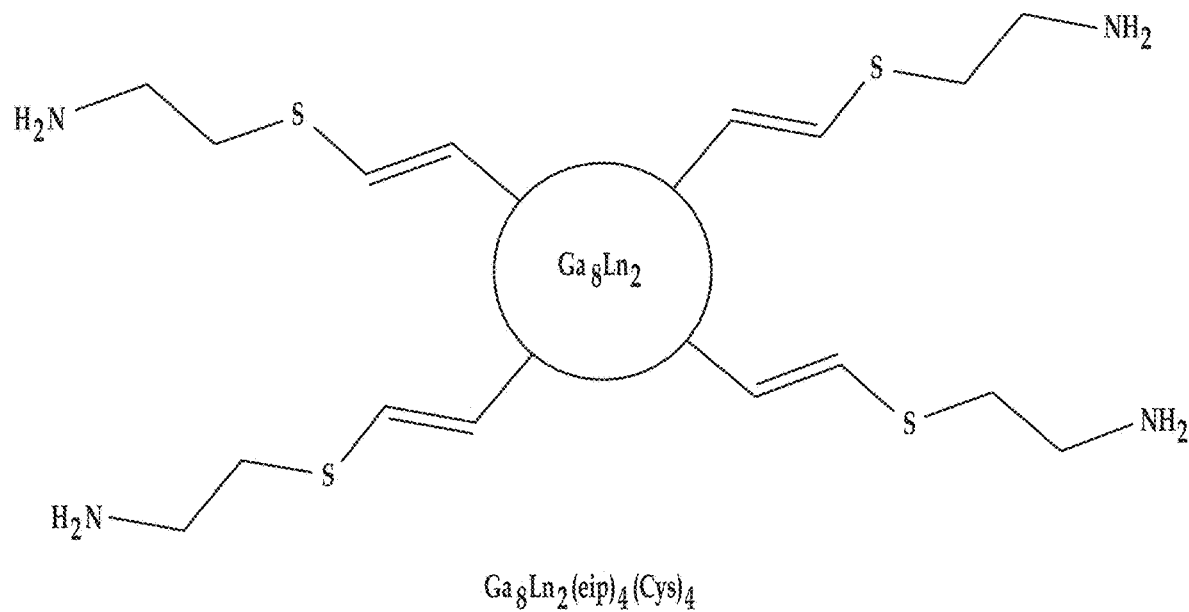
FIG. 35 schematically depicts the structure of $Ga_8Ln_2(shi)_8(eip)_4(Cys)_4$ (Cys=cysteamine), with the $Ga_8Ln_2(shi)_8(eip)_4$ portion shown schematically.

Cysteamine (4 equiv.) was coupled to the ethyne-substituted isophthalic acid bridging ligands using a photocatalytic reaction. The dimeric metallacrown was mixed with cysteamine, $Ru(bpy)_3Cl_2$, and p-toluidine. The mixture was exposed to blue (460 nm) LED light from about 0.5 hours to about 1 hour. The exposure was performed in a non-oxygen free atmosphere. A schematic illustration of the resulting thiol-modified metallacrown is shown in FIG. 35.

Figure 36:
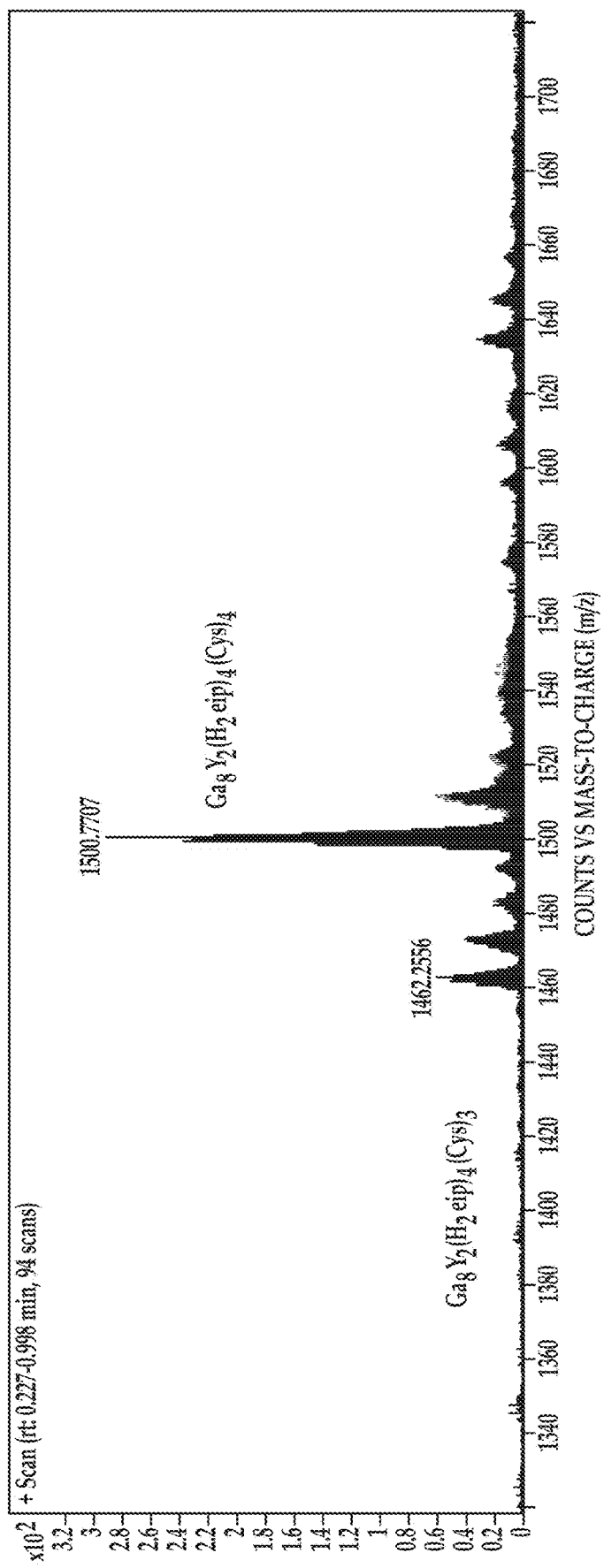
FIG. 36 depicts the electrospray ionization mass spectrometry spectrum of $Ga_8Ln_2(shi)_8(eip)_4(Cys)_4$.

The ESI-MS spectrum of the resulting thiol-modified metallacrown is shown in FIG. 36. These results indicated incomplete (3 thiols coupled to the metallacrown) and complete (4 thiols coupled to the metallacrown).

Because cysteamine (specifically the sulfur) can be coupled to a metallacrown focal-point, it is believed that a similar reaction may be used to couple a dendron having a terminal thiol focal-point to a maleimide-terminated monomeric or dimeric metallacrown to form an example of the dendrimeric metallacrown disclosed herein.

Example 7

A dimeric metallacrown similar to Sm-m4 of Example 4 was prepared, except that a yttrium salt was used instead of samarium salt. The resulting dimeric metallacrown was $Ga_8Y_2(shi)_8(mip)_4$.

The $Ga_8Y_2(shi)_8(mip)_4$ dimeric metallacrowns were mixed with free thiol focal-point polyamidoamine dendrons (G:0.5) in DMSO.

Figure 37:
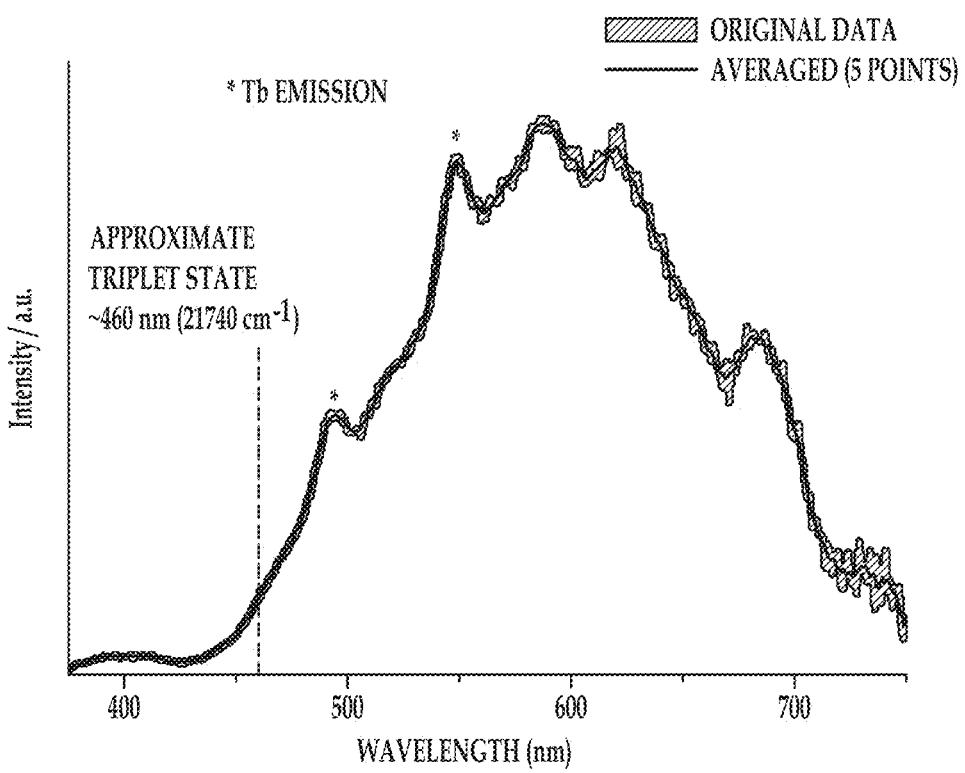
FIG. 37 depicts the phosphorescence spectrum of $Ga_8Y_2(Shi)_8(mip)_4$ G:0.5 polyamidoamine MC-cored dendrimer.

Gaussian decomposition of the phosphorescence spectrum (excitation 340 nm, time delay 200 µs) of the solid state $Ga_8Y_2(shi)_8(mip)_4$ G:0.5 polyamidoamine MC-cored dendrimer was used to estimate the position of the ligand-centered triplet state (FIG. 37). An approximate value of the triplet state is shown in FIG. 37, because the results indicate that the sample may have been contaminated with Tb (e.g., from another experiment) or Y salt used in the synthesis, and thus the sample was not of sufficient purity. The estimated $T_1$, determined as 0-0 transition, is located at 21 740 $cm^{-1}$ (~460 nm).

Example 8

$Ga_8Yb_2$ metallacrowns with salicylhydroxamate ring ligands and 5-maleimide isophthalate bridging ligands were respectively coupled to free thiol focal-point Generation 0, Generation 0 with acetic anhydride caps, and Generation 0.5 PAMAM dendrons in DMSO as the solvent. The mixtures were then stirred for several days at adequate temperature (ranging from 18° C. to 40° C. depending upon the dendron generation) and in an oxygen free environment. Once the reactions were complete, the solvent was removed and the product rinsed with methanol or water.

Figure 38:
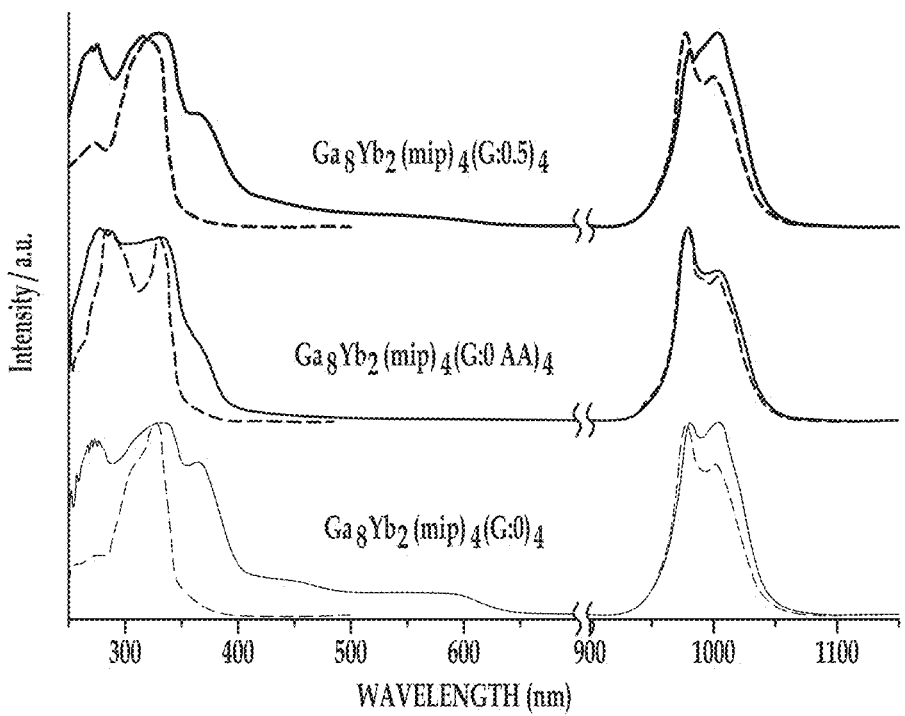
FIG. 38 depicts the excitation and emission spectra of different dendrimeric metallacrowns in the solids state (solid lines) and in solution (dashed lines)

The excitation and emission spectra for each of the dendrimeric metallacrowns in the solid state and in solution ($H_2O$/DMSO=96/4) were measured. The solution samples were first dissolved in the DMSO and then water was added. 1 mg/mL solutions at room temperature were used for the measurements. The results are shown in FIG. 38. Under excitation at 320 nm or 335 nm, the dendrimeric metallacrowns, both in the solid state (solid lines) and in aqueous solutions (dashed lines), exhibited characteristic emission (peaks at the right side of FIG. 38) in the NIR for the Yb-containing dendrimeric metallacrowns (FIG. 38). The excitation spectra (peaks at the right side of FIG. 38, $\lambda_{em}$=980 nm) are also characteristic of the Yb-containing dendrimeric metallacrowns.

Quantitative parameters, i.e. absolute quantum yields under excitation at 350 nm (for samples in the solid state) or 325 nm (for samples in solution) and luminescence lifetimes (under excitation at 355 nm), have been determined for each of the $Ga_8Y_2(shi)_8(mip)_4$ G:0 polyamidoamine MC-cored dendrimer, the $Ga_8Y_2(shi)_8(mip)_4$ G:0 AA-capped polyamidoamine MC-cored dendrimer, and the $Ga_8Y_2(shi)_8(mip)_4$ G:0.5 polyamidoamine MC-cored dendrimer at room temperature. These results are shown in Table 2. In Table 2, the 2σ values are given between parentheses. For bi-exponetial luminescence lifetimes results, values after the colon indicate the fraction contribution of the individual lifetimes to the experimental luminescence decay.

TABLE 2

| Compound | State/Solvent | Lifetime/µs | Quantum yield/% |
| --- | --- | --- | --- |
| $Ga_8Yb_2$ G:0 | Solid | 36.3(1) | 2.40(2) |
|  | $H_2O$/DMSO (96/4) | 9.93(8) | 0.53(1) |
| $Ga_8Yb_2$ G:0 AA | Solid | 22.5(1):94.7(3)% 173(7):5.3(3)% | 1.23(3) |
|  | $H_2O$/DMSO (96/4) | 12.8(3) | 0.78(1) |
| $Ga_8Yb_2$ G:0.5 | Solid | 46.3(1) | 2.83(9) |
|  | $H_2O$/DMSO (96/4) | 11.1(1) | 0.63(1) |

The quantum yield results for the Yb-containing dendrimeric metallacrowns are similar to those set forth in Table 1 for the Yb-containing dendrimeric metallacrowns.

It is to be understood that the ranges provided herein include the stated range and any value or sub-range within the stated range, as if the value(s) or sub-range(s) within the stated range were explicitly recited. For example, a range from about 12 hours to about 24 hours should be interpreted to include not only the explicitly recited limits of 12 hours to 24 hours, but also to include individual values, such as 17 hours, 12.5 hours, 14 hours, 22.75 hours, etc., and sub-ranges, such as from about 15 hours to about 13 hours, from about 20 hours to about 24 hours, etc. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A dendrimeric metallacrown, comprising:
a monomeric metallacrown complex, including:
a central ion selected from the group consisting of a lanthanide ion, a d-block transition metal ion or rare earth metal ion, and an s-block alkali or alkaline earth metal ion; and
a metallomacrocycle attached to the central ion, wherein the metallomacrocycle includes a repeating sub-unit consisting of a metal ion and a ring ligand selected from the group consisting of a hydroxamic acid derivative and an oxime derivative; and
a dendron respectively attached to each of the ring ligands of the metallomacrocycle.

2. The dendrimeric metallacrown as defined in claim 1 wherein one of:
the central ion is the lanthanide ion and is selected from the group consisting of $La^{3+}$, $Ce^{3+}$, $Pr^{3+}$, $Nd^{3+}$, $Pm^{3+}$, $Sm^{3+}$, $Eu^{3+}$, $Gd^{3+}$, $Tb^{3+}$, $Dy^{3+}$, $Ho^{3+}$, $Er^{3+}$, $Tm^{3+}$, and $Yb^{3+}$; or
the central ion is the d-block transition metal ion or rare earth metal ion and is selected from the group consisting of $Mn^{2+}$, $Cu^{2+}$, $Co^{2+}$, $Co^{3+}$, $Ni^{2+}$, $Zn^{2+}$, $Fe^{3+}$, $Y^{3+}$, $Sc^{3+}$, and $Lu^{3+}$; or
the central ion is the s-block alkali or alkaline earth metal ion and is selected from the group consisting of $Li^+$, $Na^{2+}$, $K^+$, and $Ca^{2+}$.

3. The dendrimeric metallacrown as defined in claim 1 wherein the metal ion is a group 13 metal ion or a period 4 transition metal ion.

4. The dendrimeric metallacrown as defined in claim 1 wherein the dendron is selected from the group consisting of a chiral dendron and an achiral dendron.

5. The dendrimeric metallacrown as defined in claim 1, further comprising a bridging ligand coordinated to the central ion.

6. A method for making the dendrimeric metallacrown as defined in claim 1, the method comprising chemically attaching a respective focal-point of each dendron to each of the ring ligands.

7. The method as defined in claim 6 wherein prior to chemically attaching the respective focal-point of each dendron to each of the ring ligands, the method further comprising synthesizing the monomeric metallacrown complex.

8. The method as defined in claim 6 wherein chemically attaching the respective focal-point of each dendron to each of the ring ligands involves free ligands and forms a ring ligand/dendron complex, and wherein the method further comprising synthesizing the monomeric metallacrown complex using the ring ligand/dendron complex.

9. The method as defined in claim 6 wherein one of:
the respective focal-point is a thiol and chemically attaching involves conjugation of the thiol with a thiol active group of the ring ligand; or
the respective focal-point is an azide and chemically attaching involves conjugation of the azide with an azide active group of the ring ligand; or
the respective focal-point is an amine and chemically attaching involves conjugation of the amine with an amine active group of the ring ligand; or
the respective focal-point is an amide and chemically attaching involves conjugation of the amide with an amide active group of the ring ligand.

10. A dendrimeric metallacrown, comprising:
a dimeric metallacrown complex, including:
a first monomeric metallacrown complex, including:
a first central ion selected from the group consisting of a first lanthanide ion, a first d-block transition metal ion or rare earth metal ion, and a first s-block alkali or alkaline earth metal ion; and
a first metallomacrocycle attached to the first central ion, wherein the first metallomacrocycle includes a first repeating sub-unit consisting of a first metal ion and a first ring ligand;
a second monomeric metallacrown complex, including:
a second central ion selected from the group consisting of a second lanthanide ion, a second d-block transition metal ion or rare earth metal ion, and a second s-block alkali or alkaline earth metal ion; and
a second metallomacrocycle attached to the second central ion, wherein the second metallomacrocycle includes a second repeating sub-unit consisting of a second metal ion and a second ring ligand; and
a bridging ligand attaching the first monomeric metallacrown complex to the second monomeric metallacrown complex; and
a dendron respectively attached to i) the bridging ligand; or ii) each of the first ring ligands of the first monomeric metallacrown complex; or iii) each of the second ring ligands of the second monomeric metallacrown complex; or iv) any combination of i, ii, and iii.

11. The dendrimeric metallacrown as defined in claim 10 wherein the first monomeric metallacrown complex is the same as the second monomeric metallacrown complex.

12. The dendrimeric metallacrown as defined in claim 10 wherein the bridging ligand is a dicarboxylic acid or a dicarboxylic acid derivative.

13. The dendrimeric metallacrown as defined in claim 10 wherein the dendron includes:
   a first dendron attached to the bridging ligand;
   a second dendron attached to each of the first ring ligands of the first monomeric metallacrown complex; and
   a third dendron attached to each of the second ring ligands of the second monomeric metallacrown complex.

14. The dendrimeric metallacrown as defined in claim 13 wherein the first dendron, the second dendron, and the third dendron are of a same family.

15. The dendrimeric metallacrown as defined in claim 13 wherein:
   the first dendron is of a first family; and
   the second and third dendrons are of a second family that is different than the first family.

16. The dendrimeric metallacrown as defined in claim 13 wherein:
   the first dendron is of a first family;
   one of the second and third dendrons is of the first family; and
   an other of the third and second dendrons is of a second family that is different than the first family.

17. The dendrimeric metallacrown as defined in claim 13 wherein each of the first dendron, the second dendron, and the third dendron are of a different family.

18. The dendrimeric metallacrown as defined in claim 10 wherein the first monomeric metallacrown complex is different from the second monomeric metallacrown complex, and wherein:
   i) the first central ion and the second central ion are different; or
   ii) the first metal ion and the second metal ion are different; or
   iii) both i and ii.

19. The dendrimeric metallacrown as defined in claim 10 wherein the dendron includes:
   a first dendron attached to each of the first ring ligands of the first monomeric metallacrown complex;
   a second dendron attached to each of the second ring ligands of the second monomeric metallacrown complex;
   the first dendron is of a first family; and
   the second dendron is of a second family that is different than the first family.

20. A method for making the dendrimeric metallacrown as defined in claim 10, the method comprising chemically attaching a respective focal-point of each dendron to i) the bridging ligand; or ii) each of the first ring ligands; or iii) each of the second ring ligands; or iv) any combination of i, ii, and iii.

21. The method as defined in claim 20 wherein prior to chemically attaching the respective focal-point of each dendron, the method further comprising synthesizing the dimeric metallacrown complex.

22. The method as defined in claim 20 wherein chemically attaching the respective focal-point of each dendron involves free bridging ligands, free first ring ligands, free second ring ligands, or combinations thereof, and forms i) a bridging ligand/dendron complex; or ii) a first ring ligand/ dendron complex; or iii) a second ring ligand/dendron complex; or iv) any combination of i, ii, and iii; and wherein the method further comprising synthesizing the dimeric metallacrown complex using i) the bridging ligand/dendron complex; or ii) the first ring ligand/dendron complex; or iii) the second ring ligand/dendron complex; or iv) any combination of i, ii, and iii.

23. The method as defined in claim 20 wherein the dendron is respectively chemically attached to the first ring ligands of the first monomeric metallacrown complex, or the second ring ligands of the second monomeric metallacrown complex, or both, and wherein the method further comprises synthesizing the dimeric metallacrown complex with free bridging ligands.

24. The method as defined in claim 20 wherein the dendron is respectively chemically attached to free bridging ligands to form a bridging ligand/dendron complex, and wherein the method further comprises synthesizing the dimeric metallacrown complex with free first ring ligands, free second ring ligands, and the bridging ligand/dendron complex.

25. The method as defined in claim 20 wherein:
   the dendron is respectively chemically attached to the first ring ligands of the first monomeric metallacrown complex, or the second ring ligands of the second monomeric metallacrown complex, or both;
   the dendron is respectively chemically attached to free bridging ligands to form a bridging ligand/dendron complex; and
   the method further comprises synthesizing the dimeric metallacrown complex with the first ring ligands, the second ring ligands, and the bridging ligand/dendron complex.

26. The method as defined in claim 20 wherein one of:
   the respective focal-point is a thiol and chemically attaching involves conjugation of the thiol with a thiol active group of the bridging ligand, the ring ligand, or combinations thereof; or
   the respective focal-point is an azide and chemically attaching involves conjugation of the azide with an azide active group of the ring ligand; or
   the respective focal-point is an amine and chemically attaching involves conjugation of the amine with an amine active group of the bridging ligand, the ring ligand, or combinations thereof; or
   the respective focal-point is an amide and chemically attaching involves conjugation of the amide with an amide active group of the ring ligand.

27. A dendrimeric metallacryptand, comprising:
   a metallacryptate complex including:
      at least one central ion; and
      a metallacryptand attached to the at least one central ion; and
   a dendron respectively attached to each of the ring ligands of the metallacryptand.

28. An optical imaging agent, comprising:
   a carrier; and
   a dendrimeric metallacrown incorporated into the carrier, the dendrimeric metallacrown including:
      a monomeric metallacrown complex including:
         a central lanthanide ion; and
         a metallomacrocycle attached to the central lanthanide ion, wherein the metallomacrocycle includes a repeating sub-unit consisting of a metal ion and a ring ligand selected from the group consisting of a hydroxamic acid derivative and an oxime derivative; and a dendron respectively attached to each of the ring ligands of the metallomacrocycle.

29. The optical imaging agent as defined in claim 28 wherein the carrier is a solvent of the dendrimeric metallacrown.

30. A method for using the optical imaging agent as defined in claim 28, the method comprising:
   incubating cells in a medium with the optical imaging agent for a predetermined time; and
   exposing the incubated cells to an optical imaging technique.

31. An optical imaging agent, comprising:
   a carrier; and
   a dendrimeric metallacrown incorporated into the carrier, the dendrimeric metallacrown including:
      a dimeric metallacrown complex including:
         a first monomeric metallacrown complex, including:
            a first central lanthanide ion; and
            a first metallomacrocycle attached to the first central lanthanide ion, wherein the first metallomacrocycle includes a first repeating sub-unit consisting of a first metal ion and a first ring ligand;
         a second monomeric metallacrown complex, including:
            a second central lanthanide ion; and
            a second metallomacrocycle attached to the second central lanthanide ion, wherein the second metallomacrocycle includes a second repeating sub-unit consisting of a second metal ion and a second ring ligand; and
         a bridging ligand attaching the first monomeric metallacrown complex to the second monomeric metallacrown complex; and
      a dendron respectively attached to i) the bridging ligand; or ii) each of the first ring ligands of the first monomeric metallacrown complex; or iii) each of the second ring ligands of the second monomeric metallacrown complex; or iv) any combination of i, ii, and iii.

32. The optical imaging agent as defined in claim 31 wherein the carrier is a solvent of the dendrimeric metallacrown.

33. A method for using the optical imaging agent as defined in claim 31, the method comprising:
   incubating cells in a medium with the optical imaging agent for a predetermined time; and
   exposing the incubated cells to an optical imaging technique.

* * * * *